(12) United States Patent
Ogiso et al.

(10) Patent No.: US 6,969,764 B2
(45) Date of Patent: Nov. 29, 2005

(54) OPTICAL RECORDING MEDIUM AND NOVEL AZAPORPHYRIN COMPOUNDS

(75) Inventors: Akira Ogiso, Sodegaura (JP); Shinobu Inoue, Sodegaura (JP); Taizo Nishimoto, Sodegaura (JP); Hisashi Tsukahara, Sodegaura (JP); Tsutami Misawa, Sodegaura (JP); Tadashi Koike, Sodegaura (JP); Norihiko Mihara, Sodegaura (JP); Shunsuke Murayama, Sodegaura (JP); Ryousuke Nara, Sodegaura (JP)

(73) Assignees: Mitsui Chemicals, Inc., Tokyo (JP); Yamamoto Chemicals, Inc., Yao (JP)

( * ) Notice: Subject to any disclaimer, the term of this patent is extended or adjusted under 35 U.S.C. 154(b) by 297 days.

(21) Appl. No.: 10/169,251

(22) PCT Filed: Dec. 26, 2000

(86) PCT No.: PCT/JP00/09240

§ 371 (c)(1),
(2), (4) Date: Jun. 28, 2002

(87) PCT Pub. No.: WO01/47719

PCT Pub. Date: Jul. 5, 2001

(65) Prior Publication Data

US 2003/0194646 A1 Oct. 16, 2003

(30) Foreign Application Priority Data

Dec. 28, 1909 (JP) .......................... 11-374759
Jan. 31, 2000 (JP) ...................... 2000-023005
Apr. 13, 2000 (JP) ...................... 2000-112259
Jul. 13, 2000 (JP) ...................... 2000-212900

(51) Int. Cl.$^7$ .............. C07D 487/22; C09B 47/04; C09B 62/00; C09B 67/02
(52) U.S. Cl. .............. 540/145; 428/648; 430/270; 430/270.16; 430/945
(58) Field of Search ............. 540/145; 430/270, 430/945, 270.16; 428/648

(56) References Cited

U.S. PATENT DOCUMENTS 2,951,797 A   9/1960   Sharp 5,391,462 A   2/1995   Arioka et al.
5,786,124 A   7/1998   Chapman et al.

FOREIGN PATENT DOCUMENTS

| EP | 0 428 214 A1 | 5/1991 |
|---|---|---|
| JP | 61-295076 A | 12/1986 |
| JP | 9-147413 A | 6/1997 |
| JP | 2001-80217 A | 3/2001 |
| JP | 2001-84594 A | 3/2001 |
| WO | WO 90/02747 | 3/1990 |
| WO | WO 91/07659 | 5/1991 |

OTHER PUBLICATIONS

Kobayashi, "*meso*–Azaporphyrins and Their Analogues," The Porphyrin Handbook, 2000, pp 301–360, vol. 2, Academic Press (XP008018504).

Helberger et al., "Über die Einwirkung von Kupfer–1–cynaid auf o–Halogenacetophenone II," Justus Liebigs Annalen der Chemie, 1937, pp 279–287, No. 531, Verlag Chemie GmbH, Weinheim, GermanY (in German) (XP001149150).

Barrett et al., "Phthalocyanines and Related Compounds. Part XV. Tetrabenztriazaporphin: its Preparation from Phthalonitrile and a Proof of its Structure," Journal of the Chemical Society, 1939, pp 1809–1820, Chemical Society, Letchworth, GB (XP008018570).

Primary Examiner—Shailendra Kumar
(74) Attorney, Agent, or Firm—Buchanan Ingersoll PC

(57) ABSTRACT

An optical recording medium having a recording layer which contains at least one compound selected from the group consisting of mono-, di-, and triazaporphyrin compounds optionally in the form of a metal complex; or an optical recording medium comprising a substrate and formed thereon at least a recording layer containing an organic dye as a main component, characterized in that the organic dye has a first maximum value of absorption at a wavelength $\lambda 1$ of 400 nm or less in the absorption spectrum and has a second maximum value of absorption at a longer-wavelength side than the $\lambda 1$, and a wavelength band wherein the refractive index (n) and the absorption coefficient (k) of the above organic dye satisfy $n \geq 1.90$ and $0.03 \leq k \leq 0.30$.

12 Claims, 5 Drawing Sheets

OPTICAL RECORDING MEDIUM AND NOVEL AZAPORPHYRIN COMPOUNDS

This application is a 371 of PCT/JP00/09240, filed Dec. 26, 2000.

TECHNICAL FIELD

The present invention relates to an azaporphyrin compound useful as a dyestuff, dye, photoelectric functional material, and recording or memory material, especially as a recording dye for a large-capacity write-once-read-many optical recording medium capable of recording and replay information by blue and/or red laser light. Moreover, the present invention relates to a process for preparing the azaporphyrin. Furthermore, the present invention relates to an optical recording medium containing the azaporphyrin.

In addition, the present invention relates to an optical information recording medium having a recording layer capable of a high-density recording especially with a short-wavelength laser of a wavelength of 430 nm or less.

BACKGROUND ART

It is known that CD-Rs (CD-Recordable) have been proposed and developed as write-once-read-many optical recording media which comply with standards of compact discs (hereinafter, abbreviated to "CD"), and they are widely utilized for music replay media and information terminals.

For recording and replaying such an optical recording medium, a near-infrared semiconductor laser of 770 to 830 nm is generally used, and signal recording is carried out in a heat mode onto a recording layer comprising an organic dye and so forth on a substrate. Namely, when the recording layer is irradiated with a laser light, the organic dye absorbs light to generate heat and a pit is formed in the recording layer by the generated heat. Then, the recorded signal is detected on the basis of reflectance, at the irradiation with the laser light, of a portion where the pit has been formed and a portion where the pit is not formed.

Since satisfying CD standards such as Red Book and Orange Book, the CD-R has a characteristic that it is compatible with a CD player and a CD-ROM player. However, the recording capacity of the above conventional medium is about 680 MB, which is not sufficient for the recording of motion pictures. Therefore, with the rapid increase of information volume, the demand of a high-density and large-capacity information-recording medium increases.

A measure for obtaining the high-density recording medium comprises the reduction of a beam spot size by shortening the wavelength of the laser for use in recording and replaying and by increasing numerical apertures (N.A.) of the objective lens. Thus, short-wavelength lasers having a wavelength such as 680, 670, 660, 650, or 635 nm, which are utilized in an optical disc system, have been put into practical use. Accordingly, it becomes possible to form an optical recording medium capable of recording motion pictures and a large volume of information by shortening of the wavelength of a semiconductor laser, increase of Numerical Aperture of the objective lens, data-compacting technology, and the like. As a result, developed as a write-once-read-many optical recording medium applicable to the above lasers is a recordable Digital Versatile Disc (hereinafter, abbreviated as DVD-R). DVD-R is an optical recording medium having a recording capacity of 3.9 GB or 4.7 GB and capable of writing once, and the development of an optical disc having a good recording property applicable to such a capacity is further desired. The wavelength of the red laser to be used at that time is from 550 to 700, preferably 635 to 670 nm. In this situation, proposed optical recording media include magneto-optical recording media, phase change recording media, chalcogen oxide-type recording media, organic dye-type optical recording media, and the like. Of these, the organic dye-type optical recording media are considered to be advantageous in view of inexpensiveness and easiness of processing.

Recordable optical recording media wherein a dye is used as the recording layer and a reflective layer is provided on the recording layer for the purpose of increasing reflectance have widely been commercialized as write-once-read-many compact disk (Compact Disc Recordable: CDR) media using a cyanine dye or a phthalocyanine dye as the recording layer since the former medium was disclosed in *Optical Data Storage* 1989 *Technical Digest Series* Vol. 1, 45 ('89). These media have characteristics that they can be recorded with a semiconductor laser of 780 nm and replayed on commercially popular and commercially available CD player and CD-ROM player.

In addition, recently, as an optical recording medium capable of recording and replaying motion pictures having a density higher than CD and a quality similar to TV, a DVD-R medium having a capacity of 4.7 GB at one side has begun to be supplied commercially, the media being capable of recording with a red semiconductor laser having an oscillation wavelength of 635 to 660 nm and of replaying on commercially available DVD video player and DVD-ROM player which has begun to be popular. The DVD-R medium also uses a cyanine dye or an azo dye as the recording layer and employs a laminated structure with a reflective layer, the medium being characterized in a disc structure wherein two sheets of substrate having a thickness of 0.6 mm are laminated.

Furthermore, a higher density recording may be required in future, and the volume of information is expected to reach as much as from 15 to 30 GB. As a means for realizing such a recording density, it is inevitable to use a shorter-wavelength laser. Therefore, as a recording dye for use in an organic dye-type optical recording medium in future, a dye having a good recording property in the wavelength range of 300 to 500 nm is desired.

By the way, with regard to the medium capable of recording at a density higher than DVDR wherein an organic dye is used as the recording layer, Japanese Patent Application Laid-Open No. 302310/1998 discloses that a density of a recording capacity of 8 GB or more is achieved using a laser having an oscillation wavelength of 680 nm or less. In the proposal of the publication, a large recording capacity of 8 GB or more is attained by converging a laser light of 680 nm or less by means of an objective lens having a high Numerical Aperture of 0.7 or more through a light-transmitting layer having a thickness of 10 to 177 $\mu$m.

On the other hand, in these years, as blue lasers, a laser of 410 nm using a GaN-type material and an SHG laser having a wavelength of 425 nm by the combination of a semiconductor laser and an optical waveguide device have been developed (e.g., *Nikkei Electronics* No. 708, p. 117, Jan. 26, 1998), the development of dyes applicable to a blue semiconductor laser corresponding to such lasers is now in progress.

Furthermore, from the beginning of 1999, GaN-type semiconductor lasers having an oscillation wavelength of 390 to 430 nm has been offered as samples (Nichia Corporation), and thereafter, it has begun to study a medium (hereinafter, referred to as HD-DVDR) having a highly dense capacity of 15 GB or more at one side capable of recording about 2 hours of motion pictures having a picture quality similar to that of HDTV (high definition television) broadcast. When the HD-DVDR medium having such a highly dense capacity is used, about 6 hours of recording is possible for the picture quality similar to that of present broadcast, and therefore, the medium has also attracted the attention as a new recording media which will replace home VTR. Already, as a proposal of using a phase change inorganic recording film, the technical summary is introduced in *Nikkei Electronics* (No. 751), p. 117, Sep. 6, 1999.

Heretofore, as examples of dyes recordable exclusively with a blue laser of 400 to 500 nm, there have been reported cyanine dye compounds described in Japanese Patent Application Laid-Open Nos. 74690/1992 and 40161/1994 and porphyrin dye compounds described in Japanese Patent Application Laid-Open Nos. 304256/1995, 3042567/1995, 127174/1996, and 334207/1999, and also polyene dye compounds described in Japanese Patent Application Laid-Open Nos. 78576/1992 and 89279/1992, azo dye compounds described in Japanese Patent Application Laid-Open Nos. 334204/1999 and 334205/1999, dicyanovinylphenyl dye compounds described in Japanese Patent Application Laid-Open No. 334206/1999, and the like.

Moreover, there have been proposed an optical recording medium described in Japanese Patent Application Laid-Open No. 53785/1999 which comprises two layers of a recording layer using mainly a porphyrin dye, a cyanine dye, or the like as an organic dye for recording layer formation and a metal reflective layer mainly composed of silver, an optical recording medium having an ingenious medium constitution described in Japanese Patent Application Laid-Open No. 203729/1999 which enables the recording at two wavelength regions by including a blue laser-sensitive dye layer containing a cyanine dye sensitive to a blue laser and a red laser-sensitive dye layer, an optical recording medium using indigo dye compounds described in Japanese Patent Application Laid-Open No. 78239/1999 which enables the recording at two wavelength regions by mixing two kinds of dyes, i.e., a dye for a blue laser and a dye for a red laser, an optical recording medium using a cyanoethene dye described in Japanese Patent Application Laid-Open No. 105423/1999, an optical recording medium using a squalilium dye compound described in Japanese Patent Application Laid-Open No. 110815/1999, and the like.

On the other hand, as an example of recording onto an organic dye film at a blue region of 400 to 500 nm, Japanese Patent Application Laid-Open Nos. 304256/1995 and 304257/1995 describe a proposal which aims at the reduction of production cost by mixing with a polymer having a molecular structure coordinating to the central metal of a porphyrin compound at the side chain to shift the Soret band of the porphyrin compound to a longer-wavelength side, whereby the dye is made applicable to Ar laser of 488 nm and also by enabling the film formation by spin coating. Moreover, the polyene compounds disclosed in Japanese Patent Application Laid-Open Nos. 78576/1992 and 89279/1992 and so forth are found to have a poor stability to light according to the examination carried out by the present inventors, and thus some modifications such as blending of a quencher is necessary for it practical application.

Furthermore, as an optical recording medium capable of recording with lasers having both wavelength regions, there is an optical recording medium using a porphyrin compound described in Japanese Patent Application Laid-Open No. 101953/1998 or an optical recording medium using a tetraazaporphyrin dye compound described in Japanese Patent Application Laid-Open No. 144312/1999. Namely, porphyrin compounds and azaporphyrin compounds having a similar structure have a characteristic that they have absorption called "Q band" at a longer-wavelength side of the visible region and strong absorption also at a shorter-wavelength region of the visible region called "Soret band". Cyclic organic compounds such as porphyrin widely used as dyes, pigments, photoelectric functional materials, and the like as the uses are proposed as compounds having properties suitable for dyes for DVD-R and also for dyes for optical recording media capable of a high density recording applicable to 15 to 30 GB.

The process for producing azaporphyrins is precisely described in *The Porphyrines*, Vol. 1, pp. 365–388, edited by D. Dorphine, Academic Press, but as general synthetic methods, known are processes for producing tetrabenzodiazaporphyrins and tetrabenzotriazaporphyrins by heating acetophenone and phthalonitrile in a metal halide as described in *Annalen*, 1937, Vol. 529, p. 205, *Annalen*, 1937, Vol. 531, p. 279, and so forth and processes for producing substituted diazaporphyrins, in which no aromatic group is fused, by dimerizing a pyrromethene derivative as described in *J. Chem. Soc. (C)*, 1996, pp. 22–26 and *J. Biochem.*, 1997, pp. 654–660.

As a recent situation, since a blue-violet semiconductor laser having a wavelength of 400 to 410 nm is well on the way to put into practical use, a large-capacity write-once-read-many optical recording medium using the laser has actively developed and therefore, the development of a dye having a high light resistance and a good high-speed recording property is particularly desired.

However, it is a present situation that the above optical recording medium for a blue semiconductor laser is not sufficiently applicable to a laser light having a wavelength of 400 to 410 nm. Namely, the present inventors have found problems that a replay on the medium using the above organic dye does not work well because a good value of the ratio of carrier wave to noise (C/N) is not necessarily obtained at the replay of the recorded signals, photodeterioration by the replay light occurs owing to an insufficient light resistance, and thus a high-grade signal property is not necessarily obtained. Accordingly, it becomes an urgent necessity to overcome the problems and to develop an optical recording medium capable of a high-density recording and replay with a laser light having a wavelength of 400 to 410 nm. Furthermore, in the case of applying to DVD-R having a capacity of 4.7 GB which is strongly desired as a recording and replaying medium for digital motion pictures, it is inevitable to contain an organic dye sensitive to a laser having a wavelength of 635 to 670 nm in the recording layer of the medium.

For the purpose, the object cannot be achieved by the above recording dye alone which is used exclusively for a blue laser wavelength.

In addition, the optical recording medium described in Japanese Patent Application Laid-Open No. 203729/1999, which is capable of the recording and replay at two wavelength regions of a blue laser wavelength region and a red laser wavelength region, has a multilayered recording layer and the optical recording media described in Japanese Patent Application Laid-Open Nos. 78239/1999, 105423/1999, and 110815/1999 necessarily uses two or more kinds of recording dyes, so that the preparation of the media is complicated and there is yet room for improvement of the recording property. Moreover, with regard to the optical recording media described in Japanese Patent Application Laid-Open Nos. 101953/1998 and 144312/1999, satisfactory property is not sufficiently obtained at the recording and replay with each laser light selected from both the wavelength ranges of 400 to 410 nm and 635 to 670 nm, and thus, at present, there is room for improvement of the recording dye compounds used for the optical recording media of the publications.

The present inventors have examined recording materials suitable for write-once-read-many optical recording media and obtained the following three findings.

(1) A large-capacity write-once-read-many optical recording medium uses a laser light of 300 to 500 nm and/or a laser light of 500 to 700 nm for writing and reading records, so that the control of absorption coefficient, refractive index, and reflectance at around the wavelength of the laser lights is important as a recording material.

(2) Although large-capacity write-once-read-many optical recording media using the laser lights have been actively developed as mentioned above and, in particular, a dye having a high light resistance and a good high-speed recording property has been desired, the above dye compounds do not yet have a sufficient property as recording materials capable of the recording and replay with the laser lights at both wavelength regions, and therefore there is room for improvement at present. Moreover, at the production of the media by coating methods such as spin coating which are convenient for the formation of recording films, a high solubility in a coating solvent is mentioned as one advantageous property and thus it is necessary to consider this point.

(3) With regard to the above processes for producing azaporphyrin compounds, no diazaporphyrin described in the present invention is obtained by the method of heating an acetophenone and a phthalocyanine in a metal halide. Also, neither α,β-azaporphyrin nor trisazaporphyrin described in the present invention is obtained by the production method of the dimerization of a pyrromethene derivative.

Moreover, in general, it is necessary to carrying out a higher-density recording for increasing the recording capacity, so that it is inevitable to increase Numerical Aperture of the objective lens used for converging the optical beam for recording and to use a laser having a shorter wavelength in the optical system. However, the minimum beam diameter of the converged optical beam is decided by the diffraction limit.

By the way, since the recording is carried out at a beam strength exceeding a certain threshold value, a recording pit smaller than the converged beam spot is obtained as shown in FIG. 7(a). The surrounding area of the recording pit corresponds to the foot of the strength peak of the beam. Under the present circumstances that a shorter-wavelength beam is increasingly used, photochemical reaction of the recording layer is promoted even at the surrounding area of the recording pit. In particular, there is a problem that the pit edge is degraded at the recording and thus signal property deteriorated because the wavelength region of the above blue-violet laser is a wavelength region at which photochemical reaction of an organic compound easily occurs. That is, as shown in FIG. 7(b), a recorded information (solid line part in FIG. 7(b)) which should be, by right, formed so as to correspond to rectangular wave becomes a broader waveform (broken line part in FIG. 7(b)). Additionally, when the information is replayed at the wavelength of the same blue-violet laser, there arises a problem that photoreaction is promoted even by the irradiation with a weak light such as a replaying light and thus the degradation proceeds every time replayed. Therefore, in Japanese Patent Application Laid-Open Nos. 304256/1995, 304257/1995, and so forth, a countermeasure of differentiating the wavelengths of the recording light and the replaying light, actually using a replaying light having a wavelength longer than that of the recording light should be taken and, as a result, it is an actual situation that the requirement for a sufficient high-density recording cannot be satisfied. Furthermore, the differentiation of the wavelengths of the recording light and the replaying light needs preparing a recording apparatus and a replaying apparatus separately or providing two optical systems and control systems thereof in one apparatus, which results in limitation of the use as an optical recording medium or invites enlargement of the apparatus and increase of cost, and finally the medium becomes poor in generality. Moreover, hitherto, in the optical recording media such as CDR, ON or OFF of the recording is carried out according to a definite thermal threshold value of a physical property such as melting point, sublimation point, phase transition point, or thermal decomposition point of an organic dye film, but the intervention of the photodeterioration mode caused by the excitation with a blue-violet laser makes the contrast indefinite and especially in the high density recording system wherein a fine recording pit smaller than an optical beam should be formed, there is a risk of remarkable deterioration of quality of a recorded signal.

DISCLOSURE OF THE INVENTION

An object of the present invention is to provide an optical recording medium capable of excellent optical recording and replay by developing a dye compound most suitable for recording and replaying information with a light and by using the compound.

Moreover, another object of the invention is to provide a recording medium capable of a good high-density recording as well as suppressing phtoreaction and photodegradation at the recording and replay on an organic recording film with a short-wavelength laser of 430 nm or less, such as a blue-violet laser and enhancing reliability, in a high-density recording system wherein a fine recording pit smaller than an optical beam should be formed.

Namely, the present invention relates to:

(A-1): an optical recording medium containing, in the recording layer, at lest one compound selected from the group of mono-, di-, and triazaporphyrin compounds which may form metal complexes;

(A-2): the optical recording medium of (A-1) comprising an organic dye layer as the recording layer on a substrate, which contains at least one compound selected from the above compound group in the organic dye layer;

(A-3): the optical recording medium of (A-1) or (A-2), wherein the above compound is a compound represented by the general formula (1):

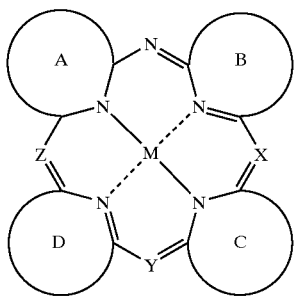

(1)

wherein rings A, B, C, and D each independently represent a pyrrole ring skeleton which may have a substituent, X, Y, and Z each independently represent a methine group which may have a substituent or nitrogen atom and at least one of X, Y, and Z is a methine group which may have a substituent, and M represents two hydrogen atoms, a divalent to tetravalent metal atom or metaloid atom which may have a substituent or a ligand, or an oxy metal atom;

(A-4): the optical recording medium of any one of (A-3), wherein the above compound is a compound represented by the general formula (2):

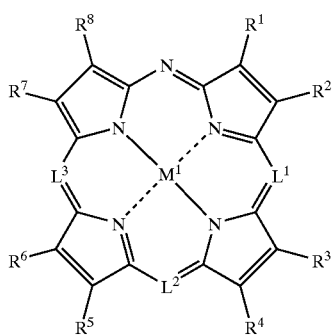

(2)

wherein $R^1$, $R^2$, $R^3$, $R^4$, $R^5$, $R^6$, $R^7$, and $R^8$ each independently represent hydrogen atom, a halogen atom, nitro group, cyano group, hydroxyl group, amino group, carboxyl group, sulfonic acid group, a substituted or unsubstituted alkyl group, aralkyl group, aryl group, alkenyl group, alkoxy group, aralkyloxy group, aryloxy group, alkenyloxy group, alkylthio group, aralkylthio group, arylthio group, alkenylthio group, a monosubstituted amino group, a disubstituted amino group, an acyl group, an alkoxycarbonyl group, an aralkyloxycarbonyl group, an aryloxycarbonyl group, an alkenyloxycarbonyl group, a monosubstituted aminocarbonyl group, a disubstituted aminocarbonyl group, an acyloxy group, or a heteroaryl group, $L^1$ represents nitrogen atom or a methine group represented by C—$R^9$ ($R^9$ represents hydrogen atom, a halogen atom, cyano group, a substituted or unsubstituted alkyl group, aralkyl group, or aryl group) which may be substituted, $L^2$ represents nitrogen atom or a methine group represented by C—$R^{10}$ ($R^{10}$ represents hydrogen atom, a halogen atom, cyano group, a substituted or unsubstituted alkyl group, aralkyl group, or aryl group) which may be substituted, $L^3$ represents nitrogen atom or a methine group represented by C—$R^{11}$ ($R^{11}$ represents hydrogen atom, a halogen atom, cyano group, a substituted or unsubstituted alkyl group, aralkyl group, or aryl group) which may be substituted, at least one of $L^1$ to $L^3$ represents a methine group, each substituent of $R^1$ to $R^{11}$ may form a ring in combination with an adjacent substituent through a connecting group, and $M^1$ represents two hydrogen atoms, a divalent metal atom which may be unsubstituted or have a ligand, a trivalent or tetravalent metal atom or metaloid atom which may have a substituent, or an oxy metal atom;

(A-5): the optical recording medium of (A-4), wherein the compound is a diazaporphyrin compound represented by the general formula (3):

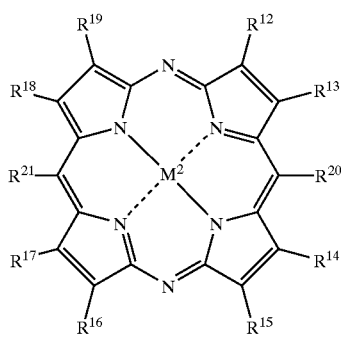

(3)

wherein $R^{12}$, $R^{13}$, $R^{14}$, $R^{15}$, $R^{16}$, $R^{17}$, $R^{18}$, and $R^{19}$ each independently represent the same groups as $R^1$ to $R^8$, $R^{20}$ and $R^{21}$ each independently represent the same groups as $R^9$ to $R^{11}$, each substituent of $R^{12}$ to $R^{21}$ may form a ring in combination with an adjacent substituent through a connecting group, and $M^2$ represents the same meaning as $M^1$ represents;

(A-6): the optical recording medium of (A-5), wherein $R^{20}$ and $R^{21}$ in the general formula (3) each are a substituted or unsubstituted phenyl group.

(A-7): the optical recording medium of (A-4), wherein the compound is a monoazaporphyrin compound represented by the general formula (4):

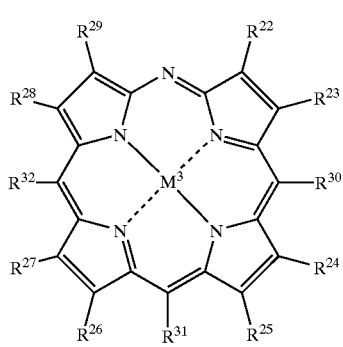

(4)

wherein $R^{22}$, $R^{23}$, $R^{24}$, $R^{25}$, $R^{26}$, $R^{27}$, $R^{28}$, and $R^{29}$ each independently represent the same groups as $R^1$ to $R^8$, $R^{30}$, $R^{31}$ and $R^{32}$ each independently represent the same groups as $R^9$ to $R^{11}$, each substituent of $R^{22}$ to $R^{32}$ may form a ring in combination with an adjacent substituent through a connecting group, and $M^3$ represents the same meaning as $M^1$ represents;

(A-8): the optical recording medium of any one of (A-4), wherein the compound is a compound represented by the general formula (5):

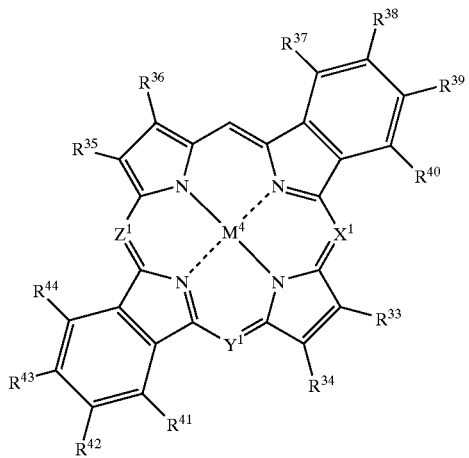

(5)

wherein $R^{33}$, $R^{34}$, $R^{35}$, $R^{36}$, $R^{37}$, $R^{38}$, $R^{39}$, $R^{40}$, $R^{41}$, $R^{42}$, $R^{43}$, and $R^{44}$ each independently represent hydrogen atom, a halogen atom, hydroxyl group, a substituted or unsubstituted alkyl group, aryl group, alkoxy group, aralkyloxy group, aryloxy group, alkenyloxy group, alkylthio group, arylthio group, or heteroaryl group, a pair of $R^{33}$ and $R^{34}$ and a pair of $R^{35}$ and $R^{36}$ each may form an aliphatic ring, which may have a substituent, in combination, $X^1$, $Y^1$, and $Z^1$ each independently represent a methine group or nitrogen atom and at least two of $X^1$, $Y^1$, and $Z^1$ are nitrogen atoms and $M^4$ represents the same meaning as $M^1$ represents;

(A-9): the optical recording medium of (A-8), wherein the compound is a compound represented by the general formula (6):

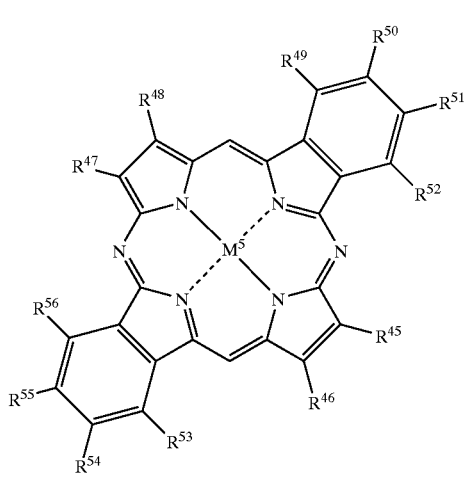

(6)

wherein $R^{45}$, $R^{46}$, $R^{47}$, $R^{48}$, $R^{49}$, $R^{50}$, $R^{51}$, $R^{52}$, $R^{53}$, $R^{54}$, $R^{55}$, and $R^{56}$ each independently represent the same groups as $R^{33}$ to $R^{44}$, a pair of $R^{45}$ and a pair of $R^{46}$ and $R^{47}$ and $R^{48}$ each may form an aliphatic ring, which may have a substituent, in combination through a connecting group, and $M^5$ represents the same meaning as $M^1$ represents;

(A-10): the optical recording medium of (A-8), wherein the compound is a compound represented by the general formula (7):

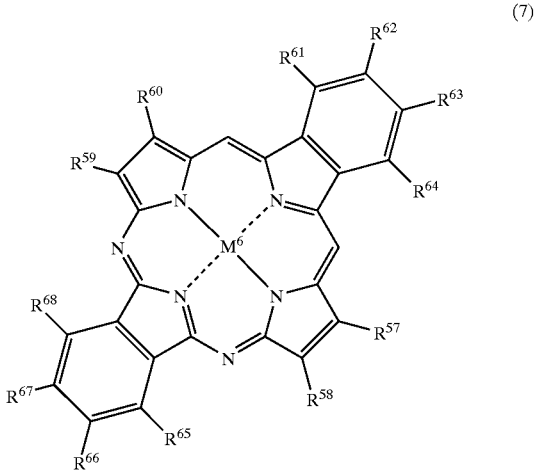

(7)

wherein $R^{57}$, $R^{58}$, $R^{59}$, $R^{60}$, $R^{61}$, $R^{62}$, $R^{63}$, $R^{64}$, $R^{65}$, $R^{66}$, $R^{67}$, and $R^{68}$ each independently represent the same groups as $R^{33}$ to $R^{44}$, a pair of $R^{57}$ and $R^{58}$ and a pair of $R^{59}$ and $R^{60}$ each may form an aliphatic ring, which may have a substituent, in combination through a connecting group, and $M^6$ represents the same meaning as $M^1$ represents;

(A-11): the optical recording medium of (A-8), wherein the compound is a compound represented by the general formula (8):

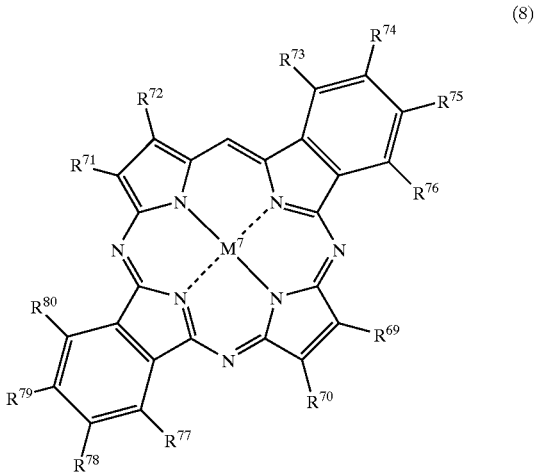

(8)

wherein $R^{69}$, $R^{70}$, $R^{71}$, $R^{72}$, $R^{73}$, $R^{74}$, $R^{75}$, $R^{76}$, $R^{77}$, $R^{78}$, $R^{79}$, and $R^{80}$ each independently represent the same groups as $R^{33}$ to $R^{44}$, a pair of $R^{69}$ and $R^{70}$ and a pair of $R^{71}$ and $R^{72}$ each may form an aliphatic ring, which may have a substituent, in combination through a connecting group, and $M^7$ represents the same meaning as $M^1$ represents;

(A-12): the optical recording medium of (A-1) or (A-2), which contains a mixture of azaporphyrin compounds represented by the general formulae (11) to (13) produced by reacting a maleonitrile represented by the following general formula (9), an acetophenone represented by the following general formula (10), and a metal halide and/or a metal derivative:

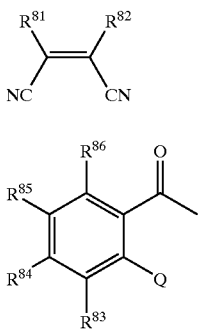

(9)

(10)

wherein $R^{81}$, $R^{82}$, $R^{83}$, $R^{84}$, $R^{85}$, and $R^{86}$ each independently represent the same groups as $R^{33}$ to $R^{44}$, $R^{81}$ and $R^{82}$ and each may form an aliphatic ring, which may have a substituent, in combination through a connecting group, and Q represents a halogen atom or cyano group,

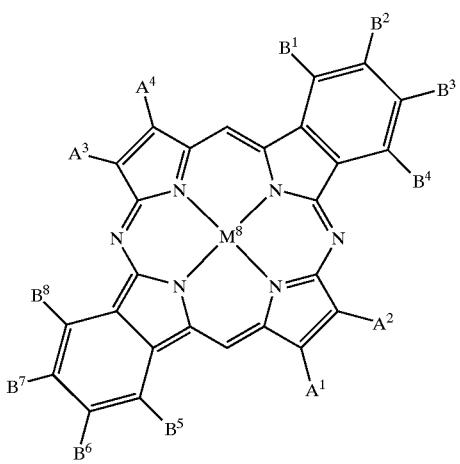

(11)

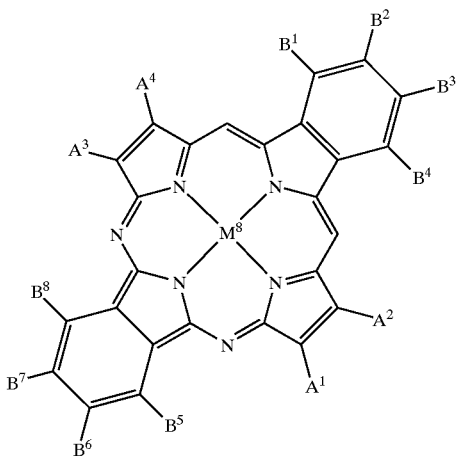

(12)

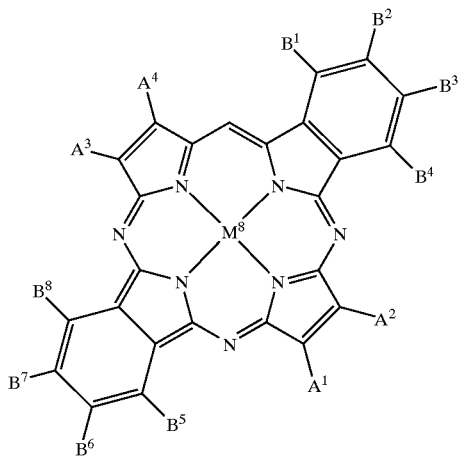

(13)

wherein $A^1$ and $A^2$ represent $R^{81}$ and $R^{82}$ or $R^{82}$ and $R^{81}$ in the formula (9) respectively, $A^3$ and $A^4$ represent $R^{81}$ and $R^{82}$ or $R^{82}$ and $R^{81}$ in the formula (9) respectively, $B^1$, $B^2$, $B^3$, and $B^4$ represent $R^{83}$, $R^{84}$, $R^{85}$, and $R^{86}$ or $R^{86}$, $R^{85}$, $R^{84}$, and $R^{83}$ in the formula (10) respectively, $B^5$, $B^6$, $B^7$, and $B^8$ represent $R^{83}$, $R^{84}$, $R^{85}$, and $R^{86}$ or $R^{86}$, $R^{85}$, $R^{84}$, and $R^{83}$ in the formula (10) respectively, and $M^8$ represents the same meaning as $M^1$ represents;

(A-13): the optical recording medium of any one of (A-1) to (A-4), which is capable of the recording and replay with a laser light having a wavelength selected from the range of 300 to 500 nm and/or 500 to 700 nm;

(A-14): the optical recording medium of any one of (A-1) to (A-4), which is capable of the recording and replay with a laser light having a wavelength selected from the range of 400 to 500 nm and/or 600 to 700 nm;

(A-15): the optical recording medium of any one of (A-1) to (A-4), which is capable of the recording and replay with a laser light having a wavelength selected from the range of 400 to 410 nm and/or 635 to 670 nm;

(A-16): a compound represented by the general formula (1):

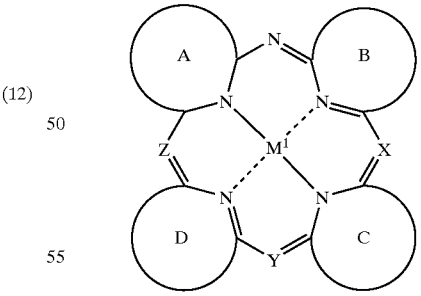

(1)

wherein rings A, B, C, and D each independently represent a pyrrole ring skeleton which may have a substituent, X, Y, and Z each independently represent a methine group which may have a substituent or nitrogen atom and at least one of X, Y, and Z is a methine group which may have a substituent, and M represents two hydrogen atoms, a divalent to tetravalent metal atom or metaloid atom which may have a substituent or a ligand, or an oxy metal atom;

(A-17): the compound of (A-16) represented by the general formula (2):

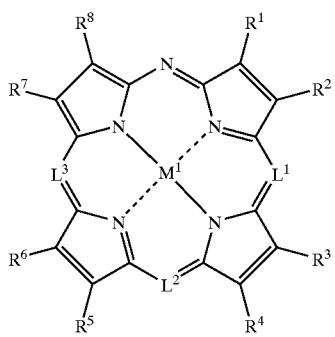

(2)

wherein $R^1$, $R^2$, $R^3$, $R^4$, $R^5$, $R^6$, $R^7$, and $R^8$ each independently represent hydrogen atom, a halogen atom, nitro group, cyano group, hydroxyl group, amino group, carboxyl group, sulfonic acid group, a substituted or unsubstituted alkyl group, aralkyl group, aryl group, alkenyl group, alkoxy group, aralkyloxy group, aryloxy group, alkenyloxy group, alkylthio group, aralkylthio group, arylthio group, alkenylthio group, a monosubstituted amino group, a disubstituted amino group, an acyl group, an alkoxycarbonyl group, an aralkyloxycarbonyl group, an aryloxycarbonyl group, an alkenyloxycarbonyl group, a monosubstituted aminocarbonyl group, a disubstituted aminocarbonyl group, an acyloxy group, or a heteroaryl group, $L^1$ represents nitrogen atom or a methine group represented by C—$R^9$ ($R^9$ represents hydrogen atom, a halogen atom, cyano group, a substituted or unsubstituted alkyl group, aralkyl group, or aryl group) which may be substituted, $L^2$ represents nitrogen atom or a methine group represented by C—$R^{10}$ ($R^{10}$ represents hydrogen atom, a halogen atom, cyano group, a substituted or unsubstituted alkyl group, aralkyl group, or aryl group) which may be substituted, $L^3$ represents nitrogen atom or a methine group represented by C—$R^{11}$ ($R^{11}$ represents hydrogen atom, a halogen atom, cyano group, a substituted or unsubstituted alkyl group, aralkyl group, or aryl group) which may be substituted, at least one of $L^1$ to $L^3$ represents a methine group, each substituent of $R^1$ to $R^{11}$ may form a ring in combination with an adjacent substituent through a connecting group, and $M^1$ represents two hydrogen atoms, a divalent metal atom which may be unsubstituted or have a ligand, a trivalent or tetravalent metal atom or metaloid atom which may have a substituent, or an oxy metal atom;

(A-18): the compound of (A-17), which is a diazaporphyrin compound represented by the general formula (3):

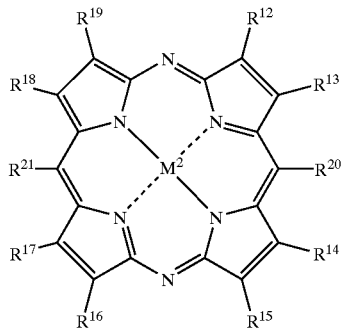

(3)

wherein $R^{12}$, $R^{13}$, $R^{14}$, $R^{15}$, $R^{16}$, $R^{17}$, $R^{18}$, and $R^{19}$ each independently represent the same groups as $R^1$ to $R^8$, $R^{20}$ and $R^{21}$ each independently represent the same groups as $R^9$ to $R^{11}$, each substituent of $R^{12}$ to $R^{21}$ may form a ring in combination with an adjacent substituent through a connecting group, and $M^2$ represents the same meaning as $M^1$ represents;

(A-19): the compound of (A-18), wherein $R^{20}$ and $R^{21}$ in the general formula (3) each are a substituted or unsubstituted phenyl group.

(A-20): the compound of (A-17), which is a monoazaporphyrin compound represented by the general formula (4):

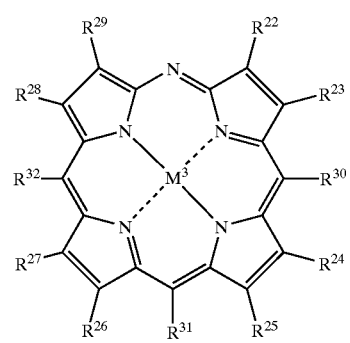

(4)

wherein $R^{22}$, $R^{23}$, $R^{24}$, $R^{25}$, $R^{26}$, $R^{27}$, $R^{28}$, and $R^{29}$ each independently represent the same groups as $R^1$ to $R^8$, $R^{30}$, $R^{31}$ and $R^{32}$ each independently represent the same groups as $R^9$ to $R^{11}$, each substituent of $R^{22}$ to $R^{32}$ may form a ring in combination with an adjacent substituent through a connecting group, and $M^3$ represents the same meaning as $M^1$ represents;

(A-21): the compound of (A-20), wherein $R^{30}$, $R^{31}$ and $R^{32}$ in the general formula (4) each are a substituted or unsubstituted phenyl group.

(A-22): the compound of (A-17), which is a compound represented by the general formula (5)

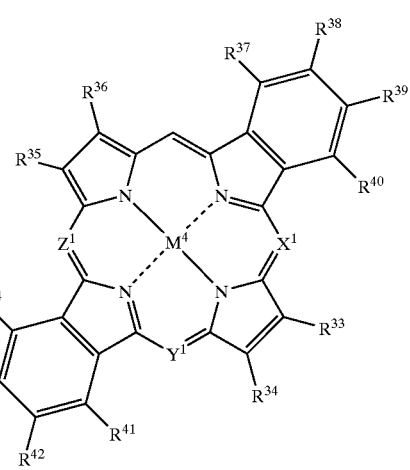

(5)

wherein $R^{33}$, $R^{34}$, $R^{35}$, $R^{36}$, $R^{37}$, $R^{38}$, $R^{39}$, $R^{40}$, $R^{41}$, $R^{42}$, $R^{43}$, and $R^{44}$ each independently represent hydrogen atom, a halogen atom, hydroxyl group, a substituted or unsubstituted alkyl group, aryl group, alkoxy group, aralkyloxy group, aryloxy group, alkenyloxy group, alkylthio group, arylthio group, or heteroaryl group, a pair of $R^{33}$ and $R^{34}$ and a pair of $R^{35}$ and $R^{36}$ each may form an aliphatic ring, which may have a substituent, in combination, $X^1$, $Y^1$, and $Z^1$ each independently represent methine group or nitrogen atom and at least two of $X^1$, $Y^1$, and $Z^1$ are nitrogen atoms, and $M^4$ represents the same meaning as $M^1$ represents;

(A-23): the compound of (A-22), which is represented by the general formula (6):

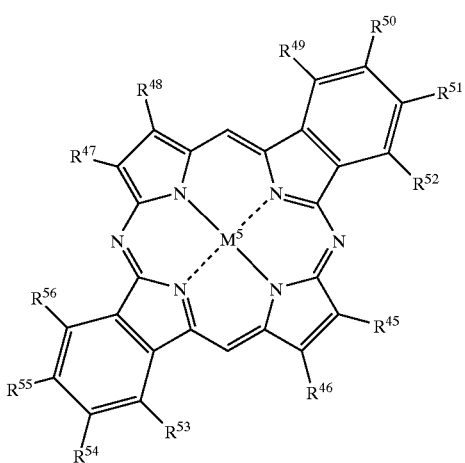

(6)

wherein $R^{45}$, $R^{46}$, $R^{47}$, $R^{48}$, $R^{49}$, $R^{50}$, $R^{51}$, $R^{52}$, $R^{53}$, $R^{54}$, $R^{55}$, and $R^{56}$ each independently represent the same groups as $R^{33}$ to $R^{44}$, a pair of $R^{45}$ and $R^{46}$ and a pair of $R^{47}$ and $R^{48}$ each may form an aliphatic ring, which may have a substituent, in combination through a connecting group, and $M^5$ represents the same meaning as $M^1$ represents;

(A-24): the compound of (A-22), which is represented by the general formula (7):

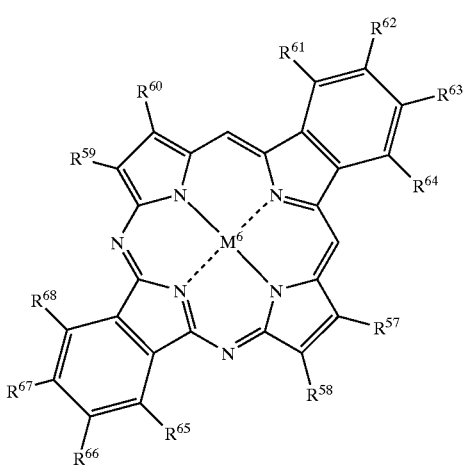

(7)

wherein $R^{57}$, $R^{58}$, $R^{59}$, $R^{60}$, $R^{61}$, $R^{62}$, $R^{63}$, $R^{64}$, $R^{65}$, $R^{66}$, $R^{67}$, and $R^{68}$ each independently represent the same groups as $R^{33}$ to $R^{44}$, a pair of $R^{57}$ and $R^{58}$ and a pair of $R^{59}$ and $R^{60}$ each may form an aliphatic ring, which may have a substituent, in combination through a connecting group, and $M^6$ represents the same meaning as $M^1$ represents;

(A-25): the compound of (A-22), which is represented by the general formula (8):

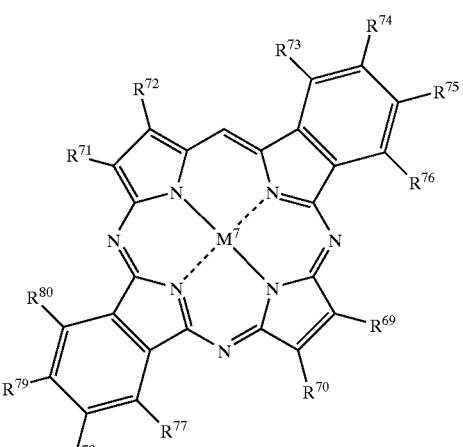

(8)

wherein $R^{69}$, $R^{70}$, $R^{71}$, $R^{72}$, $R^{73}$, $R^{74}$, $R^{75}$, $R^{76}$, $R^{77}$, $R^{78}$, $R^{79}$, and $R^{80}$ each independently represent the same groups as $R^{33}$ to $R^{44}$, a pair of $R^{69}$ and $R^{70}$ and a pair of $R^{71}$ and $R^{72}$ each may form an aliphatic ring, which may have a substituent, in combination through a connecting group, and $M^7$ represents the same meaning as $M^1$ represents;

(A-26): a mixture of azaporphyrin compounds represented by the general formulae (11) to (13):

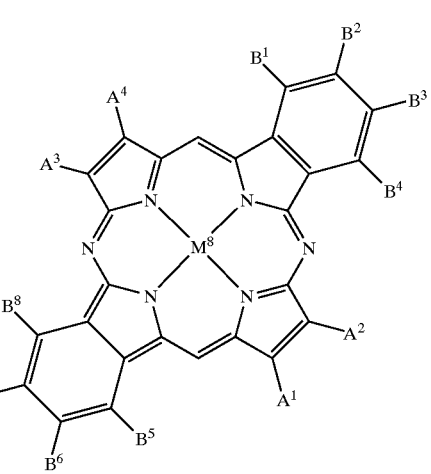

(11)

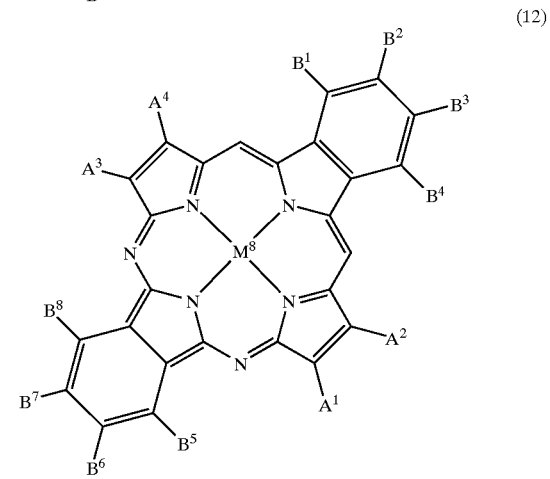

(12)

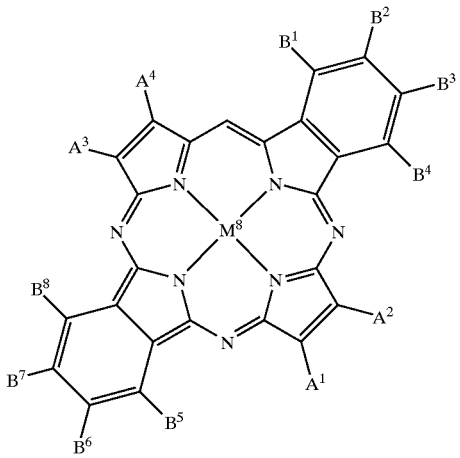

(13)

wherein $A^1$ and $A^2$ represent $R^{81}$ and $R^{82}$ or $R^{82}$ and $R^{81}$ in the formula (9) respectively, $A^3$ and $A^4$ represents $R^{81}$ and $R^{82}$ or $R^{82}$ and $R^{81}$ in the formula (9) respectively, $B^1$, $B^2$, $B^3$, and $B^4$ represent $R^{83}$, $R^{84}$, $R^{85}$, and $R^{86}$ or $R^{86}$, $R^{85}$, $R^{84}$, and $R^{83}$ the formula (10) respectively, $B^5$, $B^6$, $B^7$, and $B^8$ represent $R^{83}$, $R^{84}$, $R^{85}$, and $R^{86}$ or $R^{86}$, $R^{85}$, $R^{84}$, and $R^{83}$ in the formula (10) respectively, and $M^8$ represents the same meaning as $M^1$ presents;

(A-27): a process for producing an azaporphyrin compound described in any one of (A-22) to (A-25), comprising a step of reacting a maleonitrile represented by the general formula (9), an acetophenone represented by the general formula (10), and a metal halide and/or a metal derivative:

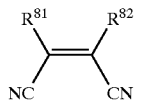

(9)

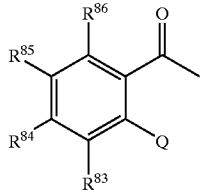

(10)

wherein $R^{81}$, $R^{82}$, $R^{83}$, $R^{84}$, $R^{85}$, and $R^{86}$ each independently represent the same groups as $R^{33}$ to $R^{44}$, $R^{81}$ and $R^{82}$ each may form an aliphatic ring, which may have a substituent, in combination through a connecting group, and Q represents a halogen atom or cyano group; and (A-28): the process for producing a mixture of diazaporphyrin compounds of (A-26), comprising a step of reacting a maleonitrile represented by the general formula (9), an acetophenone represented by the general formula (10), and a metal halide and/or a metal derivative.

Furthermore, the present invention relates to:

(B-1): an optical recording medium comprising a recording layer containing at least organic dye as the main component on a supporting substrate, the organic dye having a first maximum value of absorption at a wavelength $\lambda 1$ of 400 nm or less in the absorption spectrum and having a second maximum value of absorption at a longer-wavelength side than the $\lambda 1$, and a wavelength band wherein the refractive index (n) and the absorption coefficient (k) of the above organic dye satisfy the following relation:

$n \leq 1.90$ $0.03 \geq k \geq 0.30$ exists in the descending slope at the long-wavelength side of the absorption band containing the above first maximum value;

(B-2): the optical recording medium described in (B-1), wherein a wavelength $\lambda 0$ selected within the above wavelength band is used as the wavelength of a recording laser and the $\lambda 0$ is in the range of 300 to 450 nm;

(B-3): the optical recording medium described in (B-2), wherein the above second maximum value is at a long-wavelength side which is from 100 to 400 nm apart from the $\lambda 0$.

(B-4): the optical recording medium described in (B-3), wherein the molecular extinction coefficient ($\epsilon$) of the above organic dye at the above second maximum value satisfies:

$\epsilon > 10E+4$ cm$^{-1}$ mol$^{-1}$;

(B-5): the optical recording medium described in any one of (B-2) to (B-4), wherein the above organic dye is selected from at least one of phthalocyanines, porphyrins, azaporphyrin dyes, and quinones;

(B-6): the optical recording medium described in any one of (B-1) to (B-5), wherein the recording layer and the refractive layer are formed on the supporting substrate in this order and the recording and reply are carried out from the above supporting substrate side;

(B-7): the optical recording medium described in any one of (B-1) to (B-5), wherein the refractive layer and the recording layer are formed on the supporting substrate in this order, a light-transmitting layer having a thickness of 10 to 200 $\mu$m is present on the recording layer, and the recording and reply are carried out from the light-transmitting layer side;

(B-8): the optical recording medium described in (B-6) or (B-7), wherein the above refractive layer is composed of silver or a silver alloy; and (B-9): the optical recording medium described in any one of (B-1) to (B-8), wherein a guide groove is formed on the supporting substrate and a recording region for the above recording layer is provided at both of the guide groove and the land part between the guide grooves.

BEST MODE FOR CARRYING OUT THE INVENTION

The present invention relates to an optical recording medium containing, in the recording layer, a mono-, di-, or triazaporphyrin compound which may form metal complexes. Specifically, it relates to an optical recording medium which is capable of the recording and replay with a laser light having a wavelength selected from the range of 300 to 500 nm and/or 500 to 700 nm, furthermore, 400 to 500 nm and/or 600 to 700 nm, particularly, 400 to 410 nm and/or 635 to 670 nm. Further, the present invention relates to a mono-, di-, and triazaporphyrin compound and a process for producing the same.

The optical recording medium according to the present invention means an optical recording medium capable of recording and replaying information. However, an optical recording medium of the invention having a recording layer and a reflective layer on a substrate is explained herein as a suitable example.

Figure 1:
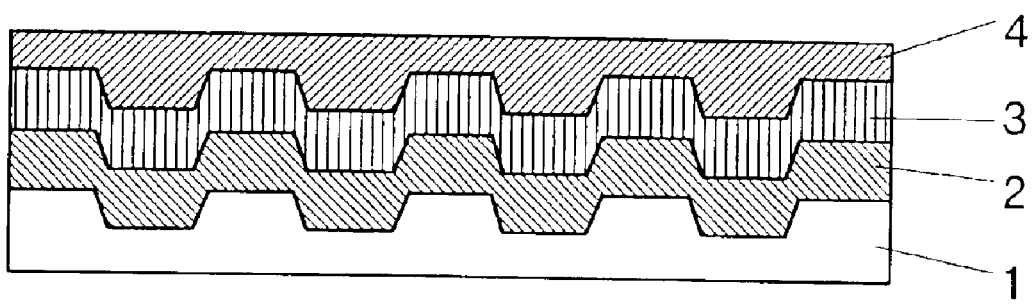
FIG. 1 is a schematic view showing one constitution of the optical recording medium of the present invention.
Figure 2:
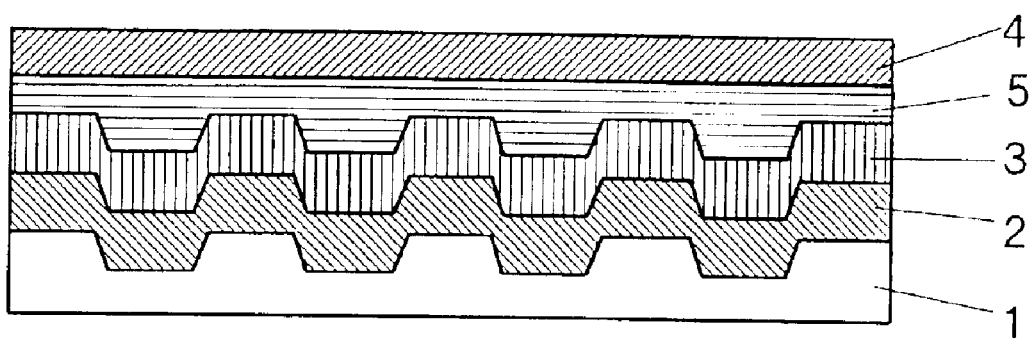
FIG. 2 is a schematic view showing other constitution of the optical recording medium of the present invention.
Figure 3:
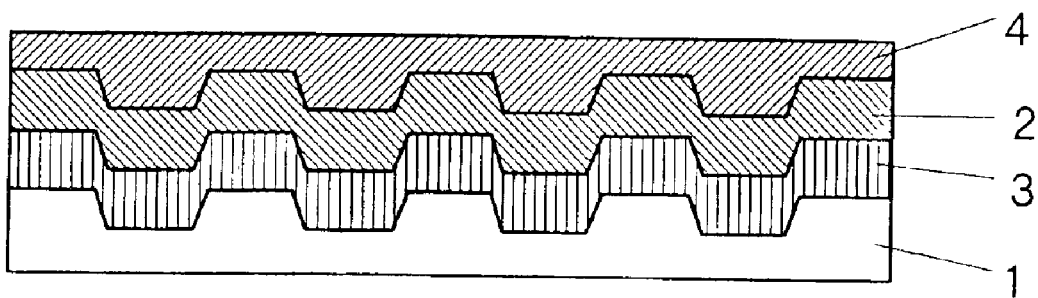
FIG. 3 is a schematic view showing still other constitution of the optical recording medium of the present invention.

The optical recording medium of the present invention has, for example, a four-layered structure wherein a substrate 1, a recording layer 2, a reflective layer 3, and a protective layer 4 are sequentially laminated as shown in FIG. 1 or has a bonded structure as shown in FIG. 2. Namely, a recording layer 2 is formed on a substrate 1, a reflective layer 3 is provided closely thereon, and a protective layer 4 is further attached thereon via an adhesive layer 5. However, another layer may be placed under or on the recording layer 2 and also the other layer may be present on the reflective layer 3. Moreover, as shown in FIG. 3, it may have a structure wherein a substrate 1, a reflective layer 3, a recording layer 2, and a protective layer 4 are laminated in this order and recording and replay are conducted from the protective layer side. Also, it may have a medium structure that the thickness of the light-transmitting layer is defined by N.A. of the optical system and a laser wavelength λ as described in Japanese Patent Application No. 326435/1998. Furthermore, the optical recording medium of the invention may have a structure containing two or more recording layers as described in 203729/1999, if necessary.

The material of the substrate may be fundamentally any transparent material toward a recording light and a replying light. For example, use is made of polymer materials such as polycarbonate resins, vinyl chloride resin, acrylic resins including poly(methyl methacrylate), polystyrene resin, and epoxy resins, and inorganic materials such as glass. These substrate materials may be molded as a disc-shape substrate by injection molding or the like. If necessary, guide grooves or pits may be formed on the surface of the substrate. Such guide grooves or pits are desirably provided at the time when the substrate is molded, but they may be provided on the substrate using an ultraviolet-curing resin layer.

Usually, in the case of using the medium as an optical disc, it may be a disc having a thickness of about 1.2 mm and a diameter of about 80 to 120 mm, and may have a hole having a diameter of about 15 mm at the center.

In the present invention, a recording layer is provided on the substrate, and the recording layer of the invention contains at least one of mono-, di-, and triazaporphyrin compounds which may form metal complexes, particularly compounds represented by the general formula (1). And the layer is capable of the recording and replay with a recording laser and a replaying laser having a wavelength selected from the range of 300 to 500 nm and/or 500 to 700 nm. In particular, the medium is an optical recording medium capable of obtaining a good C/N ratio toward a recording laser and a replaying laser having a wavelength selected from the range of 400 to 500 nm and/or 600 to 700 nm, further, 400 to 410 nm and/or 635 to 670 nm, which is also excellent in light stability against the replaying light and is capable of obtaining high quality signal properties.

The compound of the present invention represented by the general formula (1) is an extremely useful organic dye capable of satisfying optical constants necessary for a recording layer at the above laser light because the absorption wavelength can be optionally selected in the state of maintaining the extinction coefficient by selecting the substituent.

The following will describe the present invention in further detail.

With regard to the compound represented by the general formula (1) of the present invention, examples of specific substituents of the pyrrole rings represented by the rings A, B, C, and D, which may have a substituent, include hydrogen atom, a halogen atom, nitro group, cyano group, hydroxyl group, amino group, carboxyl group, sulfonic acid group, a substituted or unsubstituted alkyl group, an aralkyl group, an aryl group, an alkenyl group, an alkoxy group, an aralkyloxy group, an aryloxy group, an alkenyloxy group, an alkylthio group, an aralkylthio group, an arylthio group, an alkenylthio group, a monosubstituted amino group, a disubstituted amino group, an acyl group, an alkoxycarbonyl group, an aralkyloxycarbonyl group, an aryloxycarbonyl group, an alkenyloxycarbonyl group, a monosubstituted aminocarbonyl group, disubstituted aminocarbonyl group, an acyloxy group, a heteroaryl group, or the like.

Moreover, examples of specific substituents of the methine groups represented by X, Y, and Z present at meso position of the azaporphirin skeleton of the general formula (1) include methine groups represented by formulae (14), (15), and (16), respectively:

(14)

(15)

(16)

wherein $G^1$, $G^2$, and $G^3$ each represent hydrogen atom, a halogen atom, cyano group, a substituted or unsubstituted alkyl, an aralkyl, or an aryl group, which may be substituted.

Also, in the substituents on the methine groups represented by the above substituents X, Y, and Z present on the pyrrole rings, each substituent on the pyrrole ring mutually or the substituent on the pyrrole ring and the substituent on the adjacent methine group may be connected through a connecting group, and specifically, a ring formation by aliphatic condensation or aromatic condensation or a formation of a heterocycle containing a heteroatom wherein the connecting group is a heteroatom or a residue of a metal complex may be mentioned.

Furthermore, M in the general formula (1) represents two hydrogen atoms or a divalent to tetravalent metal atom or metaloid atom which may have a substituent or a ligand. Specific examples of the metal atom or metaloid atom include a divalent metal atom which is unsubstituted or has a ligand, a trivalent or tetravalent metal atom or metaloid atom which has a substituent, an oxy metal atom, and the like.

In the present invention, preferred examples of the compounds represented by the general formula (1) include the compounds represented by the general formula (2), and furthermore, the compounds represented by the formulae (3) to (8).

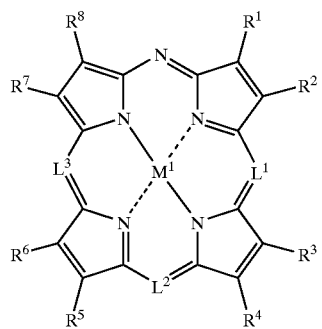

(2)

wherein $R^1$, $R^2$, $R^3$, $R^4$, $R^5$, $R^6$, $R^7$ and $R^8$ each independently represent hydrogen atom, a halogen atom, nitro group, cyano group, hydroxyl group, amino group, carboxyl group, sulfonic acid group, a substituted or unsubstituted alkyl group, aralkyl group, aryl group, alkenyl group, alkoxy group, aralkyloxy group, aryloxy group, alkenyloxy group, alkylthio group, aralkylthio group, arylthio group, alkenylthio group, a monosubstituted amino group, a disubstituted amino group, an acyl group, an alkoxycarbonyl group, an aralkyloxycarbonyl group, an aryloxycarbonyl group, an alkenyloxycarbonyl group, a monosubstituted aminocarbonyl group, a disubstituted aminocarbonyl group, an acyloxy group, or a heteroaryl group, $L^1$ represents nitrogen atom or a methine group represented by C—$R^9$ ($R^9$ represents hydrogen atom, a halogen atom, cyano group, a substituted or unsubstituted alkyl group, aralkyl group, or aryl group) which may be substituted, $L^2$ represents nitrogen atom or a methine group represented by C—$R^{10}$ ($R^{10}$ represents hydrogen atom, a halogen atom, cyano group, a substituted or unsubstituted alkyl group, aralkyl group, or aryl group) which may be substituted, $L^3$ represents nitrogen atom or a methine group represented by C—$R^{11}$ ($R^{11}$ represents hydrogen atom, a halogen atom, cyano group, a substituted or unsubstituted alkyl group, aralkyl group, or aryl group) which may be substituted, at least one of $L^1$ to $L^3$ represents a methine group, each substituent of $R^1$ to $R^{11}$ may form a ring in combination with an adjacent substituent through a connecting group, and $M^1$ represents two hydrogen atoms, a divalent metal atom which may be unsubstituted or have a ligand, a trivalent or tetravalent metal atom or metaloid atom which may have a substituent, or an oxy metal atom;

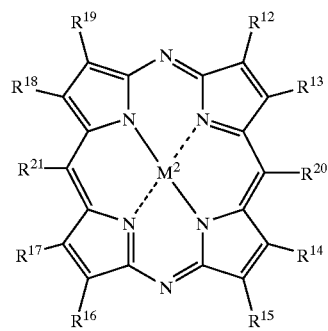

(3)

wherein $R^{12}$, $R^{13}$, $R^{14}$, $R^{15}$, $R^{16}$, $R^{17}$, $R^{18}$, and $R^{19}$ each independently represent the same groups as $R^1$ to $R^8$, $R^{20}$ and $R^{21}$ each independently represent the same groups as $R^9$ to $R^{11}$, each substituent of $R^{12}$ to $R^{21}$ may form a ring in combination with an adjacent substituent through a connecting group, and $M^2$ represents the same meaning as $M^1$ represents;

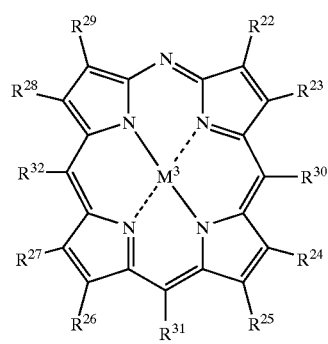

(4)

wherein $R^{22}$, $R^{23}$, $R^{24}$, $R^{25}$, $R^{26}$, $R^{27}$, $R^{28}$, and $R^{29}$ each independently represent the same groups as $R^1$ to $R^8$, $R^{30}$, $R^{31}$ and $R^{32}$ each independently represent the same groups as $R^9$ to $R^{11}$, each substituent of $R^{22}$ to $R^{32}$ may form a ring in combination with an adjacent substituent through a connecting group, and $M^3$ represents the same meaning as $M^1$ represents;

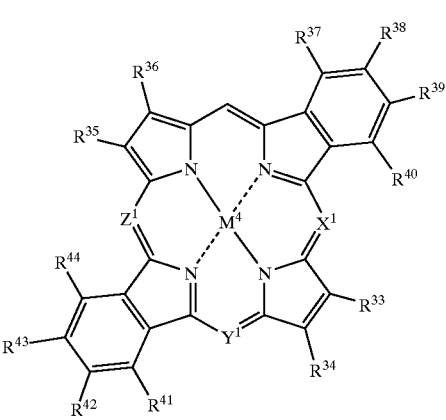

(5)

wherein $R^{33}$, $R^{34}$, $R^{35}$, $R^{36}$, $R^{37}$, $R^{38}$, $R^{39}$, $R^{40}$, $R^{41}$, $R^{42}$, $R^{43}$, and $R^{44}$ each independently represent hydrogen atom, a halogen atom, hydroxyl group, a substituted or unsubstituted alkyl group, aryl group, alkoxy group, aralkyloxy group, aryloxy group, alkenyloxy group, alkylthio group, arylthio group, or heteroaryl group, a pair of $R^{33}$ and $R^{34}$ and a pair of $R^{35}$ and $R^{36}$ each may form an aliphatic ring, which may have a substituent, in combination, $X^1$, $Y^1$, and $Z^1$ each independently represent a methine group or nitrogen atom and at least two of $X^1$, $Y^1$, and $Z^1$ are nitrogen atoms and $M^4$ represents the same meaning as $M^1$ represents;

(6)

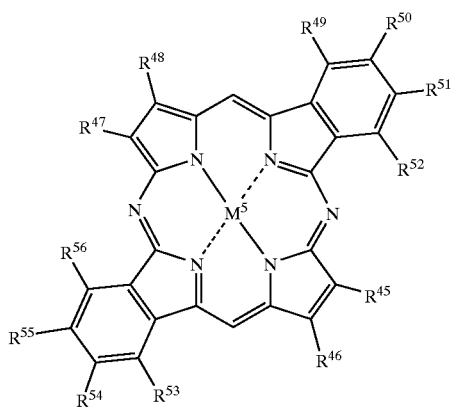

wherein $R^{45}$, $R^{46}$, $R^{47}$, $R^{48}$, $R^{49}$, $R^{50}$, $R^{51}$, $R^{52}$, $R^{53}$, $R^{54}$, $R^{55}$, and $R^{56}$ each independently represent the same groups as $R^{33}$ to $R^{44}$, a pair of $R^{45}$ and $R^{46}$ and a pair of $R^{47}$ and $R^{48}$ each may form an aliphatic ring, which may have a substituent, in combination through a connecting group, and $M^5$ represents the same meaning as $M^1$ represents;

(7)

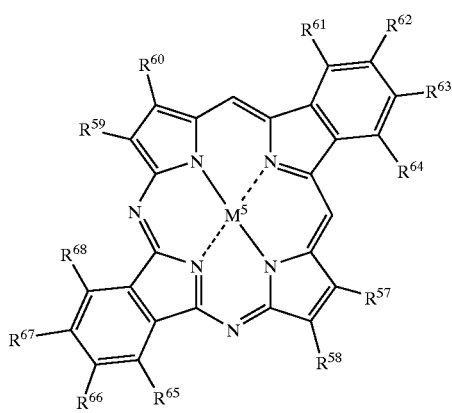

wherein $R^{57}$, $R^{58}$, $R^{59}$, $R^{60}$, $R^{61}$, $R^{62}$, $R^{63}$, $R^{64}$, $R^{65}$, $R^{66}$, $R^{67}$, and $R^{68}$ each independently represent the same groups as $R^{33}$ to $R^{44}$, a pair of $R^{57}$ and $R^{58}$ and a pair of $R^{59}$ and $R^{60}$ each may form an aliphatic ring, which may have a substituent, in combination through a connecting group, and $M^6$ represents the same meaning as $M^1$ represents;

(8)

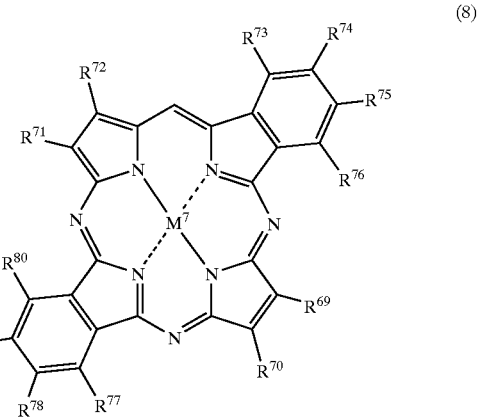

wherein $R^{69}$, $R^{70}$, $R^{71}$, $R^{72}$, $R^{73}$, $R^{74}$, $R^{75}$, $R^{76}$, $R^{77}$, $R^{78}$, $R^{79}$, and $R^{80}$ each independently represent the same groups as $R^{33}$ to $R^{44}$, a pair of $R^{69}$ and $R^{70}$ and a pair of $R^{71}$ and $R^{72}$ each may form an aliphatic ring, which may have a substituent, in combination through a connecting group, and $M^7$ represents the same meaning as $M^1$ represents.

In the compound of the invention represented by the general formula (2), specific examples of $R^1$ to $R^8$ include hydrogen atom; halogen atoms such as fluorine atom, chlorine atom, bromine atom, and iodine atom; nitro group; cyano group; hydroxyl group; amino group; carboxyl group; sulfonic acid group; and the like.

The substituted or unsubstituted alkyl groups of $R^1$ to $R^8$ include unsubstituted linear, branched, or cyclic alkyl groups having 1 to 15 carbon atoms such as methyl group, ethyl group, n-propyl group, iso-propyl group, n-butyl group, iso-butyl group, sec-butyl group, t-butyl group, n-pentyl group, iso-pentyl group, 2-methylbutyl group, 1-methylbutyl group, neopentyl group, 1,2-dimethylpropyl group, 1,1-dimethylpropyl group, cyclopentyl group, n-hexyl group, 4-methylpentyl group, 3-methylpentyl group, 2-methylpentyl group, 1-methylpentyl group, 3,3-dimethylbutyl group, 2,3-dimethylbutyl group, 1,3-dimethylbutyl group, 2,2-dimethylbutyl group, 1,2-dimethylbutyl group, 1,1-dimethylbutyl group, 3-ethylbutyl group, 2-ethylbutyl group, 1-ethylbutyl group, 1,2,2-trimethylbutyl group, 1,1,2-trimethylbutyl group, 1-ethyl-2-methylpropyl group, cyclohexyl group, n-heptyl group, 2-methylhexyl group, 3-methylhexyl group, 4-methylhexyl group, 5-methylhexyl group, 2,4-dimethylpentyl group, n-octyl group, 2-ethylhexyl group, 2,5-dimethylhexyl group, 2,5,5-trimethylpentyl group, 2,4-dimethylhexyl group, 2,2,4-trimethylpentyl group, 3,5,5-trimethylhexyl group, n-nonyl group, n-decyl group, 4-ethyloctyl group, 4-ethyl-4,5-methylhexyl group, n-undecyl group, n-dodecyl group, 1,3,5,7-tetraethyloctyl group, 4-butyloctyl group, 6,6-diethyloctyl group, n-tridecyl group, 6-methyl-4-butyloctyl group, n-tetradecyl group, n-pentadecyl group, 3,5-dimethylheptyl group, 2,6-dimethylheptyl group, 2,4-dimethylheptyl group, 2,2,5,5-tetramethylhexyl group, 1-cyclopentyl-2,2-dimethylpropyl group, and 1-cyclohexyl-2,2-dimethylpropyl group;

alkyl groups substituted by a halogen atom and having 1 to 10 carbon atoms such as chloromethyl group, chloroethyl group, bromoethyl group, iodoethyl group, dichloromethyl group, fluoromethyl group, trifluoromethyl group, pentafluoroethyl group, 2,2,2-trifluoroethyl group, 2,2,2-trichloroethyl group, 1,1,1,3,3,3-hexafluoro-2-propyl group, nonafluorobutyl group, and perfluorodecyl group;

alkyl groups substituted by hydroxyl group and having 1 to 10 carbon atoms such as hydroxymethyl group, 2-hydroxyethyl group, 3-hydroxypropyl group, 4-hydroxybutyl group, 2-hydroxy-3-methoxypropyl group, 2-hydroxy-3-chloropropyl group, 2-hydroxy-3- ethoxypropyl group, 3-butoxy-2-hydroxypropyl group, 2-hydroxy-3-cyclohexyloxypropyl group, 2-hydroxypropyl group, 2-hydroxybutyl group, and 4-hydroxydecalyl group;

alkyl groups substituted by a hydroxyalkoxy group and having 2 to 10 carbon atoms such as hydroxymethoxymethyl group, hydroxyethoxyethyl group, 2-(2'-hydroxy-1'-methylethoxy)-1-methylethyl group, 2-(3'-fluoro-2'-hydroxypropoxy)ethyl group, 2-(3'-chloro-2'-hydroxypropoxy)ethyl group, and hydroxybutoxycyclohexyl group;

alkyl groups substituted by a hydroxylalkoxyalkoxy group and having 3 to 10 carbon atoms such as hydroxymethoxymethoxymethyl group, hydroxyethoxyethoxyethyl group, [2'-(2'-hydroxy-1'-methylethoxy)-1'-methylethoxy]ethoxyethyl group, [2'-(2'-fluoro-1'-hydroxyethoxy)-1'-methylethoxy]ethoxyethyl group, and [2'-(2'-chloro-1'-hydroxyethoxy)-1'-methylethoxy]ethoxyethyl group;

alkyl groups substituted by cyano group and having 2 to 10 carbon atoms such as cyanomethyl group, 2-cyanoethyl group, 3-cyanopropyl group, 4-cyanobutyl group, 2-cyano-3-methoxypropyl group, 2-cyano-3-chloropropyl group, 2-cyano-3-ethoxypropyl group, 3-butoxy-2-cyanopropyl group, 2-cyano-3-cyclohexylpropyl group, 2-cyanopropyl group, and 2-cyanobutyl group;

alkyl groups substituted by an alkoxy group and having 2 to 15 carbon atoms such as methoxymethyl group, ethoxymethyl group, propoxymethyl group, butoxymethyl group, methoxyethyl group, ethoxyethyl group, propoxyethyl group, butoxyethyl group, n-hexyoxyethyl group, (4-methylpentoxy)ethyl group, (1,3-dimethylbutoxy)ethyl group, (2-ethylhexyloxy)ethyl group, n-octyloxyethyl group, (3,5,5-trimethylhexyloxy)ethyl group, (2-methyl-1-iso-propylpropoxy)ethyl group, (3-methyl-1-iso-propylbutyloxy)ethyl group, 2-ethoxy-1-methylethyl group, 3-methoxybutyl group, (3,3,3-trifluoropropoxy)ethyl group, and (3,3,3-trichloropropoxy)ethyl group;

alkyl groups substituted by an alkoxyalkoxy group and having 3 to 15 carbon atoms such as methoxymethoxyethyl group, methoxyethoxyethyl group, ethoxyethoxyethyl group, propoxyethoxyethyl group, butoxyethoxyethyl group, cyclohexyloxyethoxyethyl group, decalyloxypropoxyethoxy group, (1,2-dimethylpropoxy)ethoxyethyl group, (3-methyl-1-iso-butylbutoxy)ethoxyethyl group, (2-methoxy-1-methylethoxy)ethyl group, (2-butoxy-1-methylethoxy)ethyl group, 2-(2'-ethoxy-1'-methylethoxy)-1-methylethyl group, (3,3,3-trifluoropropoxy)ethoxyethyl group, and (3,3,3-trichloropropoxy)ethoxyethyl group;

alkyl groups substituted by an alkoxyalkoxyalkoxy group and having 4 to 15 carbon atoms such as methoxymethoxymethoxymethyl group, methoxyethoxyethoxyethyl group, ethoxyethoxyethoxyethyl group, butoxyethoxyethoxyethyl group, cyclohexyloxyethoxyethoxyethyl group, propoxypropoxypropoxyethyl group, (2,2,2-trifluoroethoxy)ethoxyethoxyethyl group, and (2,2,2-trichloroethoxy)ethoxyethoxyethyl group;

alkyl groups substituted by an acyl group and having 2 to 10 carbon atoms such as formylmethyl group, 2-oxobutyl group, 3-oxobutyl group, 4-oxobutyl group, 2,6-dioxocyclohexan-1-yl group, and 2-oxo-5-t-butylcyclohexan-1-yl group;

alkyl groups substituted by an acyloxy group and having 2 to 15 carbon atoms such as formyloxymethyl group, acetoxyethyl group, propionyloxyethyl group, butanoyloxyethyl group, valeryloxyethyl group, (2-ethylhexanoyloxy)ethyl group, (3,5,5-trimethylhexanoyloxy)hexyl group, (3-fluorobutyryloxy)ethyl group, and (3-chlorobutyryloxy)ethyl group;

alkyl groups substituted by an acyloxyalkoxy group and having 3 to 15 carbon atoms such as formyloxymethoxyethyl group, acetoxyethoxyethyl group, propionyloxyethoxyethyl group, valeryloxyethoxyethyl group, (2-ethylhexanoyloxy)ethoxyethyl group, (3,5,5-trimethylhexanoyl)oxybutoxyethyl group, (3,5,5-trimethylhexanoyloxy)ethoxyethyl group, (2-fluoropropionyloxy)ethoxyethyl group, and (2-chloropropionyloxy)ethoxyethyl group;

alkyl groups substituted by an acyloxyalkoxyalkoxy group and having 5 to 15 carbon atoms such as acetoxymethoxymethoxymethyl group, acetoxyethoxyethoxyethyl group, propionyloxyethoxyethoxyethyl group, valeryloxyethoxyethoxyethyl group, (2-ethylhexanoyloxy)ethoxyethoxyethyl group, (3,5,5-trimethylhexanoyloxy)ethoxyethoxyethyl group, (2-fluoropropionyloxy)ethoxyethoxyethyl group, and (2-chloropropionyloxy)ethoxyethoxyethyl group;

alkyl groups substituted by an alkoxycarbonyl group and having 3 to 15 carbon atoms such as methoxycarbonylmethyl group, ethoxycarbonylmethyl group, butoxycarbonylmethyl group, methoxycarbonylethyl group, ethoxycarbonylethyl group, butoxycarbonylethyl group, (p-ethylcyclohexyloxycarbonyl)cyclohexyl group, (2,2,3,3-tetrafluoropropoxycarbonyl)methyl group, and (2,2,3,3-tetrachloropropoxycarbonyl)methyl group;

alkyl groups substituted by an aryloxycarbonyl group and having 8 to 15 carbon atoms such as phenoxycarbonylmethyl group, phenoxycarbonylethyl group, (4-t-butylphenoxycarbonyl)ethyl group, naphthyloxycarbonylmethyl group, and biphenyloxycarbonylethyl group;

alkyl groups substituted by an aralkyloxycarbonyl group and having 9 to 15 carbon atoms such as benzyloxycarbonylmethyl group, benzyloxycarbonylethyl group, phenethyloxycarbonylmethyl group, and (4-cyclohexyloxybenzyloxycarbonyl)methyl group;

alkyl groups substituted by an alkenyloxycarbonyl group and having 4 to 10 carbon atoms such as vinyloxycarbonylmethyl group, vinyloxycarbonylethyl group, allyloxycarbonylmethyl group, cyclopentadienyloxycarbonylmethyl group, and octenoxycarbonylmethyl group;

alkyl groups substituted by an alkoxycarbonyloxy group and having 3 to 15 carbon atoms such as methoxycarbonyloxymethyl group, methoxycarbonyloxyethyl group, ethoxycarbonyloxyethyl group, butoxycarbonyloxyethyl group, (2,2,2-trifluoroethoxycarbonyloxy)ethyl group, and (2,2,2-trichloroethoxycarbonyloxy)ethyl group;

alkyl groups substituted by an alkoxyalkoxycarbonyloxy group and having 4 to 15 carbon atoms such as methoxymethoxycarbonyloxymethyl group, methoxyethoxycarbonyloxyethyl group, ethoxyethoxycarbonyloxyethyl group, butoxyethoxycarbonyloxyethyl group, (2,2,2-trifluoroethoxy)ethoxycarbonyloxyethyl group, and (2,2,2-trichloroethoxy)ethoxycarbonyloxyethyl group;

alkyl groups substituted by a dialkylamino group and having 3 to 20 carbon atoms such as dimethylaminomethyl group, diethylaminomethyl group, di-n-butylaminomethyl group, di-n-hexylaminomethyl group, di-n-octylaminomethyl group, di-n-decylaminomethyl group, N-isoamyl-N-methylaminomethyl group, piperidinomethyl group, di(methoxymethyl)aminomethyl group, di(methoxyethyl)aminomethyl group, di(ethoxymethyl)aminomethyl group, di(ethoxyethyl)aminomethyl group, di(propoxyethyl)aminomethyl group, di(butoxyethyl)aminomethyl group, bis(2-cyclohexyloxyethyl)aminomethyl group, dimethylaminoethyl group, diethylaminoethyl group, di-n-butylaminoethyl group, di-n- hexylaminoethyl group, di-n-octylaminoethyl group, di-n-decylaminoethyl group, N-isoamyl-N-methylaminoethyl group, piperidinoethyl group, di(methoxymethyl)aminoethyl group, di(methoxyethyl)aminoethyl group, di(ethoxymethyl)aminoethyl group, di(ethoxyethyl) aminoethyl group, di(propoxyethyl)aminoethyl group, di(butoxyethyl)aminoethyl group, bis(2-cyclohexyloxyethyl)aminoethyl group, dimethylaminopropyl group, diethylaminopropyl group, di-n-butylaminopropyl group, di-n-hexylaminopropyl group, di-n-octylaminopropyl group, di-n-decylaminopropyl group, N-isoamyl-N-methylaminopropyl group, piperidinopropyl group, di(methoxymethyl)aminopropyl group, di(methoxyethyl)aminopropyl group, di(ethoxymethyl)aminopropyl group, di(ethoxyethyl)aminopropyl group, di(propoxyethyl)aminopropyl group, di(butoxyethyl)aminopropyl group, bis(2-cyclohexyloxyethyl)aminopropyl group, dimethylaminobutyl group, diethylaminobutyl group, di-n-butylaminobutyl group, di-n-hexylaminobutyl group, di-n-octylaminobutyl group, di-n-decylaminobutyl group, N-isoamyl-N-methylaminobutyl group, piperidinobutyl group, di(methoxymethyl)aminobutyl group, di(methoxyethyl)aminobutyl group, di(ethoxymethyl)aminobutyl group, di(ethoxyethyl)aminobutyl group, di(propoxyethyl)aminobutyl group, di(butoxyethyl)aminobutyl group, and bis(2-cyclohexyloxyethyl) aminobutyl group;

alkyl groups substituted by an acylamino group and having 3 to 10 carbon atoms such as acetylaminomethyl group, acetylaminoethyl group, propionylaminoethyl group, butanoylaminoethyl group, cyclohexanecarbonylaminoethyl group, p-methylcyclohexanecarbonylaminoethyl group, and succiniminoethyl group;

alkyl groups substituted by an alkylsulfoneamino group and having 2 to 10 carbon atoms such as methylsulfoneaminomethyl group, methylsulfoneaminoethyl group, ethylsulfoneaminoethyl group, propylsulfoneaminoethyl group, and octylsulfoneaminoethyl group;

alkyl groups substituted by an alkylsulfonyl group and having 2 to 10 carbon atoms such as methylsulfonylmethyl group, ethylsulfonylmethyl group, butylsulfonylmethyl group, methylsulfonylethyl group, ethylsulfonylethyl group, butylsulfonylethyl group, 2-ethylhexylsulfonylethyl group, 2,2,3,3-tetrafluoropropylsulfonylmethyl, and 2,2,3,3-tetrachloropropylsulfonylmethyl;

alkyl groups substituted by an arylsulfonyl group and having 7 to 12 carbon atoms such as benzenesulfonylmethyl group, benzenesulfonylethyl group, benzenesulfonylpropyl group, benzenesulfonylbutyl group, toluenesulfonylmethyl group, toluenesulfonylethyl group, toluenesulfonylpropyl group, toluenesulfonylbutyl group, xylenesulfonylmethyl group, xylenesulfonylethyl group, xylenesulfonylpropyl group, and xylenesulfonylbutyl group;

alkyl groups substituted by a heterocyclic group and having 2 to 13 carbon atoms such as thiadiazolinomethyl group, pyrrolinomethyl group, pyrrolidinomethyl group, pyrazolidinomethyl group, imidazolidinomethyl group, oxazolyl group, triazolinomethyl group, morpholinomethyl group, indolinomethyl group, benzimidazolinomethyl group, and carbazolinomethyl group:

alkyl groups substituted by a metalocenyl group and having 11 to 20 carbon atoms such as ferrocenylmethyl group, ferrocenylethyl group, ferrocenyl-n-propyl group, ferrocenyl-iso-propyl group, ferrocenyl-n-butyl group, ferrocenyl-iso-butyl group, ferrocenyl-sec-butyl group, ferrocenyl-t-butyl group, ferrocenyl-n-pentyl group, ferrocenyl-iso-pentyl group, ferrocenyl-2-methylbutyl group, ferrocenyl-1-methylbutyl group, ferrocenylneopentyl group, ferrocenyl-1,2-dimethylpropyl group, ferrocenyl-1,1-dimethylpropyl group, ferrocenylcyclopentyl group, ferrocenyl-n-hexyl group, ferrocenyl-4-methylpentyl group, ferrocenyl-3-methylpentyl group, ferrocenyl-2-methylpentyl group, ferrocenyl-1-methylpentyl group, ferrocenyl-3,3-dimethylbutyl group, ferrocenyl-2,3-dimethylbutyl group, ferrocenyl-1,3-dimethylbutyl group, ferrocenyl-2,2-dimethylbutyl group, ferrocenyl-1,2-dimethylbutyl group, ferrocenyl-1,1-dimethylbutyl group, ferrocenyl-3-ethylbutyl group, ferrocenyl-2-ethylbutyl group, ferrocenyl-1-ethylbutyl group, ferrocenyl-1,2,2-trimethylbutyl group, ferrocenyl-1,1,2-trimethylbutyl group, ferrocenyl-1-ethyl-2-methylpropyl group, ferrocenylcyclohexyl group, ferrocenyl-n-heptyl group, ferrocenyl-2-methylhexyl group, ferrocenyl-3-methylhexyl group, ferrocenyl-4-methylhexyl group, ferrocenyl-5-methylhexyl group, ferrocenyl-2,4-dimethylpentyl group, ferrocenyl-n-octyl group, ferrocenyl-2-ethylhexyl group, ferrocenyl-2,5-dimethylhexyl group, ferrocenyl-2,5,5-trimethylpentyl group, ferrocenyl-2,4-dimethylhexyl group, ferrocenyl-2,2,4-trimethylpentyl group, ferrocenyl-3,5,5-trimethylhexyl group, ferrocenyl-n-nonyl group, ferrocenyl-n-decyl group, cobaltocenylmethyl group, cobaltocenylethyl group, cobaltocenyl-n-propyl group, cobaltocenyl-iso-propyl group, cobaltocenyl-n-butyl group, cobaltocenyl-iso-butyl group, cobaltocenyl-sec-butyl group, cobaltocenyl-t-butyl group, cobaltocenyl-n-pentyl group, cobaltocenyl-iso-pentyl group, cobaltocenyl-2-methylbutyl group, cobaltocenyl-1-methylbutyl group, cobaltocenylneopentyl group, cobaltocenyl-1,2-dimethylpropyl group, cobaltocenyl-1,1-dimethylpropyl group, cobaltocenylcyclopentyl group, cobaltocenyl-n-hexyl group, cobaltocenyl-4-methylpentyl group, cobaltocenyl-3-methylpentyl group, cobaltocenyl-2-methylpentyl group, cobaltocenyl-1-methylpentyl group, cobaltocenyl-3,3-dimethylbutyl group, cobaltocenyl-2,3-dimethylbutyl group, cobaltocenyl-1,3-dimethylbutyl group, cobaltocenyl-2,2-dimethylbutyl group, cobaltocenyl-1,2-dimethylbutyl group, cobaltocenyl-1,1-dimethylbutyl group, cobaltocenyl-3-ethylbutyl group, cobaltocenyl-2-ethylbutyl group, cobaltocenyl-1-ethylbutyl group, cobaltocenyl-1,2,2-trimethylbutyl group, cobaltocenyl-1,1,2-trimethylbutyl group, cobaltocenyl-1-ethyl-2-methylpropyl group, cobaltocenylcyclohexyl group, cobaltocenyl-n-heptyl group, cobaltocenyl-2-methylhexyl group, cobaltocenyl-3-methylhexyl group, cobaltocenyl-4-methylhexyl group, cobaltocenyl-5-methylhexyl group, cobaltocenyl-2,4-dimethylpentyl group, cobaltocenyl-n-octyl group, cobaltocenyl-2-ethylhexyl group, cobaltocenyl-2,5-dimethylhexyl group, cobaltocenyl-2,5,5-trimethylpentyl group, cobaltocenyl-2,4-dimethylhexyl group, cobaltocenyl-2,2,4-trimethylpentyl group, cobaltocenyl-3,5,5-trimethylhexyl group, cobaltocenyl-n-nonyl group, cobaltocenyl-n-decyl group, nickelocenylmethyl group, nickelocenylethyl group, nickelocenyl-n-propyl group, nickelocenyl-iso-propyl group, nickelocenyl-n-butyl group, nickelocenyl-iso-butyl group, nickelocenyl-sec-butyl group, nickelocenyl-t-butyl group, nickelocenyl-n-pentyl group, nickelocenyl-iso-pentyl group, nickelocenyl-2-methylbutyl group, nickelocenyl-1-methylbutyl group, nickelocenylneopentyl group, nickelocenyl-1,2-dimethylpropyl group, nickelocenyl-1,1-dimethylpropyl group, nickelocenylcyclopentyl group, nickelocenyl-n-hexyl group, nickelocenyl-4-methylpentyl group, nickelocenyl-3-methylpentyl group, nickelocenyl-2-methylpentyl group, nickelocenyl-1-methylpentyl group, nickelocenyl-3,3-dimethylbutyl group, nickelocenyl-2,3- dimethylbutyl group, nickelocenyl-1,3-dimethylbutyl group, nickelocenyl-2,2-dimethylbutyl group, nickelocenyl-1,2-dimethylbutyl group, nickelocenyl-1,1-dimethylbutyl group, nickelocenyl-3-ethylbutyl group, nickelocenyl-2-ethylbutyl group, nickelocenyl-1-ethylbutyl group, nickelocenyl-1,2,2-trimethylbutyl group, nickelocenyl-1,1,2-trimethylbutyl group, nickelocenyl-1-ethyl-2-methylpropyl group, nickelocenylcyclohexyl group, nickelocenyl-n-heptyl group, nickelocenyl-2-methylhexyl group, nickelocenyl-3-methylhexyl group, nickelocenyl-4-methylhexyl group, nickelocenyl-5-methylhexyl group, nickelocenyl-2,4-dimethylpentyl group, nickelocenyl-n-octyl group, nickelocenyl-2-ethylhexyl group, nickelocenyl-2,5-dimethylhexyl group, nickelocenyl-2,5,5-trimethylpentyl group, nickelocenyl-2,4-dimethylhexyl group, nickelocenyl-2,2,4-trimethylpentyl group, nickelocenyl-3,5,5-trimethylhexyl group, nickelocenyl-n-nonyl group, nickelocenyl-n-decyl group, dichlorotitanocenylmethyl group, trichlorotitaniumcyclopentadienylmethyl group, bis(trifluoromethanesulfonato) titanocenemethyl group dichlorozirconocenylmethyl group, dimethylzirconocenylmethyl group, diethoxyzirconocenylmethyl group, bis(cyclopentadienyl)chromium-methyl group, bis(cyclopentadienyl)dichloromolybdenum-methyl group, bis(cyclopentadienyl)dichlorohafnium-methyl group, bis(cyclopentadienyl)dichloroniobium-methyl group, bis(cyclopentadienyl)ruthenium-methyl group, bis(cyclopentadienyl)vanadium-methyl group, and bis(cyclopentadienyl)dichlorovanadium-methyl group;

alkyl groups substituted by a metalocenylalkyloxy group and having 12 to 30 carbon atoms such as ferrocenylmethoxymethyl group, ferrocenylmethoxyethyl group, ferrocenylmethoxypropyl group, ferrocenylmethoxybutyl group, ferrocenylmethoxypentyl group, ferrocenylmethoxyhexyl group, ferrocenylmethoxyheptyl group, ferrocenylmethoxyoctyl group, ferrocenylmethoxynonyl group, ferrocenylmethoxydecyl group, ferrocenylethoxymethyl group, ferrocenylethoxyethyl group, ferrocenylethoxypropyl group, ferrocenylethoxybutyl group, ferrocenylethoxypentyl group, ferrocenylethoxyhexyl group, ferrocenylethoxyheptyl group, ferrocenylethoxyoctyl group, ferrocenylethoxynonyl group, ferrocenylethoxydecyl group, ferrocenylpropoxymethyl group, ferrocenylpropoxyethyl group, ferrocenylpropoxypropyl group, ferrocenylpropoxybutyl group, ferrocenylpropoxypentyl group, ferrocenylpropoxyhexyl group, ferrocenylpropoxyheptyl group, ferrocenylpropoxyoctyl group, ferrocenylpropoxynonyl group, ferrocenylpropoxydecyl group, ferrocenylbutoxymethyl group, ferrocenylbutoxyethyl group, ferrocenylbutoxypropyl group, ferrocenylbutoxybutyl group, ferrocenylbutoxypentyl group, ferrocenylbutoxyhexyl group, ferrocenylbutoxyheptyl group, ferrocenylbutoxyoctyl group, ferrocenylbutoxynonyl group, ferrocenylbutoxydecyl group, ferrocenyldecyloxymethyl group, ferrocenyldecyloxyethyl group, ferrocenyldecyloxypropyl group, ferrocenyldecyloxybutyl group, ferrocenyldecyloxypentyl group, ferrocenyldecyloxyhexyl group, ferrocenyldecyloxyheptyl group, ferrocenyldecyloxyoctyl group, ferrocenyldecyloxynonyl group, ferrocenyldecyloxydecyl group, cobaltocenylmethoxymethyl group, cobaltocenylmethoxyethyl group, cobaltocenylmethoxypropyl group, cobaltocenylmethoxybutyl group, cobaltocenylmethoxypentyl group, cobaltocenylmethoxyhexyl group, cobaltocenylmethoxyheptyl group, cobaltocenylmethoxyoctyl group, cobaltocenylmethoxynonyl group, cobaltocenylmethoxydecyl group, cobaltocenylethoxymethyl group, cobaltocenylethoxyethyl group, cobaltocenylethoxypropyl group, cobaltocenylethoxybutyl group, cobaltocenylethoxypentyl group, cobaltocenylethoxyhexyl group, cobaltocenylethoxyheptyl group, cobaltocenylethoxyoctyl group, cobaltocenylethoxynonyl group, cobaltocenylethoxydecyl group, cobaltocenylpropoxymethyl group, cobaltocenylpropoxyethyl group, cobaltocenylpropoxypropyl group, cobaltocenylpropoxybutyl group, cobaltocenylpropoxypentyl group, cobaltocenylpropoxyhexyl group, cobaltocenylpropoxyheptyl group, cobaltocenylpropoxyoctyl group, cobaltocenylpropoxynonyl group, cobaltocenylpropoxydecyl group, cobaltocenylbutoxymethyl group, cobaltocenylbutoxyethyl group, cobaltocenylbutoxypropyl group, cobaltocenylbutoxybutyl group, cobaltocenylbutoxypentyl group, cobaltocenylbutoxyhexyl group, cobaltocenylbutoxyheptyl group, cobaltocenylbutoxyoctyl group, cobaltocenylbutoxynonyl group, cobaltocenylbutoxydecyl group, cobaltocenyldecyloxymethyl group, cobaltocenyldecyloxyethyl group, cobaltocenyldecyloxypropyl group, cobaltocenyldecyloxybutyl group, cobaltocenyldecyloxypentyl group, cobaltocenyldecyloxyhexyl group, cobaltocenyldecyloxyheptyl group, cobaltocenyldecyloxyoctyl group, cobaltocenyldecyloxynonyl group, cobaltocenyldecyloxydecyl group, nickelocenylmethoxymethyl group, nickelocenylmethoxyethyl group, nickelocenylmethoxypropyl group, nickelocenylmethoxybutyl group, nickelocenylmethoxypentyl group, nickelocenylmethoxyhexyl group, nickelocenylmethoxyheptyl group, nickelocenylmethoxyoctyl group, nickelocenylmethoxynonyl group, nickelocenylmethoxydecyl group, nickelocenylethoxymethyl group, nickelocenylethoxyethyl group, nickelocenylethoxypropyl group, nickelocenylethoxybutyl group, nickelocenylethoxypentyl group, nickelocenylethoxyhexyl group, nickelocenylethoxyheptyl group, nickelocenylethoxyoctyl group, nickelocenylethoxynonyl group, nickelocenylethoxydecyl group, nickelocenylpropoxymethyl group, nickelocenylpropoxyethyl group, nickelocenylpropoxypropyl group, nickelocenylpropoxybutyl group, nickelocenylpropoxypentyl group, nickelocenylpropoxyhexyl group, nickelocenylpropoxyheptyl group, nickelocenylpropoxyoctyl group, nickelocenylpropoxynonyl group, nickelocenylpropoxydecyl group, nickelocenylbutoxymethyl group, nickelocenylbutoxyethyl group, nickelocenylbutoxypropyl group, nickelocenylbutoxybutyl group, nickelocenylbutoxypentyl group, nickelocenylbutoxyhexyl group, nickelocenylbutoxyheptyl group, nickelocenylbutoxyoctyl group, nickelocenylbutoxynonyl group, nickelocenylbutoxydecyl group, nickelocenyldecyloxymethyl group, nickelocenyldecyloxyethyl group, nickelocenyldecyloxypropyl group, nickelocenyldecyloxybutyl group, nickelocenyldecyloxypentyl group, nickelocenyldecyloxyhexyl group, nickelocenyldecyloxyheptyl group, nickelocenyldecyloxyoctyl group, nickelocenyldecyloxynonyl group, nickelocenyldecyloxydecyl group, dichlorotitanocenylmethoxymethyl group, trichlorotitaniumcyclopentadienyl methoxyethyl group, bis(trifluoromethanesulfonato)titanocene methoxypropyl group, dichlorozirconocenylmethoxybutyl group, dimethylzirconocenylmethoxypentyl group, diethoxyzirconocenylmethoxymethyl group, bis(cyclopentadienyl)chromium-methoxyhexyl group, bis(cyclopentadienyl)dichlorohafnium-methoxymethyl group, bis(cyclopentadienyl)dichloroniobium-methoxyoctyl group, bis(cyclopentadienyl)ruthenium-methoxymethyl group, bis(cyclopentadienyl)vanadium-methoxymethyl group, bis(cyclopentadienyl)dichlorovanadium-methoxyethyl group, and osmocenylmethoxyethyl group;

alkyl groups substituted by a metalocenylcarbonyloxy group and having 12 to 30 carbon atoms such as ferrocenecarbonyloxymethyl group, ferrocenecarbonyloxyethyl group, ferrocenecarbonyloxypropyl group, ferrocenecarbonyloxybutyl group, ferrocenecarbonyloxypentyl group, ferrocenecarbonyloxyhexyl group, ferrocenecarbonyloxyheptyl group, ferrocenecarbonyloxyoctyl group, ferrocenecarbonyloxynonyl group, ferrocenecarbonyloxydecyl group, cobaltocenecarbonyloxymethyl group, cobaltocenecarbonyloxyethyl group, cobaltocenecarbonyloxypropyl group, cobaltocenecarbonyloxybutyl group, cobaltocenecarbonyloxypentyl group, cobaltocenecarbonyloxyhexyl group, cobaltocenecarbonyloxyheptyl group, cobaltocenecarbonyloxyoctyl group, cobaltocenecarbonyloxynonyl group, cobaltocenecarbonyloxydecyl group, nickelocenecarbonyloxymethyl group, nickelocenecarbonyloxyethyl group, nickelocenecarbonyloxypropyl group, nickelocenecarbonyloxybutyl group, nickelocenecarbonyloxypentyl group, nickelocenecarbonyloxyhexyl group, nickelocenecarbonyloxyheptyl group, nickelocenecarbonyloxyoctyl group, nickelocenecarbonyloxynonyl group, nickelocenecarbonyloxydecyl group, dichlorotitanocenycarbonyloxymethyl group, trichlorotitaniumcyclopentadienyl carbonyloxyethyl group, bis (trifluoromethanesulfonato)titanocene carbonyloxymethoxypropyl group, dichlorozirconocenecarbonyloxybutyl group, dimethylzirconocenecarbonyloxypentyl group, diethoxyzirconocenecarbonyloxymethyl group, bis (cyclopentadienyl)chromiumcarbonyloxyhexyl group, bis (cyclopentadienyl)dichlorohafniumcarbonyloxymethyl group, bis(cyclopentadienyl) dichloroniobiumcarbonyloxyoctyl group, bis (cyclopentadienyl)rutheniumcarbonyloxymethyl group, bis (cyclopentadienyl)vanadiumcarbonyloxymethyl group, bis (cyclopentadienyl)dichlorovanadiumcarbonyloxyethyl group, and bis(cyclopentadienyl)osmiumcarbonyloxyethyl group;

Examples of the substituted or unsubstituted aralkyloxy groups represented by $R^1$ to $R^8$ are aralkyloxy groups having a substituent which is similar to that of the alkyl groups mentioned above, and preferably include aralkyl groups having 7 to 15 carbon atoms such as benzyloxy group, nitrobenzyloxy group, cyanobenzyloxy group, hydroxybenzyloxy group, methylbenzyloxy group, trifluoromethylbenzyloxy group, naphthylmethoxy group, nitronaphthylmethoxy group, cyanonaphthylmethoxy group, hydroxynaphthylmethoxy group, methylnaphthylmethoxy group, trifluoromethylnaphthylmethoxy group, and fluoren-9-ylethoxy group;

Examples of the substituted or unsubstituted aryloxy groups represented by $R^1$ to $R^8$ are aryloxy groups having a substituent which is similar to that of the alkyl groups mentioned above, and preferably include aryloxy groups having 6 to 18 carbon atoms such as phenoxy group, 2-methylphenoxy group, 4-methylphenoxy group, 4-t-butylphenoxy group, 2-methoxyphenoxy group, 4-iso-propylphenoxy group, naphthoxy group, ferrocenyloxy group, cobaltocenyloxy group, nickelocenyloxy group, octamethylferrocenyloxy group, octamethylcobaltocenyloxy group, and octamethylnickelocenyloxy group;

Examples of the substituted or unsubstituted alkenyloxy groups represented by $R^1$ to $R^8$ are alkenyloxy groups having a substituent which is similar to that of the alkyl groups mentioned above, and preferably include alkenyloxy groups having 2 to 10 carbon atoms such as vinyloxy group, propenyloxy group, 1-butenyloxy group, iso-butenyloxy group, 1-pentenyloxy group, 2-pentenyloxy group, 2-methyl-1-butenyloxy group, 3-methyl-1-butenyloxy group, 2-methyl-2-butenyloxy group, cyclopentadienyloxy group, 2,2-dicyanovinyloxy group, 2-cyano-2-methylcarboxylvinyloxy group, 2-cyano-2-methylsulfonevinyloxy group, styryloxy group, 4-phenyl-2-butenyloxy group, and a cinnamylalkoxy group;

Examples of the substituted or unsubstituted alkylthio groups represented by $R^1$ to $R^8$ are alkylthio groups having a substituent which is similar to that of the alkyl groups mentioned above, and preferably include alkylthio groups having 1 to 10 carbon atoms such as methylthio group, ethylthio group, n-propylthio group, iso-propylthio group, n-butylthio group, iso-butylthio group, sec-butylthio group, t-butylthio group, n-pentylthio group, iso-pentylthio group, neopentylthio group, 2-methylbutylthio group, methylcarboxylethylthio group, 2-ethylhexylthio group, 3,5,5-trimethylhexylthio group, and decalylthio group Examples of the substituted or unsubstituted aralkylthio groups represented by $R^1$ to $R^8$ are aralkylthio groups having a substituent which is similar to that of the alkyl groups mentioned above, and preferably include aralkyl groups having 7 to 12 carbon atoms such as benzylthio group, nitrobenzylthio group, cyanobenzylthio group, hydroxybenzylthio group, methylbenzylthio group, trifluoromethylbenzylthio group, naphthylmethylthio group, nitronaphthylmethylthio group, cyanonaphthylmethylthio group, hydroxynaphthylmethylthio group, methylnaphthylmethylthio group, trifluoromethylnaphthylmethylthio group, and fluoren-9-ylethylthio group;

Examples of the substituted or unsubstituted arylthio groups represented by $R^1$ to $R^8$ are arylthio groups having a substituent which is similar to that of the alkyl groups mentioned above, and preferably include arylthio groups having 6 to 10 carbon atoms such as phenylthio group, 4-methylphenylthio group, 2-methoxyphenylthio group, 4-t-butylphenylthio group, naphthylthio group, ferrocenylthio group, cobaltcenylthio group, nickelocenylthio group, octamethylferrocenylthio group, octamethylcobaltocenylthio group, and octamethylnickelocenylthio group;

Examples of the substituted or unsubstituted alkenylthio groups represented by $R^1$ to $R^8$ are alkenylthio groups having a substituent which is similar to that of the alkyl groups mentioned above, and preferably include alkenylthio groups having 2 to 10 carbon atoms such as vinylthio group, allylthio group, butenylthio group, hexanedienylthio group, cyclopentadienylthio group, styrylthio group, cyclohexenylthio group, and decenylthio group;

Examples of the substituted or unsubstituted monosubstituted amino groups represented by $R^1$ to $R^8$ are monosubstituted amino groups having a substituent which is similar to that of the alkyl groups mentioned above, and preferably include monoalkylamino groups having 1 to 10 carbon atoms such as methylamino group, ethylamino group, propylamino group, butylamino group, pentylamino group, hexylamino group, heptylamino group, octylamino group, (2-ethylhexyl)amino group, cyclohexylamino group, (3,5,5-trimethylhexyl)amino group, nonylamino group, and decylamino group;

monoaralkylamino groups having 7 to 10 carbon atoms such as benzylamino group, phenethylamino group, (3-phenylpropyl)amino group, (4-ethylbenzyl)amino group, (4-isopropylbenzyl)amino group, (4-methylbenzyl)amino group, (4-ethylbenzyl)amino group, (4-allylbenzyl)amino group, [4-(2-cyanoethyl)benzyl]amino group, and [4-(2-acetoxyethyl)benzyl]amino group;

monoarylamino groups having 7 to 10 carbon atoms such as anilino group, naphthylamino group, toluidino group, xylidino group, ethylanilino group, isopropylanilino group, methoxyanilino group, ethoxyanilino group, chloroanilino group, acetylanilino group, methoxycarbonylanilino group, ethoxycarbonylanilino group, propoxycarbonylanilino group, 4-methylanilino group, 4-ethylanilino group, ferrocenylamino group, cobaltcenylamino group, nickelocenylamino group, zirconocenylamino group, octamethylferrocenylamino group, octamethylcobaltocenylamino group, octamethylnickelocenylamino group, and octamethylzirconocenylamino group;

monoalkenylamino groups having 2 to 10 carbon atoms such as vinylamino group, allylamino group, butenylamino group, pentenylamino group, hexenylamino group, cyclohexenylamino group, cyclopentadienylamino group, octadienylamino group, and adamantenylamino group;

acylamino groups having 1 to 16 carbon atoms such as formylamino group, methylcarbonylamino group, ethylcarbonylamino group, n-propylcarbonylamino group, iso-propylarbonylamino group, n-butylcarbonylamino group, iso-butylcarbonylamino group, sec-butylcarbonylamino group, t-butylcarbonylamino group, n-pentylcarbonylamino group, iso-pentylcarbonylamino group, neopentylcarbonylamino group, 2-methylbutylcarbonylamino group, benzoylamino group, methylbenzoylamino group, ethylbenzoylamino group, tolylcarbonylamino group, propylbenzoylamino group, 4-t-butylbenzoylamino group, nitrobenzylcarbonylamino group, 3-butyoxy-2-naphthoylamino group, cinnamoylamino group, ferrocenecarbonylamino group, 1-methylferrocene-1'-carbonylamino group, cobaltocenecarbonylamino group, and nickelocenecarbonylamino group;

Examples of the substituted or unsubstituted disubstituted amino groups represented by $R^1$ to $R^8$ are disubstituted amino groups having a substituent which is similar to that of the alkyl groups mentioned above, and preferably include dialkylamino groups having 2 to 16 carbon atoms such as dimethylamino group, diethylamino group, methylethylamino group, dipropylamino group, dibutylamino group, di-n-hexylamino group, dicyclohexylamino group, dioctylamino group, bis(methoxyethyl)amino group, bis(ethoxyethyl)amino group, bis(propoxyethyl)amino group, bis(butoxyethyl)amino group, di(acetyloxyethyl)amino group, di(hydroxyethyl)amino group, N-ethyl-N-(2-cyanoethyl)amino group, and di(propionyloxyethyl)amino group;

diaralkylamino groups having 14 to 20 carbon atoms such as dibenzylamino group, diphenethylamino group, bis(4-ethylbenzyl)amino group, and bis(4-isopropylbenzyl)amino group;

diarylamino groups having 12 to 14 carbon atoms such as diphenylamino group, ditolylamino group, and N-phenyl-N-tolylamino group;

dialkenylamino groups having 4 to 12 carbon atoms such as divinylamino group, diallylamino group, dibutenylamino group, dipentenylamino group, dihexenylamino group, bis(cyclopentadienyl)amino group, and N-vinyl-N-allylamino group;

diacylamino groups having 2 to 30 carbon atoms such as diformylamino group, di(methylcarbonyl)amino group, di(ethylcarbonyl)amino group, di(n-propylcarbonyl)amino group, di(iso-propylarbonyl)amino group, di(n-butylcarbonyl)amino group, di(iso-butylcarbonyl)amino group, sec-butylcarbonyl)amino group, di(t-butylcarbonyl)amino group, di(n-pentylcarbonyl)amino group, di(iso-pentylcarbonyl)amino group, di(neopentylcarbonyl)amino group, di(2-methylbutylcarbonyl)amino group, di(benzoylamino group, di(methylbenzoylamino group, di(ethylbenzoylamino group, di(tolylcarbonyl)amino group, di(propylbenzoylamino group, di(4-t-butylbenzoyl)amino group, di(nitrobenzylcarbonyl)amino group, di(3-butyoxy-2-naphthoyl)amino group, di(cinnamoyl)amino group, and succinoylimino group;

disubstituted amino groups having a substituent selected from substituted or unsubstituted alkyl groups, aralkyl groups, aryl groups, and alkenyl groups and having 3 to 24 carbon atoms such as N-phenyl-N-allylamino group, N-(2-acetyloxyethyl)-N-ethylamino group, N-tolyl-N-methylamino group, N-vinyl-N-methylamino group, N-benzyl-N-allylamino group, N-methyl-ferrocenylamino group, N-ethyl-cobaltocenylamino group, N-butyl-nickelocenylamino group, N-hexyl-octamethylferrocenylamino group, N-methyl-octamethylcobaltocenylamino group, and N-methyl-octamethylnickelocenylamino group;

Examples of the substituted or unsubstituted acyl groups represented by $R^1$ to $R^8$ are acyl groups having a substituent which is similar to that of the alkyl groups mentioned above, and preferably include acyl groups having 1 to 16 carbon atoms such as formyl group, methylcarbonyl group, ethylcarbonyl group, n-propylcarbonyl group, iso-propylarbonyl group, n-butylcarbonyl group, iso-butylcarbonyl group, sec-butylcarbonyl group, t-butylcarbonyl group, n-pentylcarbonyl group, iso-pentylcarbonyl group, neopentylcarbonyl group, 2-methylbutylcarbonyl group, benzoyl group, methylbenzoyl group, ethylbenzoyl group, tolylcarbonyl group, propylbenzoyl group, 4-t-butylbenzoyl group, nitrobenzylcarbonyl group, 3-butyloxy-2-naphthoyl group, cinnamoyl group, ferrocenecarbonyl group, 1-methylferrocene-1'-carbonyl group, cobaltocenecarbonyl group, and nickelocenecarbonyl group;

Examples of the substituted or unsubstituted alkoxycarbonyl groups represented by $R^1$ to $R^8$ are alkoxycarbonyl groups having a substituent which is similar to that of the alkyl groups mentioned above, and preferably include alkoxycarbonyl groups having 2 to 11 carbon atoms such as methoxycarbonyl group, ethoxycarbonyl group, n-propoxycarbonyl group, isopropoxyarbonyl group, n-butoxycarbonyl group, isobutoxycarbonyl group, sec-butoxycarbonyl group, t-butoxycarbonyl group, n-pentoxycarbonyl group, isopentoxycarbonyl group, neopentoxycarbonyl group, 2-pentoxycarbonyl group, 2-ethylhexyloxycarbonyl group, 3,5,5-trimethylhexyloxycarbonyl group, decalyloxycarbonyl group, cyclohexyloxycarbonyl group, chloroethoxycarbonyl group, hydroxymethoxycarbonyl group, and hydroxyethoxycarbonyl group;

alkoxycarbonyl groups having 3 to 11 carbon atoms such as methoxymethoxycarbonyl group, methoxyethoxycarbonyl group, ethoxyethoxycarbonyl group, propoxyethoxycarbonyl group, butoxyethoxycarbonyl group, pentoxyethoxycarbonyl group, hexyloxyethoxycarbonyl group, butoxybutoxycarbonyl group, hexyloxybutoxycarbonyl group, hydroxymethoxymethoxycarbonyl group, and hydroxyethoxyethoxycarbonyl group;

alkoxycarbonyl groups substituted by an alkoxyalkoxy group and having 4 to 11 carbon atoms such as methoxymethoxymethoxycarbonyl group, methoxyethoxyethoxycarbonyl group, ethoxyethoxyethoxycarbonyl group, propoxyethoxyethoxycarbonyl group, butoxyethoxyethoxycarbonyl group, pentoxyethoxyethoxycarbonyl group, and hexyloxyethoxyethoxycarbonyl group;

alkoxycarbonyl groups substituted by a metalocenyl group and having 11 to 20 carbon atoms such as ferrocenylmethoxycarbonyl group, ferrocenylethoxycarbonyl group, ferrocenylpropoxycarbonyl group, ferrocenylbutoxycarbonyl group, ferrocenylpentyloxycarbonyl group, ferrocenylhexyloxycarbonyl group, ferrocenylheptyloxycarbonyl group, ferrocenyloctyloxycarbonyl group, ferrocenylnonyloxycarbonyl group, ferrocenyldecyloxycarbonyl group, cobaltocenylmethoxycarbonyl group, cobaltocenylethoxycarbonyl group, cobaltocenylpropoxycarbonyl group, cobaltocenylbutoxycarbonyl group, cobaltocenylpentyloxycarbonyl group, cobaltocenylhexyloxycarbonyl group, cobaltocenylheptyloxycarbonyl group, cobaltocenyloctyloxycarbonyl group, cobaltocenylnonyloxycarbonyl group, cobaltocenyldecyloxycarbonyl group, nickelocenylmethoxycarbonyl group, nickelocenylethoxycarbonyl group, nickelocenylpropoxycarbonyl group, nickelocenylbutoxycarbonyl group, nickelocenylpentyloxycarbonyl group, nickelocenylhexyloxycarbonyl group, nickelocenylheptyloxycarbonyl group, nickelocenyloctyloxycarbonyl group, nickelocenylnonyloxycarbonyl group, nickelocenyldecyloxycarbonyl group, dichlorotitanocenylmethoxycarbonyl group, trichlorotitaniumcyclopentadienylmethoxycarbonyl group, bis(trifluoromethanesulfonato)titanocenemethoxycarbonyl group, dichlorozirconocenylmethoxycarbonyl group, dimethylzirconocenylmethoxycarbonyl group, diethoxyzirconocenylmethoxycarbonyl group, bis(cyclopentadienyl)chromium-methoxycarbonyl group, bis(cyclopentadienyl)dichlorohafnium-methoxycarbonyl group, bis(cyclopentadienyl)dichloroniobium-methoxycarbonyl group, bis(cyclopentadienyl)ruthenium-methoxycarbonyl group, bis(cyclopentadienyl)dichlorovanadium-methoxycarbonyl, and bis(cyclopentadienyl)osmium-methoxycarbonyl group;

Examples of the substituted or unsubstituted aralkyloxycarbonyl groups represented by $R^1$ to $R^8$ are aralkyloxycarbonyl groups having a substituent which is similar to that of the alkyl groups mentioned above, and preferably include aralkyloxycarbonyl groups having 8 to 16 carbon atoms such as benzyloxycarbonyl group, nitrobenzyloxycarbonyl group, cyanobenzyloxycarbonyl group, hydroxybenzyloxycarbonyl group, methylbenzyloxycarbonyl group, trifluoromethylbenzyloxycarbonyl group, naphthylmethoxycarbonyl group, nitronaphthylmethoxycarbonyl group, cyanonaphthylmethoxycarbonyl group, hydroxynaphthylmethoxycarbonyl group, methylnaphthylmethoxycarbonyl group, trifluoromethylnaphthylmethoxycarbonyl group, and fluoren-9-ylethoxycarbonyl group;

Examples of the substituted or unsubstituted aryloxycarbonyl groups represented by $R^1$ to $R^8$ are aryloxycarbonyl groups having a substituent which is similar to that of the alkyl groups mentioned above, and preferably include aryloxycarbonyl groups having 7 to 11 carbon atoms such as phenoxycarbonyl group, 2-methylphenoxycarbonyl group, 4-methylphenoxycarbonyl group, 4-t-butylphenoxycarbonyl group, 2-methoxyphenoxycarbonyl group, 4-isopropylphenoxycarbonyl group, naphthoxycarbonyl group, ferrocenyloxycarbonyl group, cobaltocenyloxycarbonyl group, nickelocenyloxycarbonyl group, zirconocenyloxycarbonyl group, octamethylferrocenyloxycarbonyl group, octamethylcobaltocenyloxycarbonyl group, octamethylnickelocenyloxycarbonyl group, and octamethylzirconocenyloxycarbonyl group;

Examples of the substituted or unsubstituted alkenyloxycarbonyl groups represented by $R^1$ to $R^8$ are alkenyloxycarbonyl groups having a substituent which is similar to that of the alkyl groups mentioned above, and preferably include alkenyloxycarbonyl groups having 3 to 11 carbon atoms such as vinyloxycarbonyl group, propenyloxycarbonyl group, 1-butenyloxycarbonyl group, iso-butenyloxycarbonyl group, 1-pentenyloxycarbonyl group, 2-pentenyloxycarbonyl group, cyclopentadienyloxycarbonyl group, 2-methyl-1-butenyloxycarbonyl group, 3-methyl-1-butenyloxycarbonyl group, 2-methyl-2-butenyloxycarbonyl group, cyclopentadienyloxycarbonyl group, 2,2-dicyanovinyloxycarbonyl group, 2-cyano-2-methylcarboxyvinyloxycarbonyl group, 2-cyano-2-methylsulfonevinyloxycarbonyl group, styryloxycarbonyl group, and 4-phenyl-2-butenyloxycarbonyl group;

Examples of the substituted or unsubstituted monosubstituted aminocarbonyl groups represented by $R^1$ to $R^8$ are monosubstituted aminocarbonyl groups having a substituent which is similar to that of the alkyl groups mentioned above, and preferably include monoalkylaminocarbonyl groups having 2 to 11 carbon atoms such as methylaminocarbonyl group, ethylaminocarbonyl group, propylaminocarbonyl group, butylaminocarbonyl group, pentylaminocarbonyl group, hexylaminocarbonyl group, heptylaminocarbonyl group, octylaminocarbonyl group, (2-ethylhexyl)aminocarbonyl group, cyclohexylaminocarbonyl group, (3,5,5-trimethylhexyl)aminocarbonyl group, nonylaminocarbonyl group, and decylaminocarbonyl group;

monoaralkylaminocarbonyl groups having 8 to 11 carbon atoms such as benzylaminocarbonyl group, phenethylaminocarbonyl group, (3-phenylpropyl)aminocarbonyl group, (4-ethylbenzyl)aminocarbonyl group, (4-isopropylbenzyl)aminocarbonyl group, (4-methylbenzyl)aminocarbonyl group, (4-ethylbenzyl)aminocarbonyl group, (4-allylbenzyl)aminocarbonyl group, [4-(2-cyanoethyl)benzyl]aminocarbonyl group, and [4-(2-acetoxyethyl)benzyl]aminocarbonyl group;

monoarylaminocarbonyl groups having 7 to 11 carbon atoms such as anilinocarbonyl group, naphthylaminocarbonyl group, toluidinocarbonyl group, xylidinocarbonyl group, ethylanilinocarbonyl group, isopropylanilinocarbonyl group, methoxyanilinocarbonyl group, ethoxyanilinocarbonyl group, chloroanilinocarbonyl group, acetylanilinocarbonyl group, methoxycarbonylanilinocarbonyl group, ethoxycarbonylanilinocarbonyl group, propoxycarbonylanilinocarbonyl group, 4-methylanilino group, and 4-ethylanilinocarbonyl group;

monoalkenylaminocarbonyl groups having 3 to 11 carbon atoms such as vinylaminocarbonyl group, allylaminocarbonyl group, butenylaminocarbonyl group, pentenylaminocarbonyl group, hexenylaminocarbonyl group, cyclohexenylaminocarbonyl group, octadienylaminocarbonyl group, and adamantenylaminocarbonyl group;

Examples of the substituted or unsubstituted disubstituted aminocarbonyl groups represented by $R^1$ to $R^8$ are disubstituted aminocarbonyl groups having a substituent which is similar to that of the alkyl groups mentioned above, and preferably include dialkylaminocarbonyl groups having 3 to 17 carbon atoms such as dimethylaminocarbonyl group, diethylaminocarbonyl group, methylethylaminocarbonyl group, dipropylaminocarbonyl group, dibutylaminocarbonyl group, di-n-hexylaminocarbonyl group, dicyclohexylaminocarbonyl group, dioctylaminocarbonyl group, pyrrolidinocarbonyl group, piperidinocarbonyl group, morpholinocarbonyl group, bis(methoxyethyl)aminocarbonyl group, bis(ethoxyethyl)aminocarbonyl group, bis(propoxyethyl)aminocarbonyl group, bis(butoxyethyl)aminocarbonyl group, di(acetyloxyethyl)aminocarbonyl group, di(hydroxyethyl)aminocarbonyl group, N-ethyl-N-(2-cyanoethyl)aminocarbonyl group, and di(propionyloxyethyl)aminocarbonyl group;

diaralkylaminocarbonyl groups having 15 to 21 carbon atoms such as dibenzylaminocarbonyl group, diphenethylaminocarbonyl group, bis(4-ethylbenzyl)aminocarbonyl group, and bis(4-isopropylbenzyl)aminocarbonyl group;

diarylaminocarbonyl groups having 13 to 15 carbon atoms such as diphenylaminocarbonyl group, ditolylaminocarbonyl group, and N-phenyl-N-tolylaminocarbonyl group;

dialkenylaminocarbonyl groups having 5 to 13 carbon atoms such as divinylaminocarbonyl group, diallylaminocarbonyl group, dibutenylaminocarbonyl group, dipentenylaminocarbonyl group, dihexenylaminocarbonyl group, and N-vinyl-N-allylaminocarbonyl group;

disubstituted aminocarbonyl groups having a substituent selected from substituted or unsubstituted alkyl groups, aralkyl groups, aryl groups, and alkenyl groups and having 4 to 11 carbon atoms such as N-phenyl-N-allylaminocarbonyl group, N-(2-acetyloxyethyl)-N-ethylaminocarbonyl group, N-tolyl-N-methylaminocarbonyl group, N-vinyl-N-methylaminocarbonyl group, and N-benzyl-N-allylaminocarbonyl group;

Examples of the substituted or unsubstituted acyloxy groups represented by $R^1$ to $R^8$ are acyloxy groups having a substituent which is similar to that of the alkyl groups mentioned above, and preferably include acyloxy groups having 2 to 16 carbon atoms such as formyloxy group, methylcarbonyloxy group, ethylcarbonyloxy group, n-propylcarbonyloxy group, isopropylarbonyloxy group, n-butylcarbonyloxy group, isobutylcarbonyloxy group, sec-butylcarbonyloxy group, t-butylcarbonyloxy group, n-pentylcarbonyloxy group, isopentylcarbonyloxy group, neopentylcarbonyloxy group, 2-methylbutylcarbonyloxy group, benzoyloxy group, methylbenzoyloxy group, ethylbenzoyloxy group, tolylcarbonyloxy group, propylbenzoyloxy group, 4-t-butylbenzoyloxy group, nitrobenzylcarbonyloxy group, 3-butoxy-2-naphthoyloxy group, cinnamoyloxy group, ferrocenecarbonyloxy group, 1-methylferrocene-1'-carbonyloxy group, cobaltocenecarbonyloxy group, and nickelocenecarbonyloxy group;

Examples of the substituted or unsubstituted heteroaryl groups represented by $R^1$ to $R^8$ are heteroaryl groups having a substituent which is similar to that of the alkyl groups mentioned above, and preferably include unsubstituted heteroaryl groups such as furanyl group, pyrrolyl group, 3-pyrrolino group, pyrazolyl group, imidazolyl group, oxazolyl group, thiazolyl group, 1,2,3-oxadiazolyl group, 1,2,3-triazolyl group, 1,2,4-triazolyl group, 1,3,4-thiadiazolyl group, pyridinyl group, pyridazinyl group, pyrimidinyl group, pyrazinyl group, piperazinyl group, triazinyl group, benzofuranyl group, indolyl group, thionaphthenyl group, benzimidazolyl group, benzothiazolyl group, benzotriazol-2-yl group, benzotriazol-1-yl group, purinyl group, quinolinyl group, isoquinolinyl group, coumalinyl group, cinnolinyl group, quinoxalinyl group, dibenzofuranyl group, carbazolyl group, phenanthrolinyl group, phenothiazinyl group, flavonyl group, phthalimido group, and naphthylimido group;

or heteroalyl groups substituted by the following substituent, i.e., a halogen atom such as fluorine atom, chlorine atom, bromine atom, or iodine atom;

cyano group;

an alkyl group such as methyl group, ethyl group, propyl group, butyl group, pentyl group, hexyl group, heptyl group, octyl group, decyl group, methoxymethyl group, ethoxyethyl group, ethoxyethyl group, or trifluoromethyl group;

an aralkyl group such as benzyl group or phenethyl group;

an aryl group such as phenyl group, tolyl group, naphthyl group, xylyl group, mesyl group, chlorophenyl group, or methoxyphenyl group;

an alkoxy group such as methoxy group, ethoxy group, propoxy group, butoxy group, pentoxy group, hexyloxy group, heptyloxy group, octyloxy group, noyloxy group, decyloxy group, 2-ethylhexyloxy group, 3,5,5-trimethylhexyloxy group, ferrocenemethoxy group, cobaltocenemethoxy group, or nickelocenemethoxy group;

an aralkyloxy group such as benzyloxy group or phenethyloxy group;

an aryloxy group such as phenoxy group, tolyloxy group, naphthoxy group, xylyloxy group, mesityloxy group, chlorophenoxy group, or methoxyphenoxy group;

an alkenyl group such as vinyl group, allyl group, butenyl group, butadienyl group, pentenyl group, cyclopentadienyl group, or octenyl group;

an alkenyloxy group such as vinyloxy group, allyloxy group, butenyloxy group, butadienyloxy group, pentenyloxy group, cyclopentadienyloxy group, or octenyloxy group;

an alkylthio group such as methylthio group, ethylthio group, propylthio group, butylthio group, pentylthio group, hexylthio group, heptylthio group, octylthio group, decylthio group, methoxymethylthio group, ethoxyethylthio group, ethoxyethylthio group, or trifluoromethylthio group;

an aralkylthio group such as benzylthio group or phenethylthio group;

an arylthio group such as phenylthio group, tolylthio group, naphthylthio group, xylylthio group, mesylthio group, chlorophenylthio group, or methoxyphenylthio group;

a dialkylamino group such as dimethylamino group, diethylamino group, dipropylamino group, or dibutylamino group;

an acyl group such as acetyl group, propionyl group, butanoyl group, ferrocenecarbonyl group, cobaltocenecarbonyl group, or nickelocenecarbonyl group;

an alkoxycarbonyl such as methoxycarbonyl group, ethoxycarbonyl group, ferrocenemethoxycarbonyl group, 1-methylferrocen-1'-ylmethoxycarbonyl group, cobaltocenylmethoxycarbonyl group, or nickelocenylmethoxycarbonyl group;

an aralkyloxycarbonyl group such as benzyloxycarbonyl group or phenethyloxycarbonyl group;

an aryloxycarbonyl group such as phenoxycarbonyl group, tolyloxycarbonyl group, naphthoxycarbonyl group, xylyloxycarbonyl group, mesyloxycarbonyl group, chlorophenoxycarbonyl group, or methoxyphenoxycarbonyl group;

an alkenyloxycarbonyl group such as vinyloxycarbonyl group, allyloxycarbonyl group, butenyloxycarbonyl group, butadienyloxycarbonyl group, cyclopentadienyloxycarbonyl group, pentenyloxycarbonyl group, or octenyloxycarbonyl group;

an alkylaminocarbonyl group including an monoalkylaminocarbonyl group having 2 to 10 carbon atoms, such as methylaminocarbonyl group, ethylaminocarbonyl group, propylaminocarbonyl group, butylaminocarbonyl group, pentylaminocarbonyl group, hexylaminocarbonyl group, heptylaminocarbonyl group, octylaminocarbonyl group, nonylaminocarbonyl group, 3,5,5-trimethylhexylaminocarbonyl group, 2-ethylhexylaminocarbonyl group, or a dialkylaminocarbonyl group having 3 to 20 carbon atoms, such as dimethylaminocarbonyl group, diethylaminocarbonyl group, dipropylaminocarbonyl group, dibutylaminocarbonyl group, dipentylaminocarbonyl group, dihexylaminocarbonyl group, diheptylaminocarbonyl group, dioctylaminocarbonyl group, piperidinocarbonyl group, morpholinocarbonyl group, 4-methylpiperazinocarbonyl group, or 4-ethylpiperazinocarbonyl group;

a heterocyclic group such as furanyl group, pyrrolyl group, 3-pyrrolino group, pyrrolidino group, 1,3-oxolanyl group, pyrazolyl group, 2-pyrazolinyl group, pyrazolidinyl group, imidazolyl group, oxazolyl group, thiazolyl group, 1,2,3-oxadiazolyl group, 1,2,3-triazolyl group, 1,2,4-triazolyl group, 1,3,4-thiadiazolyl group, 4H-pyranyl group, pyridinyl group, piperidinyl group, dioxanyl group, morpholinyl group, pyridazinyl group, pyrimidinyl group, pyrazinyl group, piperazinyl group, triazinyl group, benzofuranyl group, indolyl group, thionaphthenyl group, benzimidazolyl group, benzothiazolyl group, purinyl group, quinolinyl group, isoquinolinyl group, coumalinyl group, cinnolinyl group, quinoxalinyl group, dibenzofuranyl group, carbazolyl group, phenanthrolinyl group, phenothiazinyl group, or flavonyl group;

a metalocenyl group such as ferrocenyl group, cobaltocenyl group, nickelocenyl group, ruthenocenyl group, osmocenyl group, or titanocenyl group.

Examples of the substituents $R^9$, $R^{10}$, and $R^{11}$ of the methine groups represented by $L^1$, $L^2$, and $L^3$, which may be substituted, include hydrogen atom; cyano group; or a halogen atom, substituted or unsubstituted alkyl group, aralkyl group, or aryl group which are similar to the halogen atom, alkyl group or aryl group each represented by the above $R^1$ to $R^8$.

The connecting group at the time when each substituent of $R^1$ to $R^{11}$ forms a ring in combination through the connecting group is a group obtainable by optionally combining a heteroatom such as nitrogen atom, oxygen atom, sulfur atom, phosphorus atom, a metal atom, and a metaloid atom and carbon atom. Preferred examples of the connecting group include —O—, —S—, —C(=O)—, a methylene group which may be substituted, imino group, and a metal atom, and a desired ring can be obtained by optionally combining the same. As a ring formed by the connecting group, a linear, two-dimensional, or three-dimensional ring connected by the connecting group may be mentioned. Preferred examples of the connected skeleton include aliphatic condensed rings such as —CH$_2$—CH$_2$—CH$_2$—CH$_2$—, —CH$_2$(NO$_2$)—CH$_2$—CH$_2$—CH$_2$—, —CH(CH$_3$)—CH$_2$—CH$_2$—CH$_2$—, and —CH(Cl)—CH$_2$—CH$_2$—, aromatic condensed rings such as —CH=CH—CH=CH—, —C(NO$_2$)=CH—CH=CH—, —C(CH$_3$)=CH—CH=CH—, —C(CH$_3$)=CH—CH=CH—, —C(CH$_3$)=CH—CH=C(CH$_3$)—, —C(OCH$_3$)=CH—CH=C(OCH$_3$)—, —C(OCH$_2$CH$_2$CH(CH$_3$)—(OCH$_3$))=C(Cl)—C(Cl)=C(OCH$_2$CH$_2$CH(CH$_3$)—(OCH$_3$))—, —C(OCH$_2$CH$_2$CH(CH$_3$)$_2$)=C(Cl)—C(Cl)=C(OCH$_2$CH$_2$CH(CH$_3$)$_2$)—, —CH=C(CH$_3$)—C(CH$_3$)=CH—, —C(Cl)=CH—CH=CH—, —C{OCH[CH(CH$_3$)$_2$]$_2$}=CH—CH=CH—, —C{OCH[CH(CH$_3$)$_2$]$_2$}=C(Br)—CH=CH—, —C{OCH[CH(CH$_3$)$_2$]$_2$}=CH—C(Br)=CH—, and —C{OCH[CH(CH$_3$)$_2$]$_2$}=CH—CH=C(Br)—;

heterocycles including linearly connected heterocycles such as —O—CH$_2$—CH$_2$—O—, —O—CH(CH$_3$)—CH(CH$_3$)—O—, —COO—CH$_2$—CH$_2$—, —COO—CH$_2$—, —CONH—CH$_2$—CH$_2$—, —CONH—CH$_2$—, —CON(CH$_3$)—CH$_2$—CH$_2$—, and —CON(CH$_3$)—CH$_2$—, or metal complex residues such as:

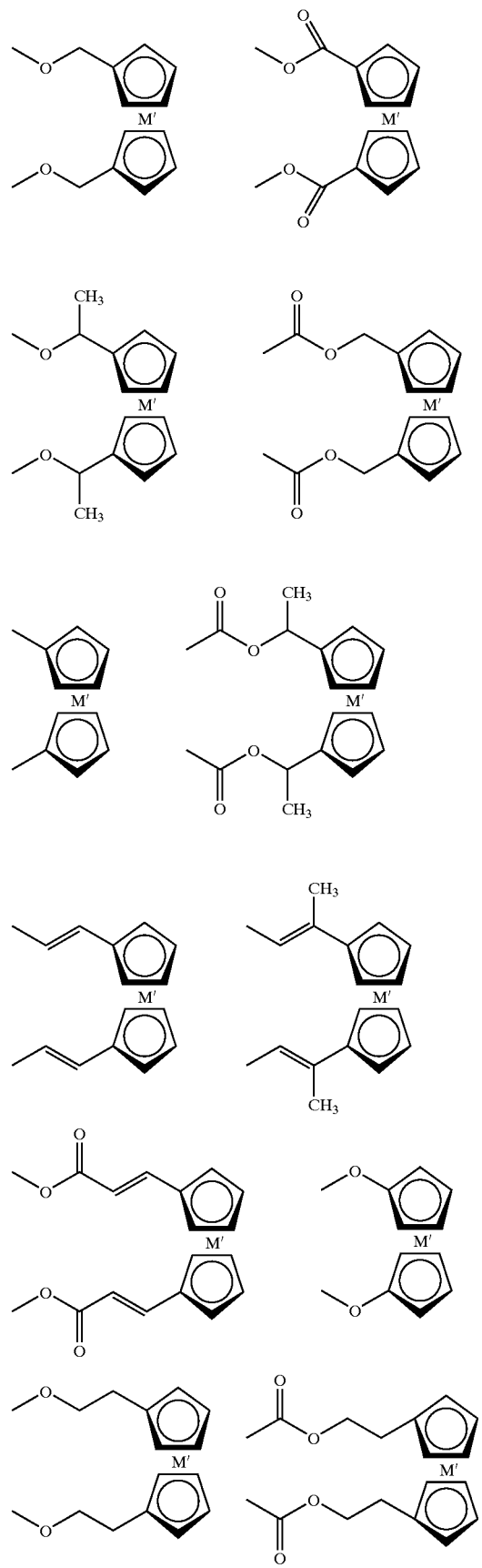

-continued

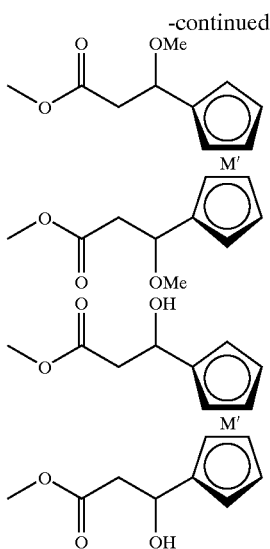

(M' represents Fe, Ru, Co, Ni, Os or M"R'$_2$ (M" represents Ti, Zr, Hf, Nb, Mo, or V, and R' represents CO, F, Cl, Br, I, an alkyl group having 1 to 10 carbon atoms and a substituent similar to that of the above $R^1$ to $R^8$, an alkoxy group, an aryl group, an aryloxy group, an aralkyl group, or an aralkyloxy group); and the like.

The preferred combination of the connection at the time when each of $R^1$ to $R^{11}$ connects to an adjacent substituent through the connecting group includes $R^1$ and $R^2$, $R^3$ and $R^4$, $R^5$ and $R^6$, $R^7$ and $R^8$, $R^2$ and $R^9$, $R^3$ and $R^9$, $R^4$ and $R^{11}$, $R^5$ and $R^{11}$, $R^6$ and $R^{10}$, and $R^7$ and $R^{10}$, and the like.

Specific examples of the divalent unsubstituted metal atom represented by $M^1$ include Cu, Zn, Fe, Co, Ni, Ru, Rh, Pd, Pt, Mn, Sn, Mg, Pb, Hg, Cd, Ba, Ti, Be, Ca, and the like.

Specific examples of the divalent metal atom having a ligand and represented by $M^1$ include divalent metal atoms coordinated by a nitrogen-containing compound, such as Cu(NH$_3$)$_2$, Fe(NH$_3$)$_2$, Fe (pyridine)$_2$, Fe(γ-picoline)$_2$, Fe(tosylmethyl isocyanide)$_2$, and Fe(benzyl isocyanide)$_2$.

Specific examples of the trivalent substituted metal atom represented by $M^1$ include monosubstituted trivalent metal atoms such as Al—F, Al—Cl, Al—Br, Al—I, Ga—F, Ga—Cl, Ga—Br, Ga—I, In—F, In—Cl, In—Br, In—I, Ti—F, Ti—Cl, Ti—Br, Ti—I, Al—C$_6$H$_5$, Al—C$_6$H$_4$(CH$_3$), In—C$_6$H$_5$, In—C$_6$H$_4$(CH$_3$), Mn(OH), Mn(OCH$_3$), Mn(OC$_6$H$_5$), Mn[OSi(CH$_3$)$_3$], Fe—F, Fe—Cl, Fe—Br, Fe—I, Ru—F, Ru—Cl, Ru—Br, and Ru—I.

Specific examples of the tetravalent metal atom having a substituent and represented by $M^1$ include disubstituted tetravalent metal atoms such as CrCl$_2$, SnF$_2$, SnCl$_2$, SnBr$_2$, SnI$_2$, ZnF$_2$, ZnCl$_2$, ZnBr$_2$, ZnI$_2$, GeF$_2$, GeCl$_2$, GeBr$_2$, GeI$_2$, TiF$_2$, TiCl$_2$, TiBr$_2$, TiI$_2$, Sn(OH)$_2$, Ge(OH)$_2$, Zr(OH)$_2$, Mn(OH)$_2$, TiA$_2$, CrA$_2$, SiA$_2$, SnA$_2$, GeA$_2$, Ti(OA)$_2$, Cr(OA)$_2$, Sn(OA)$_2$, Ge(OA)$_2$, Ti(SA)$_2$, Cr(SA)$_2$, Sn(SA)$_2$, and Ge(SA)$_2$ [A represents a substituted or unsubstituted alkyl group, an aryl group, or a heteroaryl group which is similar to the above alkyl group, aryl group, or heteroaryl group each represented by $R^1$ to $R^8$].

Specific examples of the trivalent or tetravalent metalloid atom having a substituent and represented by $M^1$ include monosubstituted trivalent metalloid atoms such as B—F, B—Cl, B—Br, B—I, B—A, B(OH), B(OA), and B[OSi(CH$_3$)$_3$] [A means the above A];

disubstituted tetravalent metalloid atoms such as SiF$_2$, SiCl$_2$, SiBr$_2$, SiI$_2$, Si(OH)$_2$, SiA$_2$, Si(OA)$_2$, and Si(SA)$_2$ [A means the above A].

Specific examples of the oxy metal atom represented by $M^1$ include VO, MnO, TiO, and the like.

Preferred $M^1$ includes Pd, Cu, Pt, Ni, Co, Rh, Zn, Fe, Fe(pyridine)$_2$, Fe(γ-picoline)$_2$, Fe(tosylmethyl isocyanide)$_2$, and Fe(benzyl isocyanide)$_2$, Fe—F, Fe—Cl, Fe—Br, Fe—I, VO, TiO, TiA$_2$, SiA$_2$, SnA$_2$, RuA$_2$, RhA$_2$, GeA$_2$, SiA$_2$, Si(OA)$_2$, Sn(OA)$_2$, Ge(OA)$_2$, Si(SA)$_2$, Sn(SA)$_2$, and Ge(SA)$_2$ [A means the above A].

In the diazaporphyrin compound of the present invention represented by the general formula (3), examples of the substituents $R^{12}$ to $R^{19}$ on the pyrrole rings include hydrogen atom, a halogen atom, nitro group, cyano group, hydroxyl group, amino group, carboxyl group, and sulfonic acid group, or a halogen atom, substituted or unsubstituted alkyl group, aralkyl group, aryl group, alkenyl group, alkoxy group, aralkyloxy group, aryloxy group, alkenyloxy group, alkylthio group, aralkylthio group, arylthio group, alkenylthio group, monosubstituted amino group, disubstituted amino group, acyl group, alkoxycarbonyl group, aralkyloxycarbonyl group, aryloxycarbonyl group, alkenyloxycarbonyl group, monosubstituted aminocarbonyl group, disubstituted aminocarbonyl group, acyloxy group, or heteroaryl group which is similar to the halogen atom, alkyl group, aralkyl group, aryl group, alkenyl group, alkoxy group, aralkyloxy group, aryloxy group, alkenyloxy group, alkylthio group, aralkylthio group, arylthio group, alkenylthio group, monosubstituted amino group, disubstituted amino group, acyl group, alkoxycarbonyl group, aralkyloxycarbonyl group, aryloxycarbonyl group, alkenyloxycarbonyl group, monosubstituted aminocarbonyl group, disubstituted aminocarbonyl group, acyloxy group, or heteroaryl group each represented by the above $R^1$ to $R^8$.

Examples of the substituents of the methine groups represented by $R^{20}$ and $R^{21}$, which may be substituted, include hydrogen atom; cyano group; or a halogen atom, substituted or unsubstituted alkyl group, aralkyl group, or aryl group which is similar to the halogen atom, alkyl group or aryl group each represented by the above $R^1$ to $R^8$. In particular, for increasing solubility and improving optical properties, the substituents $R^{20}$ and $R^{21}$ each is preferably a substituted or unsubstituted group having 1 or more carbon atoms, more preferably substituted or unsubstituted phenyl group.

Examples of the rings formed by each substituent of $R^{12}$ to $R^{19}$ in combination through the connecting group include aliphatic condensed rings, aromatic condensed rings, or heterocycles which are similar to the rings such as aliphatic condensed rings, aromatic condensed rings or heterocycles represented by the above $R^1$ to $R^{11}$.

Examples of the central atom represented by $M^2$ include two hydrogen atoms; or a divalent metal atom which is unsubstituted or has a ligand, a trivalent or tetravalent metal atom or metaloid atom which has a substituent, or an oxy metal atom, which is similar to the divalent metal atom which is unsubstituted or has a ligand, trivalent or tetravalent metal atom or metaloid atom which has a substituent, or oxy metal atom represented by the above $M^1$.

In the monoazaporphyrin compound of the present invention represented by the general formula (4), examples of the substituents $R^{22}$ to $R^{29}$ on the pyrrole rings include hydrogen atom, a halogen atom, nitro group, cyano group, hydroxyl group, amino group, carboxyl group, and sulfonic acid group, or the halogen atom, substituted or unsubstituted alkyl group, aralkyl group, aryl group, alkenyl group, alkoxy group, aralkyloxy group, aryloxy group, alkenyloxy group, alkylthio group, aralkylthio group, arylthio group, alkenylthio group, monosubstituted amino group, disubstituted amino group, acyl group, alkoxycarbonyl group, aralkyloxycarbonyl group, aryloxycarbonyl group, alkenyloxycarbonyl group, monosubstituted aminocarbonyl group, disubstituted aminocarbonyl group, acyloxy group, or heteroaryl group which is similar to the halogen atom, alkyl group, aralkyl group, aryl group, alkenyl group, alkoxy group, aralkyloxy group, aryloxy group, alkenyloxy group, alkylthio group, aralkylthio group, arylthio group, alkenylthio group, monosubstituted amino group, disubstituted amino group, acyl group, alkoxycarbonyl group, aralkyloxycarbonyl group, aryloxycarbonyl group, alkenyloxycarbonyl group, monosubstituted aminocarbonyl group, disubstituted aminocarbonyl group, acyloxy group, or heteroaryl group each represented by the above $R^1$ to $R^8$.

Examples of the substituents of the methine groups represented by $R^{30}$ and $R^{32}$, which may be substituted, include hydrogen atom; cyano group; or the halogen atom, substituted or unsubstituted alkyl group, aralkyl group, or aryl group which is similar to the halogen atom, alkyl group, or aryl group each represented by the above $R^1$ to $R^8$.

Examples of the rings formed by each substituent of $R^{22}$ to $R^{32}$ in combination through the connecting group include aliphatic condensed rings, aromatic condensed rings or heterocycles which are similar to the rings such as aliphatic condensed rings, aromatic condensed rings or heterocycles represented by the above $R^1$ to $R^{11}$.

Examples of the central atom represented by $M^3$ include two hydrogen atoms; or a divalent metal atom which is unsubstituted or has a ligand, a trivalent or tetravalent metal atom or metaloid atom which has a substituent, or an oxy metal atom, which is similar to the divalent metal atom which is unsubstituted or has a ligand, trivalent or tetravalent metal atom or metaloid atom which has a substituent, or oxy metal atom represented by the above $M^1$.

In the azaporphyrin compound of the present invention represented by the general formula (5), examples of the substituents $R^{33}$ to $R^{44}$ on the pyrrole rings include hydrogen atom, a halogen atom, and hydroxyl group, or the halogen atom, substituted or unsubstituted alkyl group, aryl group, alkoxy group, aralkyloxy group, aryloxy group, alkenyloxy group, alkylthio group, arylthio group, or heteroaryl group which is similar to the halogen atom, alkyl group, aryl group, alkoxy group, aralkyloxy group, aryloxy group, alkenyloxy group, alkylthio group, arylthio group, or heteroaryl group each represented by the above $R^1$ to $R^8$.

Examples of the rings formed by each substituent of $R^{33}$ to $R^{44}$ in combination through the connecting group include aliphatic condensed rings which are similar to the aliphatic condensed rings represented by the above $R^1$ to $R^{11}$.

Examples of the central atom represented by $M^4$ include two hydrogen atoms; or a divalent metal atom which is unsubstituted or has a ligand, a trivalent or tetravalent metal atom or metaloid atom which has a substituent, or an oxy metal atom, which is similar to the divalent metal atom which is unsubstituted or has a ligand, trivalent or tetravalent metal atom or metaloid atom which has a substituent, or oxy metal atom represented by the above $M^1$.

In the azaporphyrin compound of the present invention represented by the general formula (6), examples of the substituents $R^{45}$ to $R^{56}$ on the pyrrole rings include hydrogen atom, a halogen atom, and hydroxyl group, or the halogen atom, substituted or unsubstituted alkyl group, aryl group, alkoxy group, aralkyloxy group, aryloxy group, alkenyloxy group, alkylthio group, arylthio group, or heteroaryl group which is similar to the halogen atom, alkyl group, aryl group, alkoxy group, aralkyloxy group, aryloxy group, alkenyloxy group, alkylthio group, arylthio group, or heteroaryl group each represented by the above $R^1$ to $R^8$.

Examples of the rings formed by each substituent of $R^{45}$ to $R^{56}$ in combination through the connecting group include aliphatic condensed rings which are similar to the aliphatic condensed rings represented by the above $R^1$ to $R^{11}$.

Examples of the central atom represented by $M^5$ include two hydrogen atoms; or a divalent metal atom which is unsubstituted or has a ligand, a trivalent or tetravalent metal atom or metaloid atom which has a substituent, or an oxy metal atom, which is similar to the divalent metal atom which is unsubstituted or has a ligand, trivalent or tetravalent metal atom or metaloid atom which has a substituent, or oxy metal atom represented by the above $M^1$.

In the azaporphyrin compound of the present invention represented by the general formula (7), examples of the substituents $R^{57}$ to $R^{68}$ on the pyrrole rings include hydrogen atom, a halogen atom, and hydroxyl group, or the halogen atom, substituted or unsubstituted alkyl group, aryl group, alkoxy group, aralkyloxy group, aryloxy group, alkenyloxy group, alkylthio group, arylthio group, or heteroaryl group which is similar to the halogen atom, alkyl group, aryl group, alkoxy group, aralkyloxy group, aryloxy group, alkenyloxy group, alkylthio group, arylthio group, or heteroaryl group each represented by the above $R^1$ to $R^8$.

Examples of the rings formed by each substituent of $R^{57}$ to $R^{68}$ in combination through the connecting group include aliphatic condensed rings which are similar to the aliphatic condensed rings represented by the above $R^1$ to $R^{11}$.

Examples of the central atom represented by $M^6$ include two hydrogen atoms; or a divalent metal atom which is unsubstituted or has a ligand, a trivalent or tetravalent metal atom or metaloid atom which has a substituent, or an oxy metal atom, which is similar to the divalent metal atom which is unsubstituted or has a ligand, trivalent or tetravalent metal atom or metaloid atom which has a substituent, or oxy metal atom represented by the above $M^1$.

In the azaporphyrin compound of the present invention represented by the general formula (8), examples of the substituents $R^{69}$ to $R^{80}$ on the pyrrole rings include hydrogen atom, a halogen atom, and hydroxyl group, or the halogen atom, substituted or unsubstituted alkyl group, aryl group, alkoxy group, aralkyloxy group, aryloxy group, alkenyloxy group, alkylthio group, arylthio group, or heteroaryl group which is similar to the halogen atom, alkyl group, aryl group, alkoxy group, aralkyloxy group, aryloxy group, alkenyloxy group, alkylthio group, arylthio group, or heteroaryl group each represented by the above $R^1$ to $R^8$.

Examples of the rings formed by each substituent of $R^{69}$ to $R^{80}$ in combination through the connecting group include aliphatic condensed rings which are similar to the aliphatic condensed rings represented by the above $R^1$ to $R^{11}$.

Examples of the central atom represented by $M^7$ include two hydrogen atoms; or a divalent metal atom which is unsubstituted or has a ligand, a trivalent or tetravalent metal atom or metaloid atom which has a substituent, or an oxy metal atom, which is similar to the divalent metal atom which is unsubstituted or has a ligand, trivalent or tetravalent metal atom or metaloid atom which has a substituent, or oxy metal atom represented by the above $M^1$.

The compound of the present invention represented by the general formula (3) is, for example, produced, without limitation thereto, in accordance with the methods described in *J. Chem. Soc. (C)*, 22–29 (1996), *J. Biochem.*, 121, 654–660 (1997), *Z. Physiol. Chem.*, 214, 145 (1933), *Die Chemie des Pyrrols, Band II, Hlfte* 2, pp. 411–414, *Akademische Verlagesellschuft, Leipzig* (1940), etc. Representatively, it can be produced according to the following three steps of reactions.

Firstly, in the first step, the dipyrromethanes represented by the general formulae (17) and (18) each is halogenated with a halogenating agent such as bromine, iodine, N-bromosuccinimide, or N-iodosuccinimide in a carboxylic acid solvent such as acetic acid or a halogenated hydrocarbon solvent such as methylene chloride to obtain dipyrromethene compounds represented by the general formulae (19) and (20), respectively.

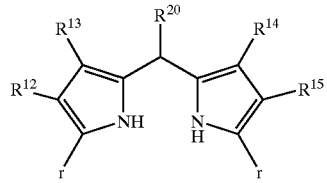

(17)

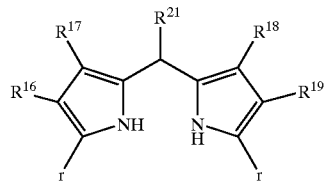

(18)

wherein $R^{12}$ to $R^{21}$ represent the same groups as $R^{12}$ to $R^{21}$ in the formula (3), respectively and r represents hydrogen atom or carboxyl group; and

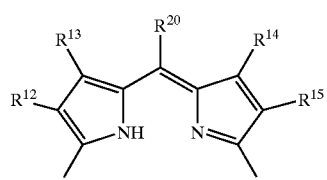

(19)

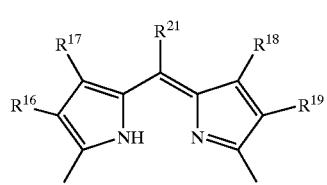

(20)

wherein $R^{12}$ to $R^{21}$ represent the same groups as $R^{12}$ to $R^{21}$ in the formula (3), respectively and a represents a halogen atom.

Then, in the second step, the dipyrromethene compounds represented by the general formulae (19) and (20) are reacted using an inorganic salt such as sulfate, nitrate, or a halide of a metal or metaloid, or an organic metal salt such as acetate or acetylacetonate of a metal or metaloid in the presence or absence of an oxidizing agent such as air in an organic solvent such as an alcohol solvent, e.g., ethanol and/or an amide solvent, e.g., dimethylformamide to obtain a dipyrromethene metal complex represented by the general formula (21):

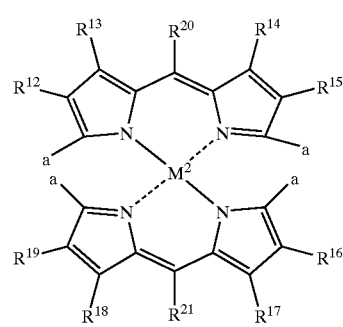

(21)

wherein $R^{12}$ to $R^{21}$ and a represent the same groups as $R^{12}$ to $R^{21}$ in the formula (3) and a, respectively and $M^2$ represents the same meaning as $M^2$ in the formula (3) represents.

Thereafter, in the third step, the dipyrromethene metal complex (21) is reacted with an azide salt such as sodium azide in an organic solvent such as an alcohol solvent, e.g., ethanol and/or an amide solvent, e.g., dimethylformamide to obtain a diazaporphyrin compound of the present invention represented by the general formula (3).

Therein, the compound of the general formula (3) can be also obtained by reacting each of the dipyrromethene compounds represented by the general formulae (19) and (20) obtained in the first step with an azide salt such as sodium azide, using an inorganic salt such as sulfate, nitrate, or a halogen salt of a metal or metaloid, or an organic metal salt such as acetate or acetylacetonate of a metal or metaloid in the presence or absence of an oxidizing agent such as air in an organic solvent such as an alcohol solvent, e.g., ethanol and/or an amide solvent, e.g., dimethylformamide.

Furthermore, the metal-free diazaporphyrin compound [M is two hydrogen atoms] represented by the general formula (3) can be obtained by reacting a dipyrromethene compound represented by the general formula (7) or (8) with sodium azide or the like in an organic solvent such as an alcohol solvent, e.g., ethanol and/or an amide solvent, e.g., dimethylformamide. Alternatively, it can be obtained by reacting a metal complex compound of the formula (2) with an acid such as an organic acid, e.g., trifluoroacetic acid in a solvent such as chloroform.

Specific examples of the diazaporphyrin compound represented by the general formula (3) include the compounds (1-1) to (1-65) having a substituent, which are described in Table-1.

TABLE 1

| Comp. | R¹² | R¹³ | R¹⁴ | R¹⁵ | R¹⁶ | R¹⁷ | R¹⁸ | R¹⁹ | R²⁰ | R²¹ | M² |
|---|---|---|---|---|---|---|---|---|---|---|---|
| 1-1 | —C₂H₅ | —CH₃ | —CH₃ | —C₂H₅ | —C₂H₅ | —CH₃ | —CH₃ | —C₂H₅ | H | H | Cu |
| 1-2 | —C₂H₅ | —CH₃ | —CH₃ | —C₂H₅ | —C₂H₅ | —CH₃ | —CH₃ | —C₂H₅ | H | H | VO |
| 1-3 | —C₂H₅ | —CH₃ | —CH₃ | —C₂H₅ | —C₂H₅ | —CH₃ | —CH₃ | —C₂H₅ | H | H | Co |
| 1-4 | —OC₂H₅ | —C₂H₅ | —C₂H₅ | —OC₂H₅ | —OC₂H₅ | —C₂H₅ | —C₂H₅ | —OC₂H₅ | H | H | Ni |
| 1-5 | —C₄H₉(t) | —I | —I | —C₄H₉(t) | —C₄H₉(t) | —I | —I | —C₄H₉(t) | —F | —F | Cu |
| 1-6 | —Br | —COOC₂H₅ | —COOC₂H₅ | —Br | —Br | —COOC₂H₅ | —COOC₂H₅ | —Br | H | H | Pd |
| 1-7 | (4-SCH₃-C₆H₄) | (4-SCH₃-C₆H₄) | —OC₂H₅ | (4-SCH₃-C₆H₄) | (4-SCH₃-C₆H₄) | —OC₂H₅ | —OC₂H₅ | (4-SCH₃-C₆H₄) | H | H | Zn |
| 1-8 | (3,5-diMe-4-OH-C₆H₂) | —SCH₃ | —SCH₃ | (3,5-diMe-4-OH-C₆H₂) | (3,5-diMe-4-OH-C₆H₂) | —SCH₃ | —SCH₃ | (3,5-diMe-4-OH-C₆H₂) | H | H | Cu |
| 1-9 | —CN | —CN | —CN | —CN | —CN | —CN | —CN | —CN | —CN | —CN | Cu |
| 1-10 | —C₆H₁₃(n) | —Br | —Br | —C₆H₁₃(n) | —C₆H₁₃(n) | —Br | —Br | —C₆H₁₃(n) | —CH₃ | —CH₃ | VO |
| 1-11 | —C₄H₉(t) | —CN | —CN | (4-OMe-C₆H₄) | (4-OMe-C₆H₄) | —CN | —CN | —C₄H₉(t) | —CH₃ | —CH₃ | Co |
| 1-12 | —C₄H₉(t) | —NO₂ | —NO₂ | (4-OMe-C₆H₄) | (4-OMe-C₆H₄) | —NO₂ | —NO₂ | —C₄H₉(t) | —CH₃ | —CH₃ | Pd |
| 1-13 | —Br | —COOC₂H₅ | —COOC₂H₅ | —Br | —Br | —COOC₂H₅ | —COOC₂H₅ | —Br | H | H | Zn |
| 1-14 | (C₆H₅) | —OC₂H₅ | —SCH₃ | (C₆H₅) | (C₆H₅) | —OC₂H₅ | —SCH₃ | (C₆H₅) | H | H | Cu |
| 1-15 | (2,3-diMe-C₆H₃) | —SCH₃ | —SCH₃ | (2,3-diMe-C₆H₃) | (2,3-diMe-C₆H₃) | —SCH₃ | —SCH₃ | (2,3-diMe-C₆H₃) | H | H | |

| Comp. | R¹² | R¹³ | R¹⁴ | R¹⁵ | R¹⁶ | R¹⁷ | R¹⁸ | R¹⁹ | R²⁰ | R²¹ | M² |
|---|---|---|---|---|---|---|---|---|---|---|---|
| 1-16 | —NH₂ | (4-OMe-C₆H₄) | (4-OMe-C₆H₄) | —NH₂ | —NH₂ | (4-OMe-C₆H₄) | (4-OMe-C₆H₄) | —NH₂ | —CN | —CN | Cu |
| 1-17 | —COOH | —OC₂H₅ | —OC₂H₅ | —COOH | —COOH | —OC₂H₅ | —OC₂H₅ | —COOH | H | H | Cu |
| 1-18 | —COOC₂H₅ | —C₄H₉(t) | —C₄H₉(t) | —COOC₂H₅ | —COOC₂H₅ | —C₄H₉(t) | —C₄H₉(t) | —COOC₂H₅ | H | H | Si(OMe)₂ |

TABLE 1-continued

| Comp. | R¹² | R¹³ | R¹⁴ | R¹⁵ | R¹⁶ | R¹⁷ | R¹⁸ | R¹⁹ | R²⁰ | R²¹ | M² |
|---|---|---|---|---|---|---|---|---|---|---|---|
| 1-19 | —O—CH(CH₃)₂ | —O—CH(CH₃)₂ | —O—CH(CH₃)₂ | —O—CH(CH₃)₂ | —O—CH(CH₃)₂ | —O—CH(CH₃)₂ | —O—CH(CH₃)₂ | H | H | H | Mg |
| 1-20 | 2,6-dimethylphenoxy | —CH₃ | —CH₃ | 2,6-dimethylphenoxy | —CH₃ | —CH₃ | —CH₃ | (2,6-dimethylphenoxy) | H | H | Cu |
| 1-21 | —F | —F | pyrrolyl(CH₃) | —F | —F | pyrrolyl(CH₃) | pyrrolyl(CH₃) | —F | —F | —F | Mn |
| 1-22 | —CH=CH₂ | —CH=CH₂ | phenyl-ethyl | —CH=CH₂ | —CH=CH₂ | phenyl-ethyl | phenyl-ethyl | —CH=CH₂ | H | H | VO |
| 1-23 | —CH₂—CH₂—CH₂—CH₂— | —CH₂—CH₂—CH₂—CH₂— | —CH₂—CH₂—CH₂—CH₂— | —CH₂—CH₂—CH₂—CH₂— | —CH₂—CH₂—CH₂—CH₂— | —CH₂—CH₂—CH₂—CH₂— | —CH₂—CH₂—CH₂—CH₂— | H | H | H | Cu |
| 1-24 | —CH₂—CHCl—CHCl—CH₂— | —CH₂—CHCl—CHCl—CH₂— | —CH₂—CHCl—CHCl—CH₂— | —CH₂—CHCl—CHCl—CH₂— | —CH₂—CHCl—CHCl—CH₂— | —CH₂—CHCl—CHCl—CH₂— | —CH₂—CHCl—CHCl—CH₂— | H | H | H | Cu |
| 1-25 | —C₂H₅ | —C₂H₅ | —C₂H₅ | —C₂H₅ | —C₂H₅ | —C₂H₅ | —C₂H₅ | H | H | H | Cu |
| 1-26 | —OCH₂OC₂H₅ | —OCH₂OC₂H₅ | —OCH₂OC₂H₅ | —OCH₂OC₂H₅ | —OCH₂OC₂H₅ | —OCH₂OC₂H₅ | —OCH₂OC₂H₅ | —OCH₂OC₂H₅ | H | H | TiO₂ |
| 1-27 | —SO₃H | —SO₃H | —SO₃H | —SO₃H | —SO₃H | —SO₃H | —SO₃H | H | H | H | Cu |
| 1-28 | —CON(CH₃)₂ | —OC₂H₅ | —OC₂H₅ | —CON(CH₃)₂ | —CON(CH₃)₂ | —OC₂H₅ | —OC₂H₅ | —CON(CH₃)₂ | p-tolyl | p-tolyl | Cu |
| 1-29 | —CH₃ | —CH₃ | —CH₃ | —CH₃ | —CH₃ | —CH₃ | —CH₃ | —C₂H₅ | —C₂H₅ | —C₂H₅ | Cu |
| 1-30 | —COOC₂H₅ | —C₄H₉(t) | —C₄H₉(t) | —COOC₂H₅ | —COOC₂H₅ | —C₄H₉(t) | —C₄H₉(t) | —COOC₂H₅ | H | H | Ni |
| 1-31 | —C₂H₅ | —C₂H₅ | —CH₃ | —CH₃ | —C₂H₅ | —C₂H₅ | —CH₃ | —CH₃ | H | H | VO |
| 1-32 | —C₂H₅ | —C₂H₅ | —CH₃ | —CH₃ | —C₂H₅ | —C₂H₅ | —CH₃ | —CH₃ | H | H | Cu |
| 1-33 | —C₂H₅ | —C₂H₅ | —CH₃ | —CH₃ | —C₂H₅ | —C₂H₅ | —CH₃ | —CH₃ | H | H | Co |
| 1-34 | —C₄H₉(t) | —C₄H₉(t) | H | H | —C₄H₉(t) | —C₄H₉(t) | H | H | H | H | Zn |

TABLE 1-continued

| Comp. | | | | | | | | | | | | M |
|---|---|---|---|---|---|---|---|---|---|---|---|---|
| 1-35 | —CH(iPr)(C₆H₁₁) | H | —CH(iPr)(C₆H₁₁) | —CH(iPr)(C₆H₁₁) | H | H | H | | | | | Pd |
| 1-36 | —C₂H₅ | —C₂H₅ | 4-MeS-C₆H₄ | 4-MeS-C₆H₄ | 4-MeS-C₆H₄ | 4-MeS-C₆H₄ | 4-Me-C₆H₄ | | | | | Ni |
| 1-37 | —CH₂—CH₂—CH₂—CH₂— | —CH₂—CH₂—CH₂—CH₂— | —CH₂—CH₂—CH₂—CH₂— | —CH₂—CH₂—CH₂—CH₂— | —CH₃ | —CH₃ | | | | | | Zn |
| 1-38 | —Br | —Br | —Br | —Br | —Br | —Br | | | | | | Fe |
| 1-39 | —Cl | —Cl | —Cl | —Cl | H | H | | | | | | VO |
| 1-40 | —CH₃ | —CH₃ | (2,6-di-CH₃-phenoxy) | (2,6-di-CH₃-phenoxy) | (2,6-di-CH₃-phenoxy) | (2,6-di-CH₃-phenoxy) | H | H | | | | Co |
| 1-41 | —C₄H₉(t) | thienyl | thienyl | —C₄H₉(t) | —C₄H₉(t) | thienyl | thienyl | —F | —F | | | Mn |
| 1-42 | —C₃H₇(i) | phenoxy | phenoxy | —C₃H₇(i) | —C₃H₇(i) | phenoxy | phenoxy | H | H | | | Zn |

| Comp. | R¹² | R¹³ | R¹⁴ | R¹⁵ | R¹⁶ | R¹⁷ | R¹⁸ | R¹⁹ | R²⁰ | R²¹ | M² |
|---|---|---|---|---|---|---|---|---|---|---|---|
| 1-43 | —CH₂—CH₂—CH₂—CH₂— | —CH₂—CH₂—CH₂—CH₂— | H | H | —CH₂—CH₂—CH₂—CH₂— | —CH₂—CH₂—CH₂—CH₂— | H | H | H | H | Zn |
| 1-44 | —CCl=CH—CH=CCl— | —CCl=CH—CH=CCl— | —CCl=CH—CH=CCl— | —CCl=CH—CH=CCl— | —CCl=CH—CH=CCl— | —CCl=CH—CH=CCl— | —CCl=CH—CH=CCl— | —CCl=CH—CH=CCl— | H | H | Zn |
| 1-45 | —CH=CH—CH=CH— | —CH=CH—CH=CH— | —C₂H₅ | —C₂H₅ | —CH=CH—CH=CH— | —CH=CH—CH=CH— | —C₂H₅ | —C₂H₅ | H | H | Ni |
| 1-46 | —CH₂—CH₂—CH₂—CH₂— | —OC₂H₅ | —OC₂H₅ | —OC₂H₅ | —OC₂H₅ | —OC₂H₅ | —CH₂—CH₂—CH₂—CH₂— | —CH₂—CH₂—CH₂—CH₂— | H | H | Mn |
| 1-47 | —CCl=CH—CH=CCl— | —CCl=CH—CH=CCl— | —OCH₂OC₂H₅ | —OCH₂OC₂H₅ | —CCl=CH—CH=CCl— | —CCl=CH—CH=CCl— | —OCH₂OC₂H₅ | —OCH₂OC₂H₅ | H | phenyl | Co |
| 1-48 | —CONH(CH₃)₂ | —OC₂H₅ | —OC₂H₅ | —CON(CH₃)₂ | —CON(CH₃)₂ | —CON(CH₃)₂ | —CON(CH₃)₂ | —CON(CH₃)₂ | H | phenyl | Cu |

TABLE 1-continued

| | | | | | | | | |
|---|---|---|---|---|---|---|---|---|
| 1-49 | 1-OMe-naphthyl | —CH₃ | —CH₃ | 1-OMe-naphthyl | —CH₃ | —CH₃ | 1-OMe-naphthyl | —C₂H₅ | —C₂H₅ | Ni |
| 1-50 | 2-ethylhexyloxy | —C₂H₅ | —C₂H₅ | 2-ethylhexyloxy | —C₃H₇(i) | —C₃H₇(i) | 2-ethylhexyloxy | H | Cu |
| 1-51 | cyclohexyl-CH₃ | —C₃H₇(i) | —C₃H₇(i) | cyclohexyl-CH₃ | | | cyclohexyl-CH₃ | H | Fe |
| 1-52 | —C₄H₉(t) | acetal | acetal | —C₄H₉(t) | acetal | acetal | —C₄H₉(t) | H | Ni |
| 1-53 | —C₂H₅ | p-tBu-phenyl | p-tBu-phenyl | —C₂H₅ | p-tBu-phenyl | p-tBu-phenyl | —C₂H₅ | p-tolyl-CH₂-p-tolyl | Co |
| 1-54 | 2-ethylhexyloxy | —C₂H₅ | —C₂H₅ | 2-ethylhexyloxy | —C₃H₇(i) | —C₃H₇(i) | 2-ethylhexyloxy | H | Cu |
| 1-55 | cyclohexyl-CH₃ | —C₃H₇(i) | —C₃H₇(i) | cyclohexyl-CH₃ | | | cyclohexyl-CH₃ | H | Zn |
| 1-56 | —C₄H₉(t) | H | H | —C₄H₉(t) | H | H | —C₄H₉(t) | —CH₃ | —CH₃ | Cu |
| 1-57 | —OC₆H₁₃(n) | —C₂H₅ | —C₂H₅ | —OC₆H₁₃(n) | —C₂H₅ | —C₂H₅ | —OC₆H₁₃(n) | Ph | Ph | Cu |
| 1-58 | isopentyl | | | isopentyl | | | isopentyl | Ph | Ph | VO |

TABLE 1-continued

| Comp. | R$^{12}$ | R$^{13}$ | R$^{14}$ | R$^{15}$ | R$^{16}$ | R$^{17}$ | R$^{18}$ | R$^{19}$ | R$^{20}$ | R$^{21}$ | M$^2$ |
|---|---|---|---|---|---|---|---|---|---|---|---|
| 1-59 | —C$_4$H$_9$(t) | 2-ethylhexyl | 2-ethylhexyl | —C$_4$H$_9$(t) | —C$_4$H$_9$(t) | 2-ethylhexyl | 2-ethylhexyl | —C$_4$H$_9$(t) | H | H | Zn |
| 1-60 | —C$_2$H$_5$ | 4-tert-butylphenyl | 4-tert-butylphenyl | —C$_2$H$_5$ | —C$_2$H$_5$ | 4-tert-butylphenyl | 4-tert-butylphenyl | —C$_2$H$_5$ | H | H | Cu |
| 1-61 | —C$_2$H$_5$ | —C$_2$H$_5$ | —C$_2$H$_5$ | —C$_2$H$_5$ | —C$_2$H$_5$ | —C$_2$H$_5$ | —C$_2$H$_5$ | —C$_2$H$_5$ | H | phenyl | Cu |
| 1-62 | H | H | H | H | H | H | H | H | H | 2,4,6-trimethylphenyl | Cu |
| 1-63 | H | H | H | H | H | H | H | H | H | 4-(4-methylpiperazin-1-yl)phenyl, N-CH$_3$ | Cu |
| 1-64 | H | H | —CH$_3$ | —CH$_3$ | —CH$_3$ | H | H | —CH$_3$ | H | 3-phenoxy-methylphenyl | Cu |
| 1-65 | —CH$_3$ | —CH$_3$ | —CH$_3$ | —CH$_3$ | —CH$_3$ | —CH$_3$ | —CH$_3$ | —CH$_3$ | H | benzyl (ethylphenyl) | Cu |

The compound of the general formula (4) for use in the present invention can be, without particular limitation, produced in accordance with the methods, for example, described in *Bull. Chem. Soc. Jpn.*, 61, 3539–3547 (1988), *Inorg. Chem.*, 32, 291–296 (1993), *Tetrahedron Lett.*, 36(10), 1567–1570 (1995), *Liebigs Ann. Chem.*, 339–359 (1977), *Inorganica Chimica Acta*, 203, 107–114 (1993), and so forth. Representatively, it can be produced according to the following processes, for example.

Namely, a dipyrromethane compound of the formula (22) and pyrrole compounds of the formulae (23) and (24) are reacted in a solvent such as a halogenated solvent, e.g., methylene chloride or an alcohol solvent, e.g., ethanol, in the presence of hydrobromic acid to obtain a condensed compound of the formula (25) or hydrobromide thereof.

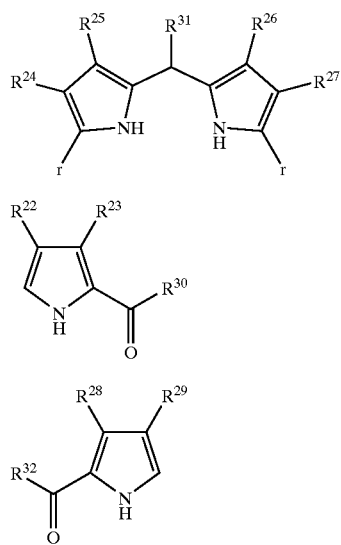

(22)

(23)

(24)

wherein $R^{22}$ to $R^{32}$ each represent the same groups as $R^{22}$ to $R^{32}$ in the formula (4) each represent, and r represents hydrogen atom or carboxyl group;

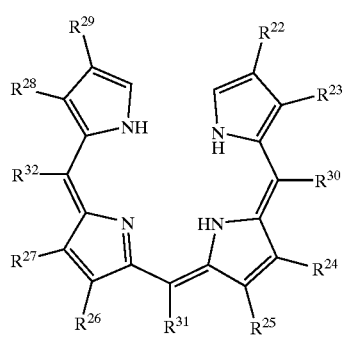

(25)

wherein $R^{22}$ to $R^{32}$ each represent the same groups as $R^{22}$ to $R^{32}$ in the formula (4) each represent.

Then, the condensed compound represented by the formula (25) is halogenated with a halogenating agent such as bromine, iodine, N-bromosuccinimide, or N-iodosuccinimide in a solvent such as an organic acid or a halogenated solvent, e.g., acetic acid, methylene chloride, or trifluoroacetic acid, or alcohol solvent, e.g., ethanol to obtain a dihalogenated compound of the formula (26):

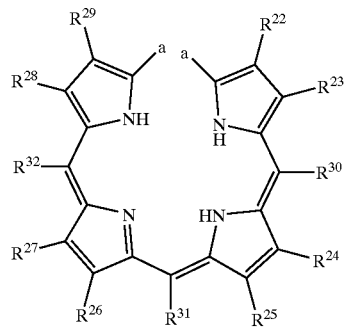

(26)

wherein $R^{22}$ to $R^{32}$ each represent the same groups as $R^{22}$ to $R^{32}$ in the formula (4) each represent, and a represents the same group as a in the formula (19) or (20) represents.

Next, a monoazaporphyrin compound can be obtained by the reaction with an azide salt such as sodium azide in an alcohol solvent such as methanol or ethanol, a halogenated solvent such as methylene chloride, or an amide solvent such as N,N-dimethylformamide in the presence or absence of a metal or metaloid compound such as an inorganic salt, e.g., sulfate, nitrate, or halide of a metal or metaloid, or an organic metal salt, e.g., acetate or acetylacetonate thereof; a coordinative compound capable of coordinating to a metal, such as pyridine; an ionic compound whose anion is capable of coordinating to a metal, such as sodium chloride or sodium borofluoride; an oxidizing agent such as air; a neutralizing agent such as N-ethyldiisopropylamine or tri-ethanolamine; a phase transfer catalyst such as benzo-18-crown-6-ether; or the like.

The compound of the formula (25) wherein $R^{31}$ is hydrogen can be obtained by reacting dipyrromethane compounds represented by the formulae (27) and (28) with an aldehyde of the formula (29) in the presence of hydrobromic acid in a solvent such as a halogenated solvent, i.e., methylene chloride or an alcohol solvent, e.g., ethanol:

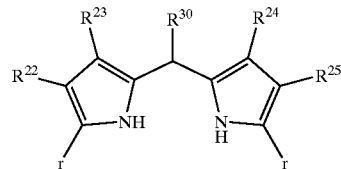

(27)

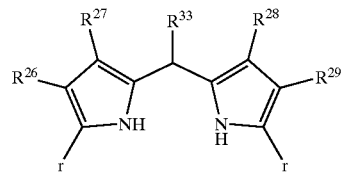

(28)

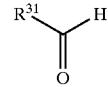

(29)

wherein $R^{22}$ to $R^{30}$ and $R^{32}$ each represent the same groups as $R^{22}$ to $R^{30}$ and $R^{32}$ in the formula (4) each represent, and r represents the same group as r in the formula (17) or (18) represents.

The compound of the formula (26) wherein $R^{31}$ is hydrogen can be produced by reacting a compound represented by the formula (30) or (31) using tin(IV) chloride in a halogenated solvent such as methylene chloride:

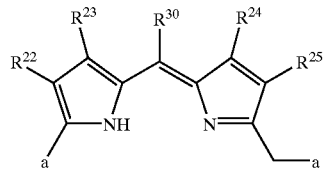

(30)

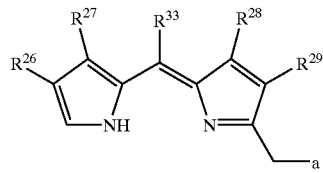

(31)

wherein $R^{22}$ to $R^{30}$ and $R^{32}$ each represent the same groups as $R^{22}$ to $R^{30}$ and $R^{32}$ in the formula (4) each represent, and a represents the same group as a in the formula (19) or (20) represents.

Moreover, with regard to the compound of the formula (26), a condensed compound of the formula (26) or hydrobromide thereof can be obtained by reacting a dipyrromethane compound of the formula (22) and the compounds of the formulae (32) and (33) in a solvent such as a halogenated solvent, e.g., methylene chloride or an alcohol solvent, e.g., ethanol in the presence of hydrobromic acid:

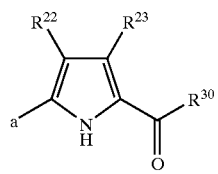

(32)

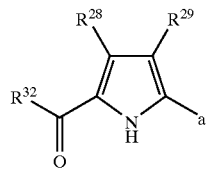

(33)

wherein $R^{22}$ to $R^{32}$ each represent the same groups as $R^{22}$ to $R^{32}$ in the formula (4) each represent, and a represents the same group as a in the formula (19) or (20) represents.

As an alternative method, a porphyrin compound represented by the formula (34) is reacted in the presence of ascorbic acid and/or a salt thereof, in the presence of a basic solvent such as pyridine, in the presence of an oxidizing agent such as air or oxygen, and, if necessary, saturated brine or saturated sodium borofluoride aqueous solution is used to obtain an oxoporphyrin of the formula (35):

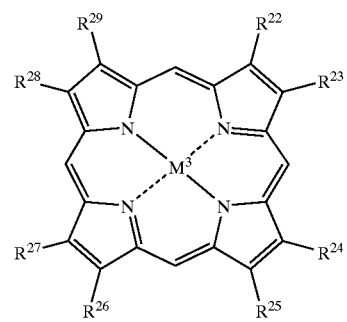

(34)

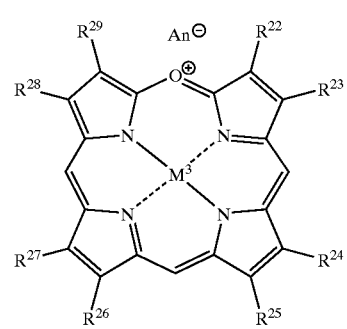

(35)

wherein $R^{22}$ to $R^{29}$ and $M^3$ each represent the same groups as $R^{22}$ to $R^{29}$ and $M^3$ in the formula (4) each represent, and $An^-$ represents chlorine ion or tetrafluoroborate ion.

Then, a monoazaporphyrin compound of the formula (4) wherein $R^{30}$ to $R^{32}$ are hydrogen can be obtained by reacting ammonia and the compound of the formula (35) in the presence of a basic solvent such as pyridine using ammonia gas or aqueous ammonia, and, after treatment or untreatment with a sulfuric acid-methanol solution, by reacting the product with a coordinative compound having a lone electron pair capable of coordinating to a metal, such as pyridine, or reacting the product with a halogen anion by adding a solution containing the halogen anion.

Moreover, a compound of the formula (38) can be obtained by reacting a biliverdin compound with a solution of a metal acetate dissolved in a halogenated solvent such as chloroform and an alcohol solvent such as methanol to obtain a metal complex of the formula (37), and then, after heating with acetic anhydride, treating the product with an ammonium halide such as ammonium chloride, or the like:

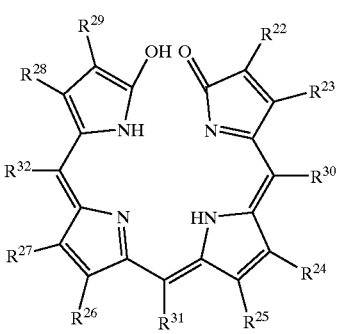

(36)

-continued (37)

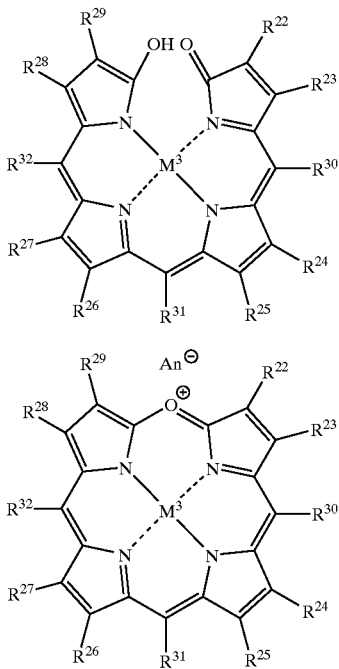

(38)

wherein $R^{22}$ to $R^{29}$ and $M^3$ each represent the same groups as $R^{22}$ to $R^{29}$ and $M^3$ in the formula (4) each represent, and $An^-$ represents chlorine ion or tetrafluoroborate ion.

Then, a monoazaporphyrin compound of the formula (4) can be also obtained by reacting a compound of the formula (38) with ammonia using ammonia gas in a halogenated solvent such as chloroform and an alcohol solvent such as acetone to obtain a compound of the formula (39) and then heating it in an amide solvent such as N,N-dimethylformamide:

(39)

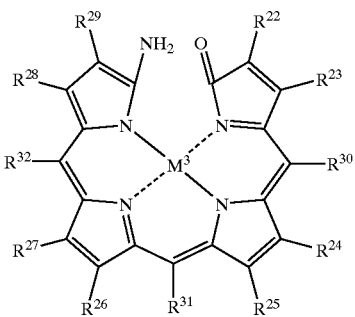

wherein $R^{22}$ to $R^{29}$ and M each represent the same groups as $R^{22}$ to $R^{29}$ and M in the formula (4) each represent.

A metal-free monoazaporphyrin compound represented by the formula (4) [$M^3$ represents two hydrogen atoms] can be obtained by reacting a dihalogeno compound represented by the general formula (26) with sodium azide or the like in an alcohol solvent such as methanol and/or an amide solvent such as N,N-dimethylformamide or a halogenated solvent such as methylene chloride, in the presence or absence of an oxidizing agent such as air, in the presence or absence of a phase transfer catalyst such as benzo-18-crown-6-ether.

Alternatively, a metal-free monoazaporphyrin compound of the formula (4) can be obtained by reacting a metal complex compound of the formula (4) with an acid such as an organic acid, e.g., trifluoroacetic acid.

Specific examples of the monoazaporphyrin compound represented by the general formula (4) include the compounds (2-1) to (2-14) having a substituent and the like described in Table 2.

TABLE 2

| Comp. | R²² | R²³ | R²⁴ | R²⁵ | R²⁶ | R²⁷ | R²⁸ | R²⁹ | R³⁰ | R³¹ | R³² | M³ |
|---|---|---|---|---|---|---|---|---|---|---|---|---|
| 2-1 | —C₂H₅ | —C₂H₅ | —CH₃ | —C₂H₅ | —C₂H₅ | —CH₃ | —C₂H₅ | —C₂H₅ | —H | —H | —H | Cu |
| 2-2 | —CH₃ | —CH₃ | —CH₃ | —C(=O)OC₂H₅ | —C(=O)OC₂H₅ | —CH₃ | —CH₃ | —CH₃ | —H | —H | —H | FeCl |
| 2-3 | —C₂H₅ | —C₂H₅ | —CH₃ | —C₂H₅ | —C₂H₅ | —C(=O)OCH₃ | —C₂H₅ | —C₂H₅ | —H | —CH₃ | —H | Cu |
| 2-4 | n-C₅H₁₁ | n-C₅H₁₁ | —CH₃ | prenyl | prenyl | —CH₃ | n-C₅H₁₁ | n-C₅H₁₁ | —H | —H | —H | Zn |
| 2-5 | n-C₅H₁₁ | —CH₃ | —CH₃ | —CH₃ | —CH₃ | n-C₅H₁₁ | —CH₃ | n-C₅H₁₁ | —H | —C₆H₅ | —H | Cu |
| 2-6 | —C₂H₅ | —C₂H₅ | —CH₃ | —CH₂CH(CH₃)OC₂H₅ | —CH₂CH(CH₃)OC₂H₅ | —C₂H₅ | —C₂H₅ | —C₂H₅ | —CH₃ | —H | —CH₃ | Zn |
| 2-7 | —C₂H₅ | —C₂H₅ | —C₂H₅ | —C₂H₅ | —C₂H₅ | —C₂H₅ | —C₂H₅ | —C₂H₅ | —C₆H₅ | —H | —C₆H₅ | Si(CH₃)₂ |
| 2-8 | —CH₂CH₂CH₂CH₂— | | —CH₃ | —C(=O)N(n-C₄H₉)₂ | —C(=O)N(n-C₄H₉)₂ | —CH₃ | —CH₂CH₂CH₂CH₂— | | —H | —H | —H | Pd |

TABLE 2-continued
| Comp. | R²² | R²³ | R²⁴ | R²⁵ | R²⁶ | R²⁷ | R²⁸ | R²⁹ | R³⁰ | R³¹ | R³² | M³ |
|---|---|---|---|---|---|---|---|---|---|---|---|---|
| 2-9 | —C₂H₅ | —C₂H₅ | —CH₃ | —CH₃ |  |  | —CH₃ | —C₂H₅ | —C₂H₅ | —CH₃ | —H | —CH₃ | VO |
| 2-10 | 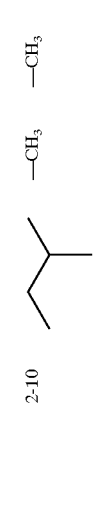 | —CH₃ | —CH₃ |  |  | —CH₃ | —CH₃ |  | —H | —H | —H | Cu |
| 2-11 | —C₂H₅ | —C₂H₅ | —CH₃ | 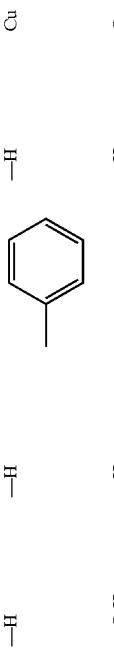 |  | —CH₃ | —C₂H₅ | —C₂H₅ | —H | —H | —H | Cu |
| 2-12 | —H | —H | —H | —H | —C₂H₅ | —C₂H₅ | —H | —H | —H | —H | —H | Cu |
| 2-13 | —C₂H₅ | —C₂H₅ | —CH₃ | —H | —H | —H | —C₂H₅ | —C₂H₅ | —H | —H |  | Cu |
| 2-14 | —H | —H | —H | —H | —H | —H | —H | —H | —H | 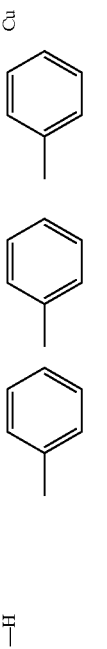   | 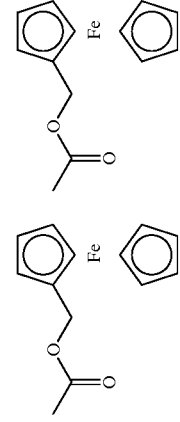 | Cu |
| 2-15 | —C₂H₅ | —C₂H₅ | —CH₃ | —C₂H₅ | —C₂H₅ | —CH₃ | —C₂H₅ | —C₂H₅ | —H |  | —H | Co |

In the present invention, the azaporphyrin compound of the general formula (5) can be produced as follows. Namely, the compound can be representatively obtained by reacting a maleonitrile of the general formula (9) with an acetophenone of the formula (10) and a metal halide and/or a metal derivative in the presence or absence of a solvent under heating:

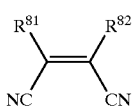

(9)

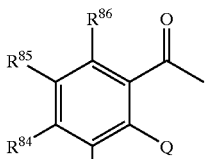

(10)

wherein $R^{81}$ to $R^{86}$ each independently represent hydrogen atom, a halogen atom, hydroxyl group, a substituted or unsubstituted alkyl group, an aryl group, an alkoxy group, an aralkyloxy group, an aryloxy group, an alkenyloxy group, an alkylthio group, an arylthio group, or a heteroaryl group, $R^{81}$ and $R^{82}$ may form an aliphatic ring in combination through a connecting group, and Q represents a halogen atom or cyano group.

The maleonitrile of the formula (9) is used usually form 0.1 to 10 molar equivalents, preferably from 0.5 to 2 molar equivalents to the acetophenone of the formula (10).

The maleonitrile is usually used solely, but a mixture contaminated with a fumaronitrile represented by the following formula (40) which is a structural isomer and the mixture may be contaminated with 1 wt. % to 90 wt. % of the fumaronitrile. Preferably, a maleonitrile having a mixing ratio of 50 wt. % or more is used:

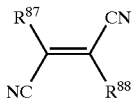

(40)

wherein $R^{87}$ and $R^{88}$ each independently represent hydrogen atom, a halogen atom, hydroxyl group, a substituted or unsubstituted alkyl group, an aryl group, an alkoxy group, an aralkyloxy group, an aryloxy group, an alkenyloxy group, an alkylthio group, an arylthio group, or a heteroaryl group.

The metal halide or metal derivative is usually used in an amount of 0.1 to 20 molar equivalent, preferably 0.1 to 5 molar equivalents. Examples thereof includes Li, Al, Mg, Si, Ca, Ti, V, Mn, Fe, Co, Ni, Cu, Zn, Ge, Mo, Ru, Rh, Pd, Sn, In, Pt, and halides, carboxylic acid derivatives, sulfates, nitrates, carbonyl compounds, oxides, and the like thereof. Preferably used are copper chloride, copper bromide, copper acetate, copper iodide, nickel chloride, nickel acetate, palladium chloride, palladium acetate, zinc chloride, palladium chloride, palladium acetate, vanadium trichloride, silicon tetrachloride, and the like.

Any solvent having a boiling point of 50° C. or higher may be used as the reaction solvent, but preferably the boiling point is 100° C. or higher. Examples thereof include nitrogen-containing heterocyclic solvents such as quinoline; amide solvents such as N,N-dimethylformamide, N,N-dimethylacetamide, N,N-dimethylimidazolidinone, and 1-methyl-2-pyrrolidone; sulfur-containing solvent such as dimethyl sulfoxide and sulfolane; halogenated solvents such as 1-chloronaphthalene; alcohol solvents such as 1-pentanol, 1-octanol, and butanol. The solvent is used in an amount of usually 0.1 to 100 times, preferably 5 to 20 times. Alternatively, the reaction may be carried out without solvent.

The reaction temperature is usually from 50° C. to 230° C., preferably from 100° C. to 210° C.

The reaction time is usually from 30 minute to 10 hours, preferably from 2 hours to 4 hours.

According to the above process for production of the present invention, the azaporphyrin compound represented by the general formula (5) can be produced as a mixture of one kind or two or more kinds of the compounds of the formulae (6) to (8), i.e., a mixture of the compounds of the formulae (41) to (43):

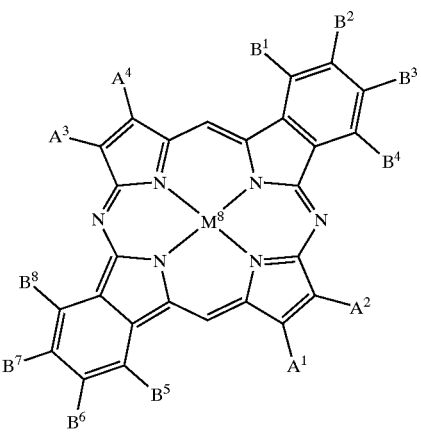

(41)

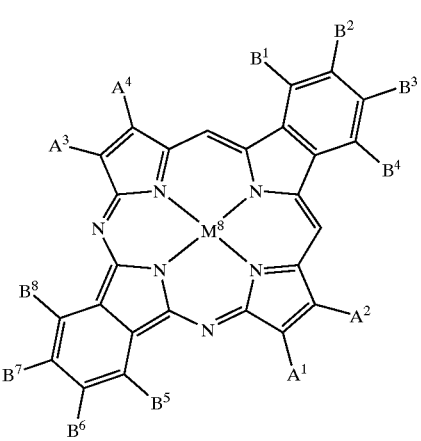

(42)

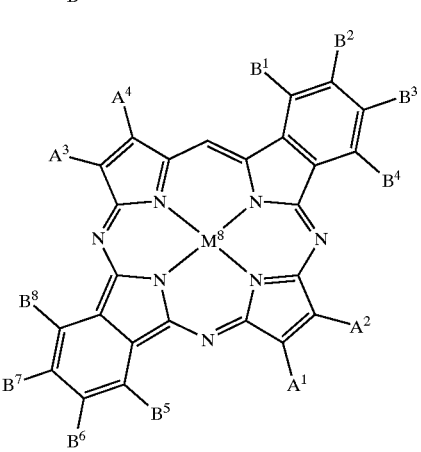

(43)

wherein $A^1$ and $A^2$ represent $R^{81}$ and $R^{82}$ or $R^{12}$ and $R^{81}$ in the formula (9) respectively, $A^3$ and $A^4$ represent $R^{81}$ and $R^{82}$ or $R^{82}$ and $R^{81}$ in the formula (9) respectively, $B^1$, $B^2$, $B^3$, and $B^4$ represent $R^{83}$, $R^{84}$, $R^{85}$, and $R^{86}$ or $R^{86}$, $R^{85}$, $R^{84}$, and $R^{83}$ in the formula (10) respectively, $B^5$, $B^6$, $B^7$, and $B^8$ represent $R^{83}$, $R^{84}$, $R^{85}$, and $R^{86}$ or $R^{86}$, $R^{85}$, $R^{84}$, and $R^{83}$ in the formula (10) respectively, and $M^8$ represents the same meaning as $M^4$ in the formula (5) represents. Specific examples of the azaporphyrin compound represented by the general formula (5) include the compounds (3-1) to (3-11), (4-1) to (4-11), (5-1) to (5-11) having a substituent and the like described in Table 3 to Table 5. By the way, each substituent in the tables may be replaced in the order described in parenthesis.

TABLE 3

(Concrete Examples of the general formula (6))

| Comp. | $R^{45}$ or ($R^{46}$) | $R^{46}$ or ($R^{45}$) | $R^{47}$ or ($R^{48}$) | $R^{48}$ or ($R^{47}$) | $R^{49}$ or ($R^{52}$) | $R^{50}$ $R^{51}$ | $R^{51}$ $R^{50}$ | $R^{52}$ ($R^{49}$) | $R^{53}$ or ($R^{56}$) | $R^{54}$ $R^{55}$ | $R^{55}$ $R^{54}$ | $R^{56}$ $R^{53}$ | $M^5$ |
|---|---|---|---|---|---|---|---|---|---|---|---|---|---|
| 3-1 | —C$_4$H$_9$(t) | H | —C$_4$H$_9$(t) | H | H | H | H | H | H | H | H | H | Cu |
| 3-2 | —CH$_2$CH$_2$CH$_2$— | | —CH$_2$CH$_2$CH$_2$— | | H | H | H | H | H | H | H | H | Cu |
| 3-3 | —C$_4$H$_9$(t) | H | —C$_4$H$_9$(t) | H | H | H | H | H | H | H | H | H | VO |
| 3-4 | —C$_4$H$_9$(t) | —C$_2$H$_5$ | H | —C$_2$H$_5$ | H | H | H | H | H | H | H | H | Co |
| 3-5 | —C$_2$H$_5$ | —C$_2$H$_5$ | —C$_2$H$_5$ | —C$_2$H$_5$ | —OC$_2$H$_5$ | H | H | —OC$_2$H$_5$ | —OC$_2$H$_5$ | H | H | —OC$_2$H$_5$ | Zn |
| 3-6 | Ph* | H | Ph* | H | H | Cl | Cl | H | H | Cl | Ph* | H | Si(OMe)$_2$ |
| 3-7 | —CH$_3$ | —CH$_3$ | —CH$_3$ | —CH$_3$ | iPrO* | H | H | iPrO* | iPrO* | H | H | iPrO* | Pd |
| 3-8 | —SC$_2$H$_5$ | —Br | —SC$_2$H$_5$ | —Br | PhO* | H | H | PhO* | PhO* | H | H | PhO* | Mg |
| 3-9 | PhCH$_2$* | H | PhCH$_2$* | H | 2-thienyl* | H | H | 2-thienyl* | 2-thienyl* | H | H | 2-thienyl* | Mn |
| 3-10 | —OC$_2$H$_5$ | H | —OC$_2$H$_5$ | H | —C$_4$H$_9$(t) | H | H | —C$_4$H$_9$(t) | —C$_4$H$_9$(t) | H | H | —C$_4$H$_9$(t) | AlCl |
| 3-11 | —C$_4$H$_9$(t) | H | —C$_4$H$_9$(t) | H | CyCH(CH$_3$)* | H | H | CyCH(CH$_3$)* | CyCH(CH$_3$)* | H | H | CyCH(CH$_3$)* | Cu |

(where "*" denotes a bonding position.)

(6)

[Chemical structure of formula (6): a phthalocyanine-like macrocycle with central metal $M^5$ coordinated to four N atoms, with substituents $R^{45}$, $R^{46}$, $R^{47}$, $R^{48}$, $R^{49}$, $R^{50}$, $R^{51}$, $R^{52}$, $R^{53}$, $R^{54}$, $R^{55}$, $R^{56}$.]

TABLE 4

(Concrete Examples of the general formula (7))

| Comp. | $R^{57}$ or $(R^{58})$ | $R^{58}$ $(R^{57})$ | $R^{59}$ or $(R^{60})$ | $R^{60}$ $(R^{59})$ | $R^{61}$ or $(R^{64})$ | $R^{62}$ $R^{63}$ | $R^{63}$ $R^{62}$ | $R^{64}$ $(R^{61})$ | $R^{65}$ or $(R^{68})$ | $R^{66}$ $R^{67}$ | $R^{67}$ $R^{66}$ | $R^{68}$ $(R^{65})$ | $M^6$ |
|---|---|---|---|---|---|---|---|---|---|---|---|---|---|
| 4-1 | —C$_4$H$_9$(t) | H | —C$_4$H$_9$(t) | H | H | H | H | H | H | H | H | H | Cu |
| 4-2 | —CH$_2$CH$_2$CH$_2$— | —CH$_2$CH$_2$CH$_2$— | H | H | H | H | H | H | H | H | Cu |
| 4-3 | —C$_4$H$_9$(t) | H | —C$_4$H$_9$(t) | H | H | H | H | H | H | H | H | H | VO |
| 4-4 | —C$_4$H$_9$(t) | H | —C$_4$H$_9$(t) | H | H | H | H | H | H | H | H | H | Co |
| 4-5 | —C$_2$H$_5$ | —C$_2$H$_5$ | —C$_2$H$_5$ | —C$_2$H$_5$ | —OC$_2$H$_5$ | —OC$_2$H$_5$ | H | —OC$_2$H$_5$ | —OC$_2$H$_5$ | H | H | —OC$_2$H$_5$ | Zn |
| 4-6 | *⟨Ph⟩ | H | *⟨Ph⟩ | H | *⟨Ph⟩ | Cl | *⟨Ph⟩ | *⟨Ph⟩ | Cl | *⟨Ph⟩ | H | Si(OMe)$_2$ |
| 4-7 | —CH$_3$ | —CH$_3$ | —CH$_3$ | —CH$_3$ | *—O—iPr | H | H | *—O—iPr | *—O—iPr | H | H | *—O—iPr | Pd |
| 4-8 | —SC$_2$H$_5$ | —Br | —SC$_2$H$_5$ | —Br | *—O—Ph | H | H | *—O—Ph | *—O—Ph | H | H | *—O—Ph | Mg |
| 4-9 | *—CH$_2$Ph | H | *—CH$_2$Ph | H | *⟨thienyl⟩ | H | H | *⟨thienyl⟩ | *⟨thienyl⟩ | H | H | *⟨thienyl⟩ | Mn |
| 4-10 | —OC$_2$H$_5$ | H | —OC$_2$H$_5$ | H | —C$_4$H$_9$(t) | H | H | —C$_4$H$_9$(t) | —C$_4$H$_9$(t) | H | H | —C$_4$H$_9$(t) | AlCl |
| 4-11 | —C$_4$H$_9$(t) | —C$_4$H$_9$(t) | —C$_4$H$_9$(t) | H | *—CH(CH$_3$)—Cy | H | H | *—CH(CH$_3$)—Cy | *—CH(CH$_3$)—Cy | H | H | *—CH(CH$_3$)—Cy | Cu |

(where "*" denotes a bonding position.)

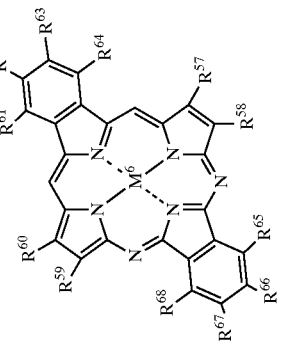

(7)

TABLE 5

(Concrete Examples of the general formula (8))

| Comp. | R⁶⁹ or (R⁷⁰) | R⁷⁰ (R⁶⁹) | R⁷¹ or (R⁷²) | R⁷² (R⁷¹) | R⁷³ or (R⁷⁶) | R⁷⁴ (R⁷⁵) | R⁷⁵ (R⁷⁴) | R⁷⁶ (R⁷³) | R⁷⁷ or (R⁸⁰) | R⁷⁸ (R⁷⁹) | R⁷⁹ (R⁷⁸) | R⁸⁰ (R⁷⁷) | M⁷ |
|---|---|---|---|---|---|---|---|---|---|---|---|---|---|
| 5-1 | —C₄H₉(t) | H | —C₄H₉(t) | H | H | H | H | H | H | H | H | H | Cu |
| 5-2 | —CH₂CH₂CH₂— | | —CH₂CH₂CH₂— | | H | H | H | H | H | H | H | H | Cu |
| 5-3 | —C₄H₉(t) | H | —C₄H₉(t) | H | H | H | H | H | H | H | H | H | VO |
| 5-4 | —C₄H₉(t) | H | —C₄H₉(t) | H | H | H | H | H | H | H | H | H | Co |
| 5-5 | —C₂H₅ | —C₂H₅ | —C₂H₅ | —C₂H₅ | —OC₂H₅ | H | H | —OC₂H₅ | —OC₂H₅ | H | H | —OC₂H₅ | Zn |
| 5-6 | * ⌬ | H | * ⌬ | H | * ⌬ | Cl | ⌬ | Cl | H | H | ⌬ | H | Si(OMe)₂ |
| 5-7 | —CH₃ | —CH₃ | —CH₃ | —CH₃ | *—O—iPr | H | H | *—O—iPr | *—O—iPr | H | H | *—O—iPr | Pd |
| 5-8 | —SC₂H₅ | —Br | —SC₂H₅ | —Br | *—O—Ph | H | H | *—O—Ph | *—O—Ph | H | H | *—O—Ph | Mg |
| 5-9 | *—CH₂Ph | H | *—CH₂Ph | H | *-thienyl | H | H | *-thienyl | *-thienyl | H | H | *-thienyl | Mn |
| 5-10 | —OC₂H₅ | H | —OC₂H₅ | H | —C₄H₉(t) | H | H | —C₄H₉(t) | —C₄H₉(t) | H | H | —C₄H₉(t) | AlCl |
| 5-11 | —C₄H₉(t) | —C₄H₉(t) | H | H | *—CH(CH₃)—CH(CH₃)—C₆H₁₁ | H | H | * | * | H | H | * | Cu |

(8)

(where "*" denotes a bonding position.)

Moreover, the azaporphyrin obtained by the process of the present invention may be subjected to separation and purification, if necessary. Examples of the method for separation and purification include usual purifying methods such as column chromatography, recrystallization, purification by sublimation, and extraction with solvent.

For example, there is mentioned a method wherein a crude product containing azaporphyrin is crystallized using an alcohol solvent such as methanol or ethanol in a state cooled at 0° C. to room temperature and, after filtration of the solid, it is purified by column chromatography, recrystallization, sublimation, extraction of impurity by stirring in a solvent, or the like, if necessary.

For the column chromatography, silica gel or alumina is usually used. The developing solvent may be usually used by selecting from various solvents according to the compound, and use can be made of organic solvents, for example, hydrocarbon solvents such as toluene, hexane, and cyclohexane; halogenated solvents such as chloroform and dichloromethane; alcohol solvents such as methanol; ester solvents such as ethyl acetate; ether solvents such as diethyl ether and tetrahydrofuran; amine solvents such as triethylamine; and amide solvents such as N,N-dimethylformamide.

The recording layer constituting the optical recording medium of the present invention may comprise substantially one or more kinds of the compound of the formula (1). However, if desired, the above compound may be mixed with a compound other than the compound having an absorption maximum at a wavelength of 290 nm to 690 nm and a large refractive index at 300 nm to 700 nm. Specifically, there are mentioned cyanine compounds, squalylium compounds, naphthoquinone compounds, anthraquinone compounds, tetrapyraporphyrazine compounds, indophenol compounds, pyrylium compounds, thiopyrylium compounds, azulenium compounds, triphenylmethane compounds, xanthene compounds, indathrene compounds, indigo compounds, thioindigo compounds, merocyanine compounds, thiazine compounds, acridine compounds, oxadine compounds, dipyrromethene compounds, porphyrine compounds, tetraazaporphyrin compounds, and the like, and a mixture of plurality of the compounds may be used. The mixing ratio of these compounds is from about 0.1 wt. % to 30 wt. %.

At the film formation of the recording layer, in the recording layer may be mixed a quencher, an accelerator for thermal decomposition of a compound, a UV absorber, an adhesive, an endothermic or endothemically decomposable compound, or a polymer capable of enhancing the solubility, or the like.

Specific examples of the quencher include metal complexes, for example, acetylacetonates, bisdithiols such as bisdithio-α-diketones and bisphenyldithiols, thiocathecols, salicylaldehyde oximes, thiobisphenolates, and the like. Also, amines are suitable.

The accelerator for thermal decomposition of a compound is not particularly limited as far as it accelerates the thermal decomposition of a compound, which can be confirmed by thermogravimetric analysis (TG analysis) or the like. Examples thereof include metal compounds such as metal antinocking agents, metalocene compounds, and acetylacetonate metal complexes. Examples of the metal antinocking agents include lead compounds such as tetraethyllead and Mn compounds such as cymanthrene [$Mn(C_5H_5)(CO)_3$]. Moreover, examples of the metalocene compounds include biscyclopentadienyl iron(II) (ferrocene) and also mono or biscyclopentadienyl complex compounds of Fe, Ti, V, Mn, Cr, Co, Ni, Mo, Ru, Rh, Zr, Lu, Ta, W, Os, Ir, Sc, Y, and the like. Of these, ferrocene, ruthenocene, osmocene, nickelocene, titanocene, and derivatives thereof exhibit a good thermal decomposition-accelerating effect.

Other than the above, iron metal compounds include, in addition to the metalocenes, organic acid iron compounds such as iron formate, iron oxalate, iron laurate, iron naphthenate, iron stearate, iron acetate; chelete iron complexes such as acetylacetonate iron complex, phenanthroline iron complex, bispyridine iron complex, ethylenediamine iron complex, ethylenediaminetetraacetic acid iron complex, diethylenetriamine iron complex, diethylene glycol dimethyl ether iron complex, diphosphino iron complex, and dimethylglyoximate iron complex; iron complexes such as carbonyl iron complex, cyano iron complex, and ammine iron complex; iron halides such as ferrous chloride, ferric chloride, ferrous bromide, and ferric bromide; inorganic iron salts such as iron nitrate and iron sulfate; and also iron oxide and the like. Desirably, the accelerator for thermal decomposition to be used herein is soluble in an organic solvent and has a good moisture and heat resistance and a good light resistance.

The above various quenchers and accelerator for thermal decomposition of a compound may be used solely or as a mixture of two or more of them.

As the endothermic or endothemically decomposable compound, there are mentioned compounds described in Japanese Patent Application Laid-Open No. 291366/1998 or compounds having a substituent described in the publication.

Alternatively, it is possible that the compound or polymer residue having a quenching ability, an ability of accelerating thermal decomposition of a compound, a UV absorbing ability, an adhering ability, an endothermic or endothermically decomposable ability is introduced as a substituent of the compound represented by the formula (1).

Namely, the compound residue having a quenching ability, an ability of accelerating thermal decomposition of a compound, a UV absorbing ability, an adhering ability, an endothermic or endothermically decomposable ability may be introduced into an azaporphyrin compound residue of the formula (1) described in the present application by a chemical bonding through at least one single bond, double bond, or triple bond to form one molecule. Preferably, each substituent $R^1$ to $R^{11}$ of the azaporphyrin compound of the formula (3) is a substituent represented by the formula (44):

$$—(L^n)—(J^n) \tag{44}$$

wherein $L^n$ represents a bonding part to the azaporphyrin compound of the formula (2), i.e., a single bond or an atomic chain having 1 to 20 atoms obtainable by connecting at least one selected from methylene group which may be substituted, methine group, amino group, imino group, oxygen atom, or sulfur atom, and $J^n$ represents a compound residue having a quenching ability, an ability of accelerating thermal decomposition of a compound, a UV absorbing ability, an adhering ability, an endothermic or endothermically decomposable ability and corresponding to $R^1$ to $R^{11}$; or, with regard to the combinations of the adjacent substituents $R^1$ and $R^2$, $R^3$ and $R^4$, $R^5$ and $R^6$, $R^7$ and $R^8$, $R^2$ and $R^9$, $R^3$ and $R^9$, $R^4$ and $R^{11}$, $R^5$ and $R^{11}$, $R^6$ and $R^{10}$, and $R^7$ and $R^{10}$, a substituent represented by the formula (45):

$$—(L^{m1})—(J^m)—(L^{m2})— \tag{45}$$

wherein $L^{m1}$ and $L^{m2}$ are adjacent to each other and each represent a combining part to the azaporphyrin compound of the formula (2), i.e., a single bond or an atomic chain having 1 to 20 atoms obtainable by connecting at least one selected from methylene group which may be substituted, methine group, amino group, imino group, oxygen atom, or sulfur atom, and $J^n$ represents a compound residue having a quenching ability, an ability of accelerating thermal decomposition of a compound, a UV absorbing ability, an adhering ability, an endothermic or endothermically decomposable ability and corresponding to $R^1$ to $R^{11}$.

Examples of the preferred atomic chains of $L^n$, $L^{m1}$, and $L^{m2}$ include a single bond, —C(=O)—OCH$_2$—, —C(=O)—OCH(CH$_3$)—, —OCH$_2$—, —OCH(CH$_3$)—, —CH$_2$OCH$_2$—, —CH$_2$OCH(CH$_3$)—, —CH(CH$_3$)OCH(CH$_3$)—, —OC(=O)—, —CH=CH—, —CH=N—, —C(=O)—, —CH=CH—C(=O)O—, —C(C=O)CH$_2$CH$_2$C(=O)O—, and the like.

Preferred examples of $J^n$ and $J^m$ include metalocene residues such as ferocene residue, cobaltocene residue, nickelocene residue, ruthenocene residue, osmocene residue, and titanocene residue.

Examples of the preferred skeletons of the formula (44) include the following metal complex residues:

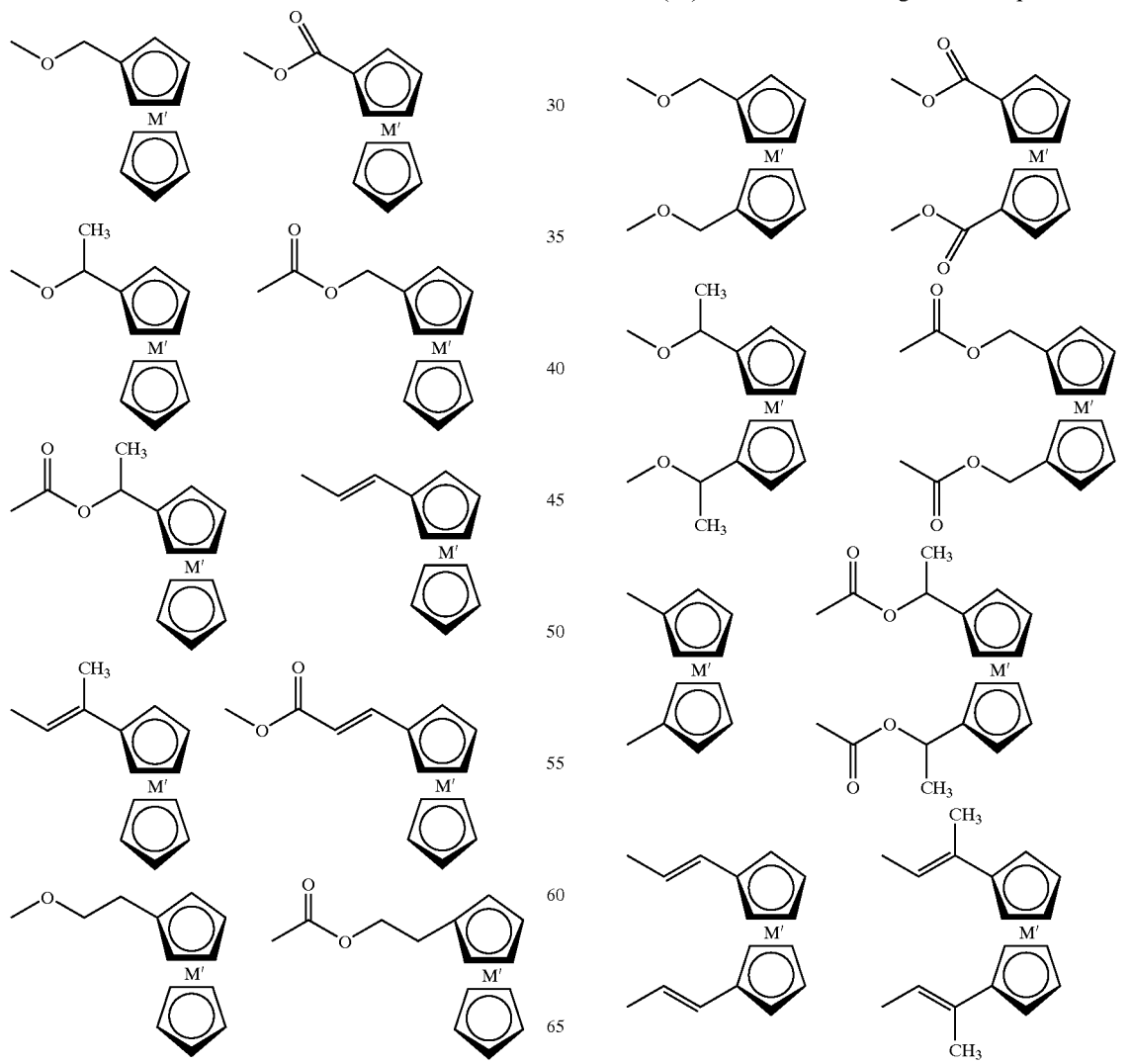

(M' represents Fe, Ru, Co, Ni, Os, or M"Z'$_2$ (M" represents Ti, Zr, Hf, Nb, Mo, or V and Z' represents CO, F, Cl, Br, I, or an alkyl, alkoxy, aryl, aryloxy, aralkyl or aralkyloxy group having 1 to 10 carbon atoms and having a substituent similar to that of the above $R^1$ to $R^8$).

Moreover, examples of the preferred skeletons of the formula (45) include the following metal complex residues:

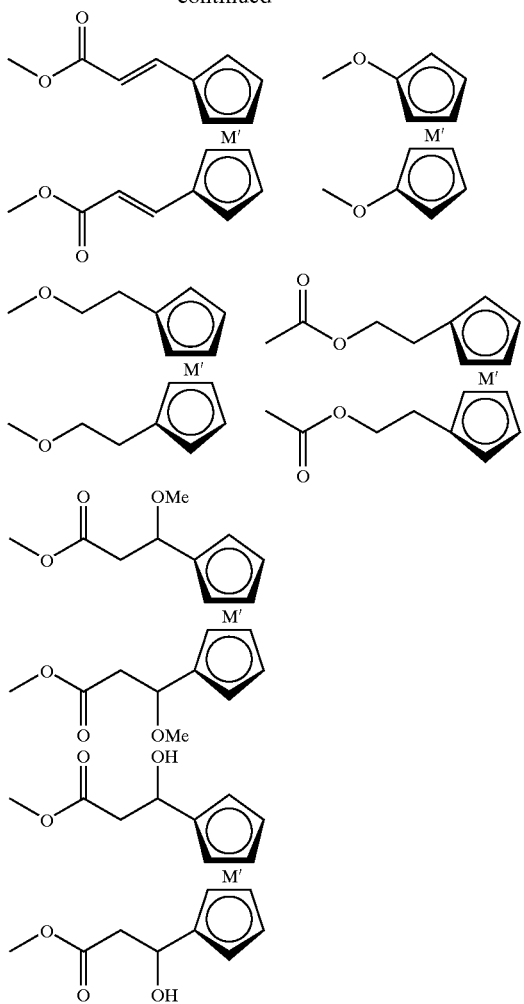

(M' represents Fe, Ru, Co, Ni, Os, or M"Z'$_2$ (M" represents Ti, Zr, Hf, Nb, Mo, or V and Z' represents CO, F, Cl, Br, I, or an alkyl, alkoxy, aryl, aryloxy, aralkyl or aralkyloxy group having 1 to 10 carbon atoms and having a substituent similar to that of the above R$^1$ to R$^8$).

Further, additives such as a binder, a leveling agent, and an antifoaming agent may be added. Preferred binder includes polyvinyl alcohol, polyvinyl pyrrolidone, nitrocellulose, cellulose acetate, ketone resins, acrylic resins, polystyrene resin, urethane resins, polyvinyl butyral, polycarbonates, polyolefins, and the like.

At the film formation of the recording layer on a substrate, for enhancing the solvent resistance of the substrate and the reflectance and the recording sensitivity, a layer comprising an inorganic substance and a polymer may be provided on the substrate.

Therein, the content of the compound represented by the general formula (1) in the recording layer may be any amount capable of recording or replaying, but is usually 30 wt. % or more, preferably 60 wt. % or more. By the way, substantially, the content is preferably 100 wt. %.

Examples of the method for providing the recording layer include coating methods such as spin coating method, spraying method, casting method, sliding method, curtaining method, extrusion method, wiring method, gravure method, spread method, roller coating method, knife method, and dipping method, sputtering method, chemical vapor deposition method, vacuum deposition method, and the like, but spin coating method is preferable owing to the convenience.

In the case of using a coating method such as spin coating method, a coating liquid obtainable by dissolving or dispersing the compound represented by the general formula (1) in a solvent so as to be from 1 to 40 wt. %, preferably from 3 to 30 wt. % is used, and, at that time, the solvent is preferably selected from those without damaging the substrate. Examples thereof include alcohol solvents such as methanol, ethanol, isopropyl alcohol, octafluoropentanol, allyl alcohol, methyl cellosolve, ethyl cellosolve, and tetrafluoropropanol; aliphatic or alicyclic hydrocarbon solvents such as hexane, heptane, octane, decane, cyclohexane, methylcyclohexane, ethylcyclohexane, and dimethylcyclohexane; aromatic hydrocarbon solvents such as toluene, xylene, and benzene; halogenated hydrocarbon solvents such as chloroform, tetrachloroethane, and dibromoethane; ether solvents such as diethyl ether, dibutyl ether, diisopropyl ether, and dioxane; ketone solvents such as acetone and 3-hydroxy-3-methyl-2-butanone; ester solvents such as ethyl acetate and methyl lactate; water; and the like. These solvents may be used solely or as a mixture of two or more of them.

By the way, the compound for the recording layer can be also used with dispersing it into a polymer thin film, if necessary.

The film thickness of the recording layer is usually from 30 nm to 1000 nm, preferably 50 nm to 300 nm. When the film thickness of the recording layer is thinner than 30 nm, recording cannot be affected or a distortion of the recorded signal occurs and also a signal amplitude becomes small in some cases owing to a large thermal diffusion. Moreover, when the film thickness is thicker than 100 nm, the reflectance decreases and replaying signal properties are deteriorated in some cases.

Next, on the recording layer is preferably formed a reflective layer having a thickness of 50 nm to 300 nm. For the purpose of enhancing the reflectance and adhesiveness, a reflection-amplifying layer or an adhesive layer may be provided between the recording layer and the reflective layer. As the material for the reflective layer, use can be made of a material having a sufficiently high reflectance at a wavelength of the replay light, for example, a metal such as Au, Al, Ag, Cu, Ti, Cr, Ni, Pt, Ta, and Pd solely or as an alloy. Of these, Au, Ag, and Al have a high reflectance and thus are suitable for the materials of the reflective layer.

In the case that the recording and replay are conducted with a blue laser, Al or Ag is suitable. Other than these, the following may be contained. Examples include metals or metaloids such as Mg, Se, Hf, V, Nb, Ru, W, Mn, Re, Fe, Co, Rh, Ir, Zn, Cd, Ga, In, Si, Ge, Te, Pb, Po, Sn, and Bi. Moreover, materials containing Ag or Al as the main component are suitable because a reflective layer having a high reflectance is easily obtained. It is also possible that a multilayered film is formed with materials other than metals by stacking thin films having a low refractive index and thin films having a high refractive index-alternately and is used as a reflective layer.

Examples of the method for forming the reflective layer include sputtering method, ion-plating method, chemical vapor deposition method, vacuum deposition method, and the like. Moreover, a known inorganic or organic intermediary layer or adhesive layer may be provided on the substrate or under the reflective layer for the purpose of enhancing reflectance, improving recording properties, and enhancing adhesiveness.

Furthermore, the material of the protective layer formed on the reflective layer is not particularly limited as far as it protects the reflective layer from an external force. As inorganic substances, $SiO_2$, $Si_3N_4$, $MgF_2$, AlN, $SnO_2$ and the like are mentioned. In addition, as organic substances, thermoplastic resins, thermosetting resins, electron beam-setting resins, ultraviolet-setting resins, and the like can be mentioned. The thermoplastic resin, thermosetting resin, or the like can be formed by dissolving them in an appropriate solvent to prepare a coating liquid and them applying the coating liquid, followed by drying. The ultraviolet-setting resin can be formed, after a coating liquid is prepared as it is or by dissolving it in an appropriate solvent, by applying the coating liquid and irradiating ultraviolet ray to cure. As the ultraviolet-setting resins, acrylate resins such as urethane acrylate, epoxy acrylate, and polyester acrylate may be used, for example. These materials may be used solely or as a mixture and may be used not only as a monolayer but also as a multilayered film.

As the methods for forming the protective layer, spin coating method, casting method, sputtering method, chemical vapor deposition method, and the like may be used as in the case of the recording layer, but, of these, spin coating method is preferred.

The film thickness of the protective layer is generally from 0.1 $\mu$m to 100 $\mu$m but, in the present invention, is from 3 $\mu$m to 30 $\mu$m, more preferably 5 $\mu$m to 20 $\mu$m.

On the protective layer, a label, bar cord, or the like may be printed.

Moreover, it is also possible to use a means that a protective sheet or substrate is adhered to the surface of the reflective layer or that two optical recording media are adhered each other with facing the surfaces of the reflective layers inside.

On the mirror surface of the substrate, a film of ultraviolet-setting resin or inorganic thin film may be formed for protecting the surface or preventing the attachment of dust or the like.

Moreover, in the case of making an optical recording medium as shown in FIG. 3, a reflective layer having a thickness of 1 nm to 300 nm is preferably formed on the substrate. For the purpose of enhancing reflectance or improving adhesiveness, a reflectance-amplifying layer or adhesive layer may be provided between the recording layer and the reflective layer. As the material for the reflective layer, use can be made of material having a sufficiently high reflectance at a wavelength of the replay light, for example, a metal such as Al, Ag, Ni, or Pt solely or as an alloy. Of these, Ag and Al have a high reflectance and thus are suitable for the materials of the reflective layer. Other than these, the following may be contained, if necessary. Examples include metals or metaloids such as Mg, Se, Hf, V, Nb, Ru, W, Mn, Re, Fe, Co, Rh, Ir, Zn, Cd, Ga, In, Si, Ge, Te, Pb, Po, Sn, Bi, Au, Cu, Ti, Cr, Pd, and Ta. Materials containing Ag or Al as the main component, from which a reflective layer having a high reflectance is easily obtained, are suitable. It is also possible that a multilayered film is formed with materials other than metals by stacking thin films having a low refractive index and thin films having a high refractive index alternatively and is used as a reflective layer.

Examples of the method for forming the reflective layer include sputtering method, ion-plating method, chemical vapor deposition method, vacuum deposition method, and the like. Moreover, a known inorganic or organic intermediary layer or adhesive layer may be provided on the substrate or under the reflective layer for the purpose of enhancing reflectance, improving recording properties, and enhancing adhesiveness.

Next, at the film formation of a recording layer on the reflective layer, in order to enhance solvent resistance of the reflective layer and reflectance and recording sensitivity, a layer comprising an inorganic substance and a polymer may be provided on the reflective layer.

Therein, the content of the compound represented by the general formula (1) in the recording layer may be any amount capable of recording or replaying, but is usually 30 wt. % or more, preferably 60 wt. % or more. By the way, substantially, the content is also preferably 100 wt. %.

Examples of the method for providing the recording medium include coating methods such as spin coating method, spraying method, casting method, sliding method, curtaining method, extrusion method, wiring method, gravure method, spread method, roller coating method, knife method, and dipping method, sputtering method, chemical vapor deposition method, vacuum deposition method, and the like, but spin coating method is preferable owing to the convenience.

In the case of using a coating method such as spin coating method, a coating liquid obtainable by dissolving or dispersing the compound represented by the general formula (1) in a solvent so as to be from 1 to 40 wt. %, preferably from 3 to 30 wt. % is used, but the solvent is preferably selected from those without damaging the reflective layer at that time. Examples thereof include alcohol solvents such as methanol, ethanol, isopropyl alcohol, octafluoropentanol, allyl alcohol, methyl cellosolve, ethyl cellosolve, and tetrafluoropropanol; aliphatic or alicyclic hydrocarbon solvents such as hexane, heptane, octane, decane, cyclohexane, methylcyclohexane, ethylcyclohexane, and dimethylcyclohexane; aromatic hydrocarbon solvents such as toluene, xylene, and benzene; halogenated hydrocarbon solvents such as chloroform, tetrachloroethane, and dibromoethane; ether solvents such as diethyl ether, dibutyl ether, diisopropyl ether, and dioxane; ketone solvents such as acetone and 3-hydroxy-3-methyl-2-butanone; ester solvents such as ethyl acetate and methyl lactate; water; and the like. These solvents may be used solely or as a mixture of two or more of them.

By the way, the compound for the recording layer can be also used with dispersing it into a polymer thin film, if necessary.

Moreover, when a solvent causing no damage to the reflective layer cannot be selected, sputtering method, chemical vapor deposition method, vacuum deposition method, and the like are effective.

The film thickness of the recording layer is usually from 1 nm to 1000 nm, preferably 5 nm to 300 nm. When the film thickness of the recording layer is thinner than 1 nm, recording cannot be affected or a distortion on the recorded signal occurs and also a signal amplitude becomes small in some cases. Also, when the film thickness is thicker than 100 nm, reflectance decreases and replaying signal properties are deteriorated in some cases.

Furthermore, the material for the protective layer formed on the recording layer is not particularly limited as far as it protects the recording layer from external adverse effects such as an external force or an atmosphere. As inorganic substances, $SiO_2$, $Si_3N_4$, $MgF_2$, AlN, $SnO_2$ and the like are mentioned. In addition, as organic substances, thermoplastic resins, thermosetting resins, electron beam-setting resins, ultraviolet-setting resins can be mentioned. The thermoplastic resin, thermosetting resin, or the like can be formed by dissolving them in an appropriate solvent to prepare a coating liquid and them applying the coating liquid, followed by drying. The ultraviolet-setting resin can be formed, after a coating liquid is prepared as it is or by dissolving it in an appropriate solvent, by applying the coating liquid and irradiating ultraviolet ray to cure. As the ultraviolet-setting resins, acrylate resins such as urethane acrylate, epoxy acrylate, and polyester acrylate may be used, for example. These materials may be used solely or as a mixture and may be used not only as a monolayer but also as a multilayered film.

As the methods for forming the protective layer, spin coating method, casting method, sputtering method, chemical vapor deposition method, and the like may be used as in the case of the recording layer, but, of these, spin coating method is preferred.

The film thickness of the protective layer is generally from 0.01 µm to 1000 µm, but may be from 0.1 µm to 100 µm in some cases, furthermore 1 µm to 20 µm.

Moreover, it is also possible to use a means that a protective sheet or reflective layer is adhered to the surface of the substrate or that two optical recording media are adhered each other with facing the surfaces of the substrates inside.

On the surface of the protective layer side, a film of ultraviolet-setting resin or inorganic thin film may be formed for protecting the surface or preventing the attachment of dust or the like.

In the optical recording medium of the present invention, for the purpose of protecting the whole medium, a case-type protective unit protecting a disc may be provided as shown in floppy disc or magneto-optical disc. As the material, a plastic or a metal such as aluminum may be used.

Therein, the lasers having a wavelength of 300 nm to 500 nm and 500 nm to 700 nm according to the present invention are not particularly limited, but examples thereof include dye lasers which allow to select wavelengths from a wide range of visible light region, gas lasers such as He—Ne laser (633 nm) and nitrogen laser (337 nm), ion lasers such as helium cadmium laser having a wavelength of 430 nm or 445 nm or 325 nm and argon laser having a wavelength of 457 nm or 488 nm, GaN laser having a wavelength of 400 to 410 nm, a laser oscillating second higher harmonic wave at 430 nm of a infrared laser having a wavelength of 860 nm using $LiSnAlF_6$ doped with Cr, and also semiconductor lasers such as visible semiconductor lasers having wavelengths of 415, 425, 602, 612, 635, 647, 650, 660, 670, and 680 nm, and the like. In the present invention, the above semiconductor laser or the like can be optionally selected according to the wavelength at which the recording layer for conducting recording or replay is sensitive. High-density recording and replay each is possible at one wavelength or plural wavelengths selected form the above semiconductor lasers.

In the organic dye constituting the recording layer of the optical recording medium of the present invention, the absorption waveband having the above second maximum value functions as an energy relaxing level. This is fundamentally different from the method of blending a quencher or the like having an absorption or energy level at the longer wavelength side, i.e., utilization of intermolecular interaction as hitherto disclosed in Japanese Patent Application Laid-Open Nos. 340480/1998, 208118/1999, and 235999/1998, and so forth, and enables a rapid excited energy relaxation, so that it is possible to suppress efficiently a deterioration process caused by a photoreaction. Moreover, in general, it is not necessary to consider the trade-off with recording properties which has been impaired by the addition of the quencher or the like and furthermore it becomes possible to conduct the recording and reply with the same short-wavelength laser, so that an effect contributing to a high-density recording is large.

The following will describe the mode for carrying out the present invention. By the way, in the following description, a medium of an optical disc having a guide groove on a supporting substrate and a reflective layer and a recording layer comprising an organic dye as the main component on the guide groove and capable of recording and replaying signals by irradiation with an ultraviolet blue-violet laser light is described as an optical recording medium. However, the optical recording medium of the present invention is not limited to such shape and constitution, and may be in various shapes such as card shape and sheet shape, or may be a medium having no reflective layer, and also may be applicable to the recording and replay with a short-wavelength laser which will be developed in future.

Figure 5:
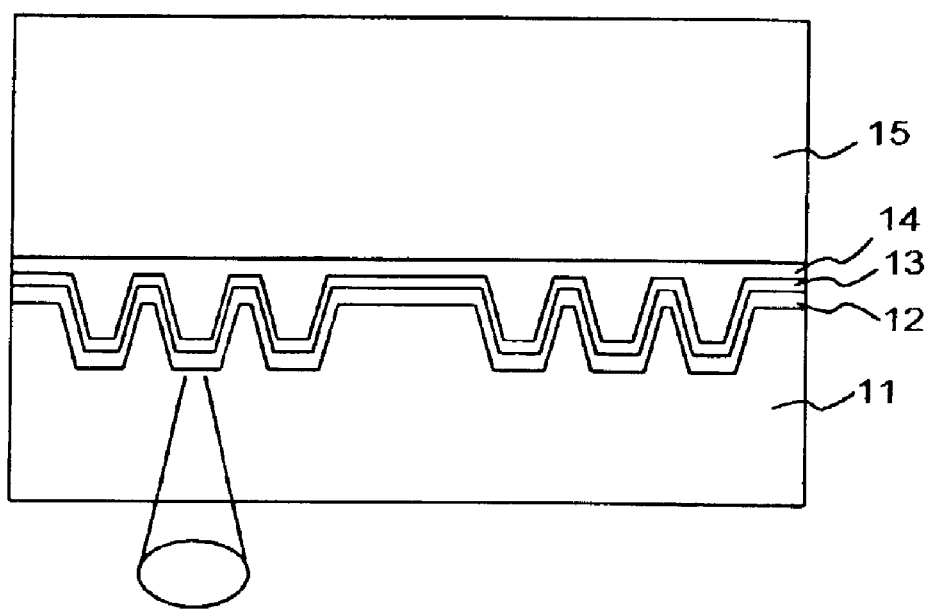
FIG. 5 is a schematic sectional view relating to one embodiment of the optical recording medium of the present invention.

As an example of the present invention applied to an optical disc, there is mentioned a disc wherein a substrate 11, a recording layer 12, a reflective layer 13, and a protective layer 14 are laminated in this order and furthermore, a dummy substrate 15 is adhered onto the protective layer which also acts as an adhesive layer as shown in FIG. 5. Of course, a constitution lacking the substrate 15 is also possible, and other layer may be present between the substrate 11 and the recording layer 12, between the recording layer 12 and the reflective layer 13, between the reflective layer 13 and the protective layer 14, and between the protective layer and the dummy substrate 15. In the optical disc shown in FIG. 5, the recording and replay are conducted from the side of substrate 11.

Figure 6:
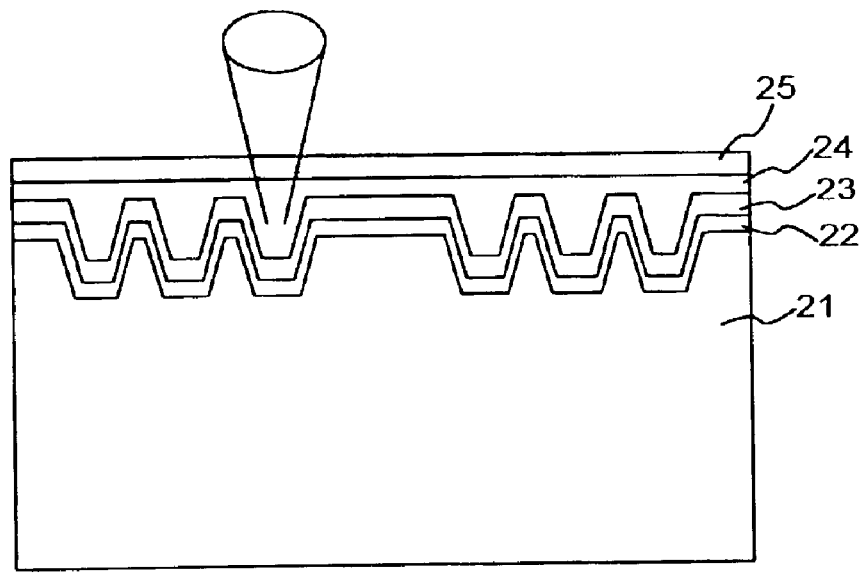
FIG. 6 is a schematic sectional view relating to one embodiment of the optical recording medium of the present invention.
Figure 7:
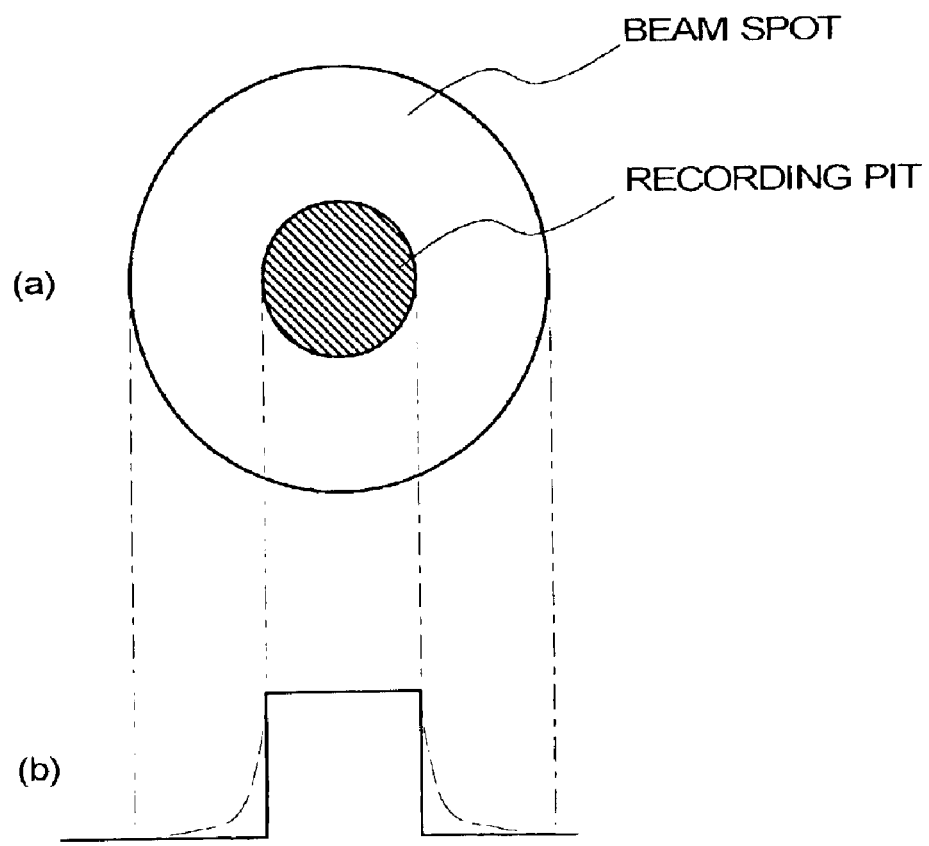
FIG. 7 is a conceptual view explaining the problem of the present invention.

Moreover, as another mode, in the constitution disclosed in Japanese Patent Application laid-Open No. 302310/1998, as shown in FIG. 6, for example, a reflective layer 22 and a recording layer 23 comprising an organic dye as a main component are formed in this order on the supporting substrate 21 on which a guide groove is formed, a light-transmitting layer 25 is formed through a transparent protective layer 24 optionally formed on the recording layer 23, and the recording and replay of information are conducted from the side of the light-transmitting layer 25. By the way, contrarily, it is also possible to form a constitution wherein a guide groove is formed at the side of the light-transmitting layer 25, a transparent protective layer 24, a recording layer 23 and a reflective layer 22 are laminated thereon, and the whole is adhered to a supporting substrate 21.

As the material of the supporting substrate, in consideration of the case of the irradiation with a blue-violet laser through the substrate 11 as shown in FIG. 5, a transparent material, e.g., a polymer material such as an acrylic resin, polyethylene resin, a polycarbonate resin, a polyolefin resin, or an epoxy resin or an inorganic material such as glass is utilized. On the other hand, as the constitution shown in FIG. 6, in the case of the irradiation with a laser from the light-transmitting layer 25 which is the reverse of the case irradiation from the substrate 21, the material of the substrate is not necessarily satisfy various optical requirements, and can be selected from a wider range of materials. From the viewpoints of the mechanical properties required for the substrate and the substrate productivity, preferred are materials capable of subjecting to injection molding or cast molding, such as acrylic resins, polycarbonates, and polyolefins.

On the surface layers of these substrates, a guide groove and/or pre-pits of sub-micron order may be formed spirally or concentrically. These guide groove and pre-pits are preferably provided at the substrate formation, and they can be provided by injection molding using a stamper original disc or thermal transcription method using a photopolymer. By the way, the guide groove and/or pre-pits may be formed on the light-transmitting layer 25 in FIG. 6, and a similar method can be applied in the case of providing them. The pitch and depth of the guide groove are preferably selected from the range of 0.25 to 0.80 μm for the pitch and from the range of 20 to 150 nm for the depth in the case of HD-DVDR wherein recoding is conducted in higher density than the case of DVD.

As the material constituting the recording layer in the optical recording medium of the present invention, selected is a material having a sufficient absorption at the wavelength range of the laser of interest and capable of causing change of refractive index and/or change of shape through a physical or chemical change, alternation, or decomposition along with photothermal conversion caused by irradiation with a laser light having a predetermined energy. In particular, as the organic dye to be used as the main component of the recording layer, it is important to have a good optical constant balance between refractive index (n) and absorption coefficient (k), provided that complex refractive index=n+ik at recording and replay wavelength, from the viewpoints of recording sensitivity, high reflectivity, recording amplitude (modulation), and waveform distortion. Namely, in the present invention, in the declining slope at longer wavelength side of the absorbing band containing first maximum value in the light absorption spectrum of the organic dye, it is preferable to exist a waveband where the refractive index (n) and absorption coefficient (k) of the above organic dye satisfy the following relation:

$$n \geq 1.90$$

$$0.03 \leq k \leq 0.30$$

and more preferably, $$n \geq 2.00$$

$$0.03 \leq k \leq 0.30.$$

And, assuming that any wavelength contained in the waveband is $\lambda 0$, the $\lambda 0$ is used as the recording wavelength. Conversely, such a waveband preferably has a light spectrum containing a laser wavelength $\lambda 0$ which is practical as a recording light. Furthermore, with regard to the recording wavelength $\lambda 0$, the application of a laser capable of emitting in an ultraviolet region is assumed, and thus the wavelength is preferably within the range of 300 nm to 450 nm. As a stable light source in the range, GaN semiconductor laser, XeCl excimer laser, HeCd laser, YAG laser (triple wave), or the like is applied. In consideration of the stability of laser and workability at the incorporation into a system, GaN semiconductor laser is the best and $\lambda 0$ is more preferably selected from the range of 390 nm to 430 nm, which is a stable emitting band thereof. Therein, in the case that the refractive index is small, the recording modulation is difficult to acquire. On the other hand, when the absorption coefficient is small, the recording sensitivity cannot be ensured. Contrarily, when the coefficient is too large, the absorption is large and thus heat generation becomes too large to avoid the distortion of pit shape by heat interference. Furthermore, the characteristic of the present invention is that the organic dye has an absorption band which functions as a level capable of relaxing excess energy at the excitation by the photoreaction at the irradiation with the laser.

Namely, in the surrounding area (beam spot) of a recording pit at the recording and the irradiated area at the replay, the laser of the wavelength $\lambda 0$ to be used enhances the energy level of the organic dye to excited level causing a photoreaction, even though it is an irradiation energy less than threshold value causing no thermal change in the recording layer. However, surprisingly, it has been found that, when an appropriately sharp absorption band exists at longer wavelength side of the wavelength $\lambda 0$, the energy shifts to the energy level corresponding to the absorption band, which can suppress the enhancement of the energy level of the organic dye to an excited level. With regard to the wavelength ($\lambda 2$) exhibiting second maximum value present in such an absorption band, the function as a better relaxation level can be ensured by its existence at longer wavelength side which is from 100 nm to 400 nm longer than the wavelength $\lambda 0$ in the case of using a blue-violet laser of 390 nm to 430 nm as the recording wavelength $\lambda 0$. Moreover, at that time, it is preferable that the molecular extinction coefficient ($\epsilon$) of the organic dye at the second maximum value satisfies:

$$\epsilon > 10E+4 \text{ cm}^{-1} \text{ mol}^{-1}.$$

The optical recording medium of the present invention is preferably recorded at the wavelength range of 300 nm to 450 nm, more preferably from 390 nm to 430 nm.

The most suitable organic dyes satisfying such requirements can be found from metal complexes such as phthalocyanine, diphthalocyanine, subphthalocyanine, porphyrin, tetraazaporphyrin, triazaporphyrin, diazaporphyrin, monoazaporphyrin, and low symmetrical porphyrazine, naphthoquinone, anthraquinone, heteroquinoids containing a heteroatom, and mixtures of two or more of them. In view of optical balance, as those having a good light resistance, preferred are phthalocyanine dyes, subphthalocyanine dyes, porphyrin dyes, azaporphyrin dyes such as tetraazaporphyrin, diazaporphyrin, monoazaporphyrin, and low symmetrical porphyrazine, quinone dyes such as naphthoquinone and anthraquinone, and mixtures of two or more of them. In particular, phthalocyanine dyes, tetraazaporphyrin, monoazaporphyrin, diazaporphyrin, and low symmetrical porphyrazine, and mixtures of two or more of them are preferred. For example, by mixing tetraazaporphyrin and diazaporphyrin or monoazaporphyrin, the requirement $n \geq 1.90$ can be realized at a wavelength of about 400 nm. In these compound groups, particularly in phthalocyanine, azaporphyrin, and porphyrin dyes, Soret band is usually present in an ultraviolet region of 400 nm or less, and an absorption band (energy level) having a distinct maximum value such as Q band as a representative at longer wavelength side within 400 nm from the Soret band is observed. By selecting a compound wherein the absorption coefficient ($\epsilon$) and refractive index (n) in the skirts of the Soret band at the recording wavelength $\lambda 0$ is fitted so as to satisfy the above requirements, the wavelength $\lambda 2$ exhibiting second maximum value in the absorption band at longer wavelength side such as Q band as a representative has an energy gap of 100 nm or more from the recording wavelength $\lambda 0$ to longer wavelength side, and the second maximum value has an appropriately sharp strength, that is, the molecular extinction coefficient ($\epsilon$) satisfies:

$$\epsilon > 10E+4 \text{ cm}^{-1} \text{ mol}^{-1},$$

the absorption band to which the second maximum value belongs functions as an light energy relaxing level, and thus the deterioration of the recording layer caused by a photoreaction can be suppressed. When the energy gap is small, the energy level even when relaxed is still a high energy level, and thus a photoreaction sometimes proceeds. In the case of a large energy gap, rapid energy relaxation cannot occur, and thus photodegradation sometimes proceeds.

Preferably, it is desirable that the energy gap corresponds to 100 to 250 nm. At that time, with regard to the nature of the excited state of the organic dye molecule, the occurrence of the rapid relaxation to lowest excited singlet level even when electronic excitation to the upper level (in this case, Soret band) of first excited singlet (in this case, Q band) occurs is confirmed by the existence of the emission (fluorescence) from first excited level. Namely, the confirmation that the excited energy to a high level immediately relaxes to the lowest level is possible by means of a highly precise emission spectroscopy. In particular, this kind of verification has already been conducted in a solution system antecedently. For example, in many phthlocyanines, fluorescence is confirmed at a little longer wavelength side of Q band for the photoexcitation to Soret band, and similar observations have been conducted in several porphyrin compounds.

On the mother nucleus of the fundamental molecule of the organic dye thus selected, various modification with substituents may be possible, and thereby wavelength fitting, improvement of workability such as solubility of the dye, and the like can be effected. These materials can be formed into a film by dissolving or suspending them in an appropriate solvent and applying the solution or suspension by spin coating, spraying, or the like, followed by drying. Moreover, for the purpose of more highly dense recording, in the case of recording both on the part between the guide groove (land part) and in the groove (groove part) (land.groove recording), vacuum deposition, sputtering, molecular beam method (MBE), or the like is applied, since it is necessary to achieve a control of homogeneity of the dye film thickness at both the groove and land. In order to provide recording region both in the guide groove (groove part) and on the part between the guide groove (land part), use is made of a method wherein the ratio of the width of the guide groove measured at the half of the depth of the guide groove and the space between the guide groove is determined within the range of 0.8 to 1.2, a method wherein pre-pits for sector management are formed both in the guide groove and on the part between the guide groove, or the like.

The film thickness of the recording layer is preferably formed in the range of 20 to 200 nm, more preferably 30 to 150 nm. For suppressing heat interference, it is desirable to ensure a high refractive index and to make the film as thin as possible.

In the optical recording medium of the present invention, as shown in the above FIGS. 5 and 6, the reflective layer is desirably provided adjacent to the recording layer. The materials of the reflective layer include metals such as gold, silver, aluminum, platinum, and copper, and alloys containing them. By the way, in the case that the corresponding laser wavelength is blue-violet color of 390 to 430 nm, silver, aluminum, and alloys containing them are preferable in view of the cost and optical properties. In particular, preferred are silver and alloys thereof, and, from the viewpoint of the durability, alloys of silver and Ti, Pd, Cu, or the like are particularly preferred. The thickness of the reflective layer is usually from 20 to 120 nm, preferably 20 to 80 nm. As the method for forming the reflective layer, vacuum deposition method, sputtering method, ion-plating method, or the like may be applied.

In the constitution shown in FIG. 5, a protective layer is formed by, for example, spin-coating an organic material such as an ultraviolet-setting resin, a thermosetting resin, a two-pack type setting resin, or a room-temperature setting resin on the reflective layer. Furthermore, as shown in FIG. 5, a dummy substrate may be adhered onto the protective layer or the substrate provided with a recording layer may be adhered with facing the protective layer as in the case of the conventional DVDR.

Moreover, also in the case of the structure as shown in FIG. 6, a reflective layer and a recording layer are successively formed on the substrate on which a guide groove (pre-groove) has been formed, and an ultraviolet-setting resin is applied on the recording layer, drawn, and then cured with UV irradiation to form a light-transmitting layer. Alternatively, it is also possible that the light-transmitting layer is separately formed as the film having a homogeneous thickness and then it is adhered through an adhesive layer comprising an ultraviolet-setting resin or the like. In the case that a light-transmitting layer and a adhesive layer are formed on a recording layer, for avoiding the dissolution of the organic dye into the ultraviolet-setting resin, it is effective to form a transparent protective layer between the organic dye and these layers. The transparent protective layer is formed from a transparent material selected from oxides, nitrides, sulfides, and fluorides such as $SiO_2$, SiN, AlN, ZnS, and $MgF_2$, and mixtures thereof. Furthermore, in the optical recording medium of this constitution, it is possible to form a constitution wherein a sheet comprising, for example, a polycarbonate having a thickness of 10 to 200 μm formed by injection molding or casting method, on which guide grooves are formed by stamper thermal transcription, is used as the light-transmitting layer, the films of a recording layer and a reflective layer are formed in this order, and further a substrate is adhered thereto.

For the evaluation of these media, use can be made of a disc tester manufacture by Shibasoku or Pulsetech Industries equipped with an optical head having a blue-violet laser chip (manufactured by Nichia corporation) available at present.

The following will illustrate Examples of the present invention, but the invention is by no means limited thereby.

First, the first group of the present invention will be explained.

Synthetic Example 1

Synthesis of the Compound (1-1) in Table-1:

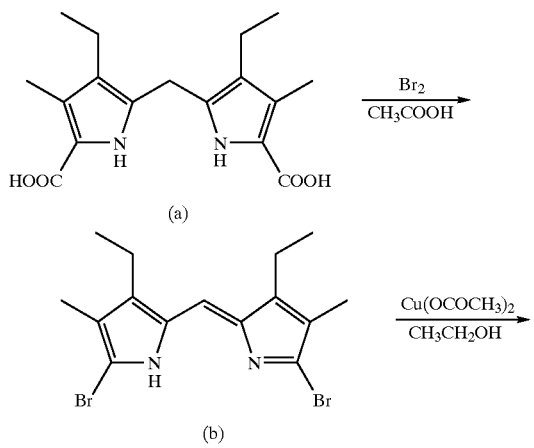

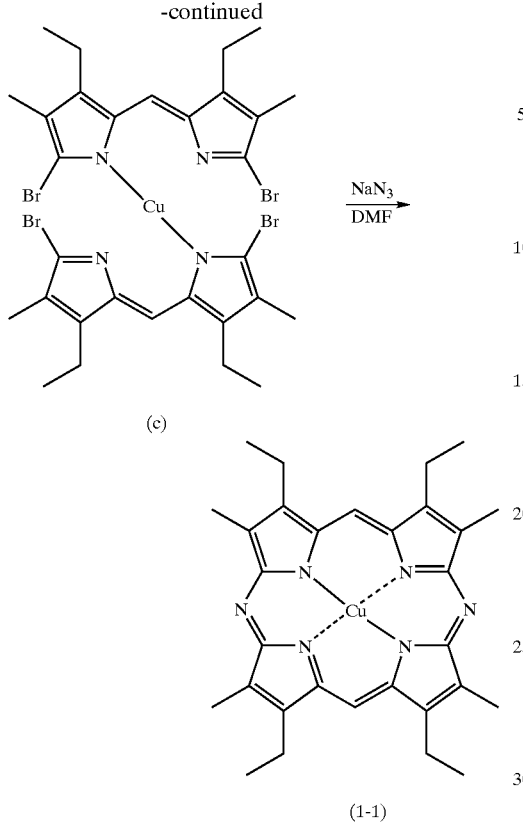

(c)

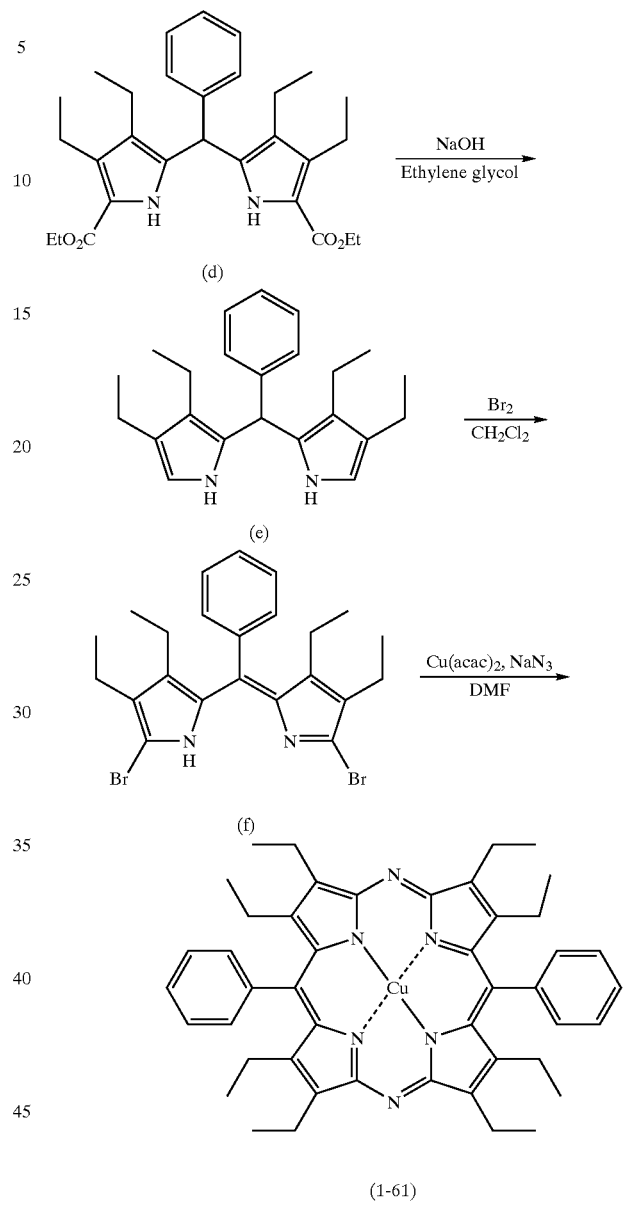

In 40 ml of acetic acid was dissolved 7.0 g of the compound (a), and 6.8 g of bromine was added dropwise thereto, followed by 4 hours of stirring at room temperature. The reaction mass was discharged into 750 ml of saturated saline and the discharged mass was filtered. The filtered mass was washed with water and then dried to obtain 7.6 g of the dibromo compound of the formula (b).

Subsequently, 5.0 g of the dibromo compound (b) was dissolved in 250 ml of ethanol and 3.8 g of anhydrous copper acetate was added thereto, followed by 7 hours of stirring at room temperature. The reaction mass was discharged into 500 ml of water and the discharged mass was filtered. The filtered mass was washed with water and dried to obtain 4.4 g of the copper complex of the formula (c).

Then, 4.4 g of the copper complex (c) and 18 g of sodium azide were dissolved in 250 ml of N,N-dimethylformamide (hereinafter abbreviated as DMF) and the whole was refluxed for 1 hour. The reaction mass was filtered and the filtered mass was washed with DMF, water, and ethanol and then dried to obtain 0.41 g of the compound (1-1).

The following describes the analytical results of the compound (1-1).

Elemental Analysis: $C_{30}H_{34}CuN_6$

|  | C | H | N |
|---|---|---|---|
| Calcd. (%) | 66.46 | 6.32 | 15.50 |
| Found (%) | 66.75 | 6.38 | 15.31 |

FD-MS m/z: 541
Absorption spectrum (in chloroform)
  381.5 nm ($\epsilon$g $1.61 \times 10^5$ ml g$^{-1}$ cm$^{-1}$)
  584.0 nm ($\epsilon$g $1.37 \times 10^5$ ml g$^{-1}$ cm$^{-1}$)

Synthetic Example 2
Synthesis of the Compound (1-61) in Table-1

The compound (d) (20.0 g) and ethylene glycol (155 mL) were charged and the whole was heated at 190° C. A 250 mL portion of 1.0 mol/L sodium hydroxide/ethylene glycol solution was charged and the whole was stirred at 190° C. for 1 hour. After cooling to room temperature, 500 mL of water was added thereto, followed by extraction with chloroform. The organic layer was washed with water and saturated saline and, after drying over sodium sulfate; the solvent was removed by evaporation to obtain 16.9 g of the compound (e).

Next, 16.9 g of the compound (e) and 1 L of dehydrated methylene chloride were charged into a reaction vessel and nitrogen-bubbling was conducted for 10 minutes, followed by cooling to −5. Then, 20.6 g of bromine was added dropwise at −5° C., followed by 2 hours of stirring at −5° C. The solvent was removed by evaporation to obtain 25.3 g of the compound (f).

A 22.0 g portion of the compound (f), 50.2 g of sodium azide, 10.1 g of copper (II) acetylacetonate (hereinafter abbreviated as Cu(acac)₂), and 1550 mL of dehydrated DMF were charged, followed by 30 minutes of stirring at 120° C. The reaction mass was discharged into 2 L of water, the discharged mass was filtered, and the residue was washed with toluene. The washing liquid was extracted with toluene, and the organic layer was washed with water and then dried over sodium sulfate. The organic layer was concentrated and the residue was subjected to silica gel column chromatography (solvent: chloroform) to remove highly polar components, whereby a crude solid of a dye component was separated. The separated solid was mixed with 150 mL of methanol and the whole was stirred at room temperature and filtered. After the operation was repeated ten times, the product was again subjected to silica gel column chromatography (solvent: toluene:hexane=1:1) to isolate a dye component. The dye solid was mixed with 20 mL of acetone and the mixture was stirred at room temperature and filtered. This operation was repeated three times and then the solid was mixed with 20 mL of ethyl acetate, followed by stirring at room temperature. After filtration, the filtered mass was dried to obtain 2.7 g of the compound (1-61) as a red-purple solid.

The following describes the analytical results of the compound (1-61).

Elemental Analysis: $C_{46}H_{50}CuN_6$

|  | C | H | N |
|---|---|---|---|
| Calcd. (%) | 73.62 | 6.72 | 11.20 |
| Found (%) | 73.46 | 6.76 | 11.28 |

FD-MS m/z: 749

Absorption spectrum (in chloroform)

397.5 nm ($\epsilon g$ 1.21×10⁵ ml g⁻¹ cm⁻¹)

594.0 nm ($\epsilon g$ 1.15×10⁵ ml g⁻¹ cm⁻¹)

378.5 nm ($\epsilon g$ 1.08×10⁵ ml g⁻¹ cm⁻¹)

This compound could be dissolved in chloroform even at the concentration of 10 g/L.

Synthetic Example 3

Synthesis of the Compound (2-1) in Table-2

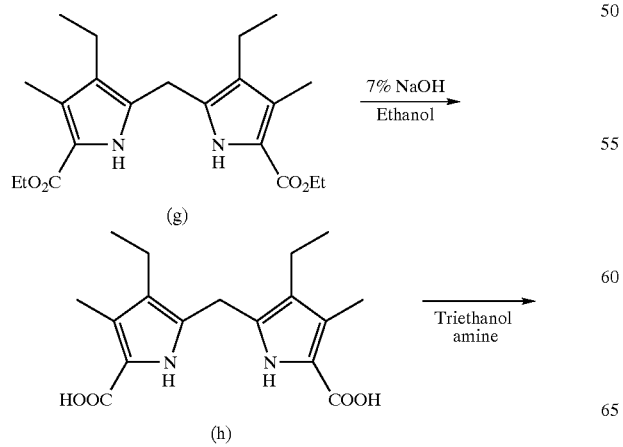

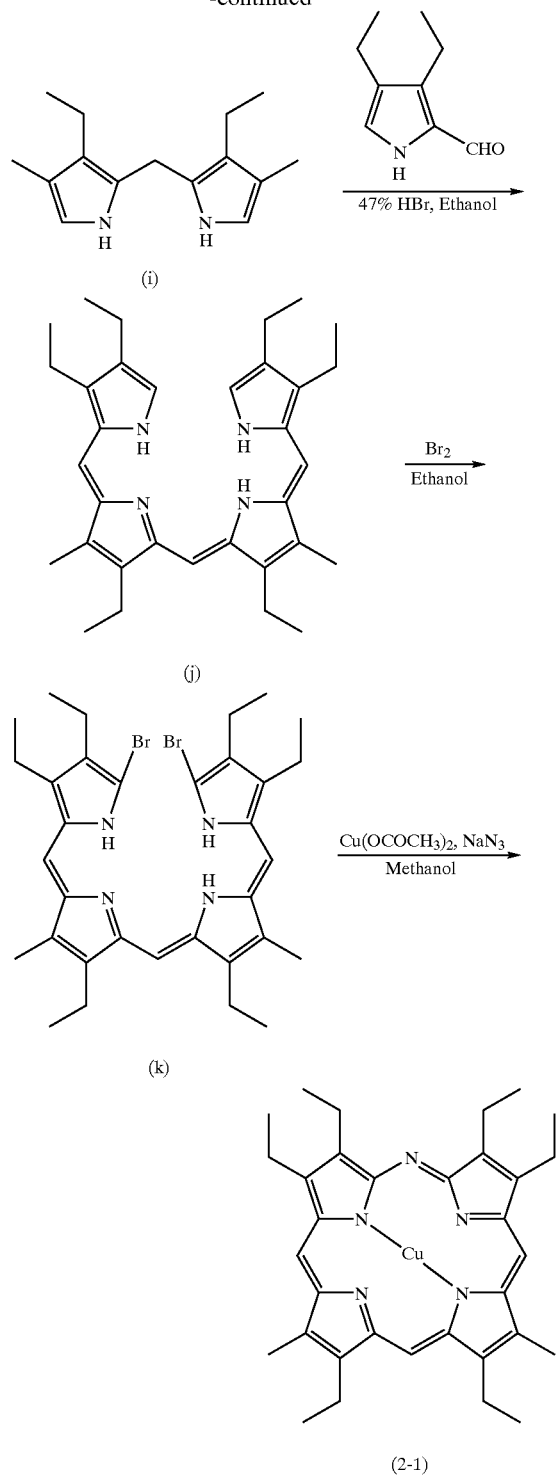

The compound (g) (4.3 g), 55 mL of 7% sodium hydroxide aqueous solution, and 45 mL of ethanol were charged, followed by 4 hours of refluxing. After the reaction mass was cooled to room temperature, it was acidified with 2N sulfuric acid to form a precipitate and the precipitate was filtered. After the filtered mass was dried, it was crystallized by n-hexane and dried to obtain 2.4 g of the compound (h).

Next, 0.67 g of the compound (8) was charged into triethanol amine kept at 170° C. and the whole was kept at the temperature for 3 hours. The reaction mass was cooled to room temperature and then discharged into 200 mL of water. The mixture was subjected to extraction and liquid-separation, and the oily layer was dried over sodium sulfate. After filtration, it was concentrated to obtain the compound (i) (crude, 0.46 g).

Subsequently, the compound (i) (crude, 0.46 g), 0.60 g of 3,4-diethylpyrrole-2-carboxaldehyde, and 20 mL of ethanol were mixed together, and 0.75 g of 47% HBr was further added thereto, followed by 3 hours of stirring at room temperature. After the reaction, the mixture was discharged into 200 mL of water and the discharged mass was filtered. After washing with water and drying, 0.65 g of 2HBr salt of the compound (j) was obtained.

Then, 0.64 g of 2HBr salt of the compound (j) and 20 mL of acetic acid were mixed together, and 0.32 g of bromine was added thereto, followed by 1 hour of stirring at room temperature. The reaction mass was discharged into 100 mL of saturated saline and the discharged mass was filtered. The filtered mass was washed with water and dried to obtain 0.55 g of the compound (k).

After 0.15 g of the compound (k), 0.1 g of N-ethyldiisopropylamine, and 20 mL of methanol were mixed together, 0.033 g of copper acetate was charged at room temperature, followed by stirring. Then, 420 mg of sodium azide was charged, followed by 6 hours of refluxing. The reaction mass was cooled to room temperature and then filtered to obtain crude crystals. The crude crystals were purified by silica gel chromatography (developing solvent: mixed solvent of n-hexane/methylene chloride 8/2->65/35) to obtain 36 mg of the compound (2-1).

The following describes the analytical results of the compound (2-1).

Elemental Analysis: $C_{33}H_{39}CuN_5$

|  | C | H | N |
|---|---|---|---|
| Calcd. (%) | 69.63 | 6.91 | 12.30 |
| Found (%) | 70.13 | 6.84 | 12.43 |

FD-MS m/z: 568

Absorption spectrum (in chloroform)

387 nm ($\epsilon g$ 2.97×10$^5$ ml g$^{-1}$ cm$^{-1}$)

569 nm ($\epsilon g$ 0.95×10$^5$ ml g$^{-1}$ cm$^{-1}$)

Synthetic Example 4

Synthesis of the Compound (2-13) in Table-2

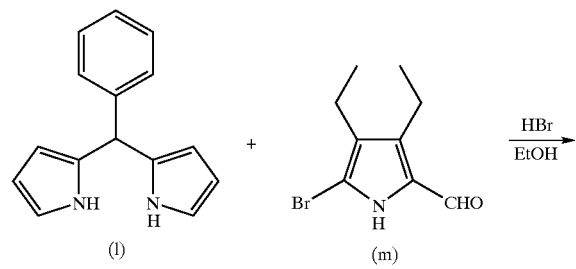

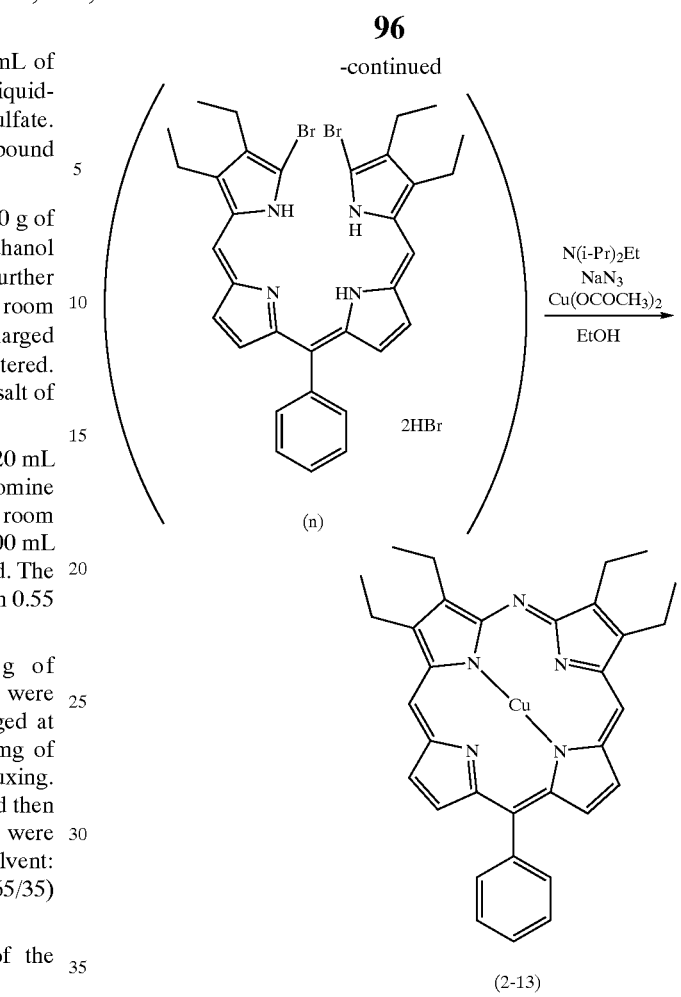

In 30 mL of ethanol were dissolved 0.1 g of the compound (l) and 0.205 g of the compound (m), and then 0.22 g of an acetic acid solution of 33% hydrobromic acid was added dropwise thereto. The whole was reacted at room temperature for 10 minutes to obtain a solution of the compound (n), and then 0.58 g of N,N-diisopropylethylamine was charged thereto, followed by 10 minutes of stirring. Subsequently, 1.46 g of sodium azide and 81 mg of copper acetate were charged, followed by 1 hour of stirring at 75° C. After cooling to room temperature, the reaction mass was discharged into 200 mL of water and the discharged mass was extracted with chloroform. The organic layer was washed with water and saturated saline and dried over sodium sulfate, and then the solvent was removed by evaporation. The residue was subjected to silica gel column chromatography (solvent: chloroform) to remove highly polar components, whereby a crude solid of a dye component was separated. The separated solid was mixed with 150 mL of methanol and the whole was stirred at room temperature and filtered. After the operation was repeated ten times, the solid was again subjected to silica gel column chromatography (solvent: toluene:hexane=1:5) to isolate a red dye component, whereby 1 mg of the compound (2-13) was obtained.

The following describes the analytical results of the compound.

FD-MS m/z: 560

Absorption spectrum

λmax (in chloroform) 392.0 nm

EXAMPLE A-1

Of the compounds represented by the general formula (1), a film of the compound (1-1) described in Table-1 was formed so as to have a thickness of 70 nm on a disc-shape substrate made of polycarbonate resin, having a continuous guide groove (track pitch: 0.74 µm), and having an outer diameter of 120 mmφ and a thickness of 0.6 mm, by vacuum deposition method.

On the recording layer, silver was sputtered using a sputtering apparatus (CDI-900) manufactured by Balzas to form a reflective layer having a thickness of 100 nm. Argon gas was used as the sputtering gas. The sputtering was conducted under conditions of a sputtering power of 2.5 kW and a sputtering gas pressure of 1.33 Pa ($1.0 \times 10^{-2}$ Torr).

Furthermore, after an ultraviolet-setting resin SD-17 (manufactured by Dainippon Ink & Chemicals, Incorporated) was applied by spin-coating onto the reflective layer, a protective layer having a thickness of 5 µm was formed by the irradiation with an ultraviolet light. Moreover, after an ultraviolet-setting resin SD-301 (manufactured by Dainippon Ink & Chemicals, Incorporated) was applied by spin-coating onto the protective layer, the whole was placed on a polycarbonate resin substrate similar to the above substrate but having no guide groove and adhered to the substrate by the irradiation with an ultraviolet light to manufacture an optical recording medium.

The optical recording medium wherein the recording layer was formed as above was subjected to the following evaluation tests:

By an evaluating machine equipped with a blue laser head having a wavelength of 403 nm and a numerical aperture of 0.65, recording was conducted at a recording frequency of 9.7 MHz, a laser power of 8.5 mW, a line velocity of 9.0 m/s, and a shortest pit length of 0.46 µm. As a result, pits were excellently formed and thus recording could be conducted. After recording, when replay was conducted at a line velocity of 9.0 m/s by the same evaluating machine, the pits could be read out.

Moreover, a light resistance test of irradiating with Xe light of 40000 lux for 100 hours was conducted. After the test, the pits could be read out.

Furthermore, a moisture resistance test of leaving to stand under an atmosphere of a humidity of 85% RH and 80° C. was conducted for 200 hours. Even after the test, the pits could be read out.

EXAMPLE A-2

Recording and replay on the optical recording medium manufactured according to Example A-1 were conducted in a similar manner to Example A-1 with the exception that the laser power was 6.5 mW. As a result, pits were excellently formed and the pits could be read out.

Moreover, as a result of the light resistance test and moisture resistance test, pits could be read out even after the tests.

EXAMPLE A-3

Recording and replay on the optical recording medium manufactured according to Example A-1 were conducted in a similar manner to Example A-1 with the exception that the laser power was 7.5 mW. As a result, pits were excellently formed and the pits could be read out.

Moreover, as a result of the light resistance test and moisture resistance test, pits could be read out even after the tests.

EXAMPLE A-4

At the evaluation of the optical recording medium manufactured according to Example A-1, using an evaluating machine equipped with a semiconductor laser head having a wavelength of 635 nm which is applicable to a thickness of 0.6 mm, recording was conducted at a line velocity of 3.5 m/s and a laser power of 8 mW so as to be a shortest pit length of 0.40 µm. As a result, pits were excellently formed. After recording, when replay was conducted using the same evaluating machine, the pits could be read out.

Moreover, as a result of the light resistance test and moisture resistance test, pits could be read out even after the tests.

EXAMPLES A-5 TO A-52

The optical recording media were manufactured in a similar manner to Example 1 with the exception that the compounds (1-2) to (1-49) were used as the recording layers and recording and replay were conducted in a similar manner to Example A-1. As a result, pits were excellently formed and the pits could be read out.

Moreover, as a result of the light resistance test and moisture resistance test, pits could be read out even after the tests.

EXAMPLE A-53

For a recording layer, a dye solution was prepared by dissolving 0.2 g of the compound in the compound (1-50) in 10 ml of dimethylcyclohexane. As a substrate, a disc-shape substrate made of polycarbonate resin, having a continuous guide groove (track pitch: 0.74 µm), and having an outer diameter of 120 mmφ and a thickness of 0.6 mm was used. The dye solution was applied by spin coating onto the substrate at a rotation speed of 1500 $min^{-1}$ and the whole was dried at 70° C. for 3 hours to form a recording layer. On the recording layer, Ag was sputtered using a sputtering apparatus (CDI-900) manufactured by Balzas to form a reflective layer having a thickness of 100 nm. Argon gas was used as the sputtering gas. The sputtering was conducted under conditions of a sputtering power of 2.5 kW and a sputtering gas pressure of 1.33 Pa ($1.0 \times 10^{-2}$ Torr).

Furthermore, after an ultraviolet-setting resin SD-17 (manufactured by Dainippon Ink & Chemicals, Incorporated) was applied by spin coating onto the reflective layer, a protective layer having a thickness of 5 µm was formed by the irradiation with an ultraviolet light. Moreover, after an ultraviolet-setting resin SD-301 (manufactured by Dainippon Ink & Chemicals, Incorporated) was applied by spin-coating onto the protective layer, the whole was placed on a polycarbonate resin substrate similar to the above substrate, and adhered to the substrate by the irradiation with an ultraviolet light to manufacture an optical recording medium. Then, recording and replay were conducted in a similar manner to Example 1. As a result, pits were excellently formed and the pits could be read out.

Moreover, as a result of the light resistance test and moisture resistance test, pits could be read out even after the tests.

EXAMPLES A-54 TO A-68

The optical recording media were manufactured in a similar manner to Example 53 with the exception that the compounds (1-51) to (1-65) were used for the recording layers, and recording and replay were conducted in a similar manner to Example A-1. As a result, pits were excellently formed and the pits could be read out.

Moreover, as a result of the light resistance test and moisture resistance test, pits could be read out even after the tests.

EXAMPLE A-69

Of the compounds represented by the general formula (4), a film of the compound (2-1) was formed so as to have a thickness of 70 nm, on a disc-shape substrate made of polycarbonate resin, having a continuous guide groove (track pitch: 0.74 μm), and having an outer diameter of 120 mmφ and a thickness of 0.6 mm, by vacuum deposition method.

On the recording layer, silver was sputtered using a sputtering apparatus (CDI-900) manufactured by Balzas to form a reflective layer having a thickness of 100 nm. Argon gas was used as the sputtering gas. The sputtering was conducted under conditions of a sputtering power of 2.5 kW and a sputtering gas pressure of 1.33 Pa ($1.0 \times 10^{-2}$ Torr).

Furthermore, after an ultraviolet-setting resin SD-17 (manufactured by Dainippon Ink & Chemicals, Incorporated) was applied by spin-coating onto the reflective layer, a protective layer having a thickness of 5 μm was formed by the irradiation with an ultraviolet light. Moreover, after an ultraviolet-setting resin SD-301 (manufactured by Dainippon Ink & Chemicals, Incorporated) was applied by spin-coating onto the protective layer, the whole was placed on a polycarbonate resin substrate similar to the above substrate but having no guide groove, and adhered to the substrate by the irradiation with an ultraviolet light to manufacture an optical recording medium.

The optical recording medium wherein the recording layer was formed as above was subjected to the following evaluation tests.

By an evaluating machine equipped with a blue laser head having a wavelength of 403 nm and a numerical aperture of 0.65, recording could be conducted at a recording frequency of 9.7 MHz, a laser power of 8.5 mW, a line velocity of 9.0 m/s, and a shortest pit length of 0.46 μm. Pits could excellently be formed and thus recording could be conducted. After recording, when replay was conducted at a line velocity of 9.0 m/s by the same evaluating machine, the pits could be read out.

EXAMPLE A-70

At the evaluation of the optical recording medium manufactured according to Example A-69, using an evaluating machine equipped with a semiconductor laser head having a wavelength of 635 nm which is applicable to a thickness of 0.6 mm, recording was conducted at a line velocity of 3.5 m/s and a laser power of 8 mW so as to be a shortest pit length of 0.40 μm. As a result, pits were excellently formed. After recording, when replay was conducted using the same evaluating machine, the pits could be read out.

EXAMPLES A-71 TO A-76

The optical recording media were manufactured in a similar manner to Example A-69 with the exception that the compounds (2-2) to (2-7) were used for the recording layers, and recording and replay were conducted in a similar manner to Example 1. Pits were excellently formed and the pits could be read out.

EXAMPLE A-77

The optical recording medium was manufactured in a similar manner to Example A-69 with the exception that the compound (2-8) was used for the recording layer and an evaluating machine equipped with a blue laser head having a wavelength of 407 nm and a numerical aperture of 0.60 was used, and recording and replay were conducted in a similar manner to Example 1. Pits were excellently formed and the pits could be read out.

EXAMPLE A-78

The optical recording medium was manufactured in a similar manner to Example A-77 with the exception that the compound (2-9) was used for the recording layer, and recording and replay were conducted in a similar manner to Example 1. Pits were excellently formed and the pits could be read out.

EXAMPLE A-79

For a recording layer, a dye solution was prepared by dissolving 0.2 g of the compound (2-10) in 10 ml of dimethylcyclohexane. As a substrate, a disc-shape substrate made of polycarbonate resin, having a continuous guide groove (track pitch: 0.74 μm), and having an outer diameter of 120 mmφ and a thickness of 0.6 mm was used. The dye solution was applied by spin coating onto the substrate at a rotation speed of 1500 $min^{-1}$ and was dried at 70° C. for 3 hours to form a recording layer. On the recording layer, Ag was sputtered using a sputtering apparatus (CDI-900) manufactured by Balzas to form a reflective layer having a thickness of 100 nm. Argon gas was used as the sputtering gas. The sputtering was conducted under conditions of a sputtering power of 2.5 kW and a sputtering gas pressure of 1.33 Pa ($1.0 \times 10^{-2}$ Torr).

Furthermore, after an ultraviolet-setting resin SD-17 (manufactured by Dainippon Ink & Chemicals, Incorporated) was applied by spin coating onto the reflective layer, a protective layer having a thickness of 5 μm was formed by the irradiation with an ultraviolet light. Moreover, after an ultraviolet-setting resin SD-301 (manufactured by Dainippon Ink & Chemicals, Incorporated) was applied by spin-coating onto the protective layer, the whole was placed on a polycarbonate resin substrate similar to the above substrate, and adhered to the substrate by the irradiation with an ultraviolet light to manufacture an optical recording medium.

Then, recording and replay were conducted in a similar manner to Example A-76. Pits were excellently formed and the pits could be read out.

EXAMPLES A-80 TO A-84

The optical recording media were manufactured in a similar manner to Example A-1 with the exception that the compounds (2-11) to (2-15) were used as the recording layers, and recording and replay were conducted in a similar manner to Example A-70. Pits were excellently formed and the pits could be read out.

EXAMPLE A-85

Under nitrogen, 15.5 g of o-bromoacetophenone, 7.75 g of copper cyanide, and 2.1 g of 1,2-dicyano-3,3-dimethyl-1-butene were added to 40 mL of quinoline, and the whole was heated and stirred at 200–210° C. for 2 hours. After the dark green reaction solution was cooled to 80° C., methanol was added under stirring and cooled to room temperature. The brown suspended solution was filtered and the resulting black solid was washed with methanol to obtain 16.5 g of a black powder. The black solid was dissolved in toluene and extracted, followed by filtration. After the extraction operation was repeated twice, the dark blue-green toluene solution was subjected to separattion and purification by column chromatography (developing solvent: toluene). Thereafter, the resultant was recrystallized form chloroform-hexane (8:2) to obtain 0.2 g of diazaporphyrin (3-1), 0.23 g of diazaporphyrin (4-1), and 0.1 g of triazaporphyrin (5-1) each as a blue-green solid.

The results of elemental analysis of diazaporphyrin (3-1) of the above compounds were as follows:

Elemental Analysis ($C_{34}H_{30}N_6Cu$)

|  | C | H | N |
|---|---|---|---|
| Calcd. (%) | 69.66 | 5.16 | 14.34 |
| Found (%) | 69.34 | 5.40 | 14.20 |

FD-MS m/z: 585

$\lambda max$ (toluene) = 626 nm ($\varepsilon g\ 1.4 \times 10^5$ ml g$^{-1}$ cm$^{-1}$)

= 609 nm ($\varepsilon g\ 1.0 \times 10^5$ ml g$^{-1}$ cm$^{-1}$)

= 403 nm ($\varepsilon g\ 0.97 \times 10^5$ ml g$^{-1}$ cm$^{-1}$)

= 380 nm ($\varepsilon g\ 0.95 \times 10^5$ ml g$^{-1}$ cm$^{-1}$)

Moreover, the results of elemental analysis of diazaporphyrin (4-1) of the above compounds were as follows:

Elemental Analysis ($C_{34}H_{30}N_6Cu$)

|  | C | H | N |
|---|---|---|---|
| Calcd. (%) | 69.66 | 5.16 | 14.34 |
| Found (%) | 69.40 | 5.50 | 14.30 |

FD-MS m/z: 585

$\lambda max$ (toluene) = 628 nm ($\varepsilon g\ 0.95 \times 10^5$ ml g$^{-1}$ cm$^{-1}$)

= 618 nm ($\varepsilon g\ 1.0 \times 10^5$ ml g$^{-1}$ cm$^{-1}$)

= 406 nm ($\varepsilon g\ 0.97 \times 10^5$ ml g$^{-1}$ cm$^{-1}$)

= 379 nm ($\varepsilon g\ 0.95 \times 10^5$ ml g$^{-1}$ cm$^{-1}$)

Furthermore, the results of elemental analysis of triazaporphyrin (5-1) were as follows:

Elemental Analysis ($C_{33}H_{29}N_7Cu$)

|  | C | H | N |
|---|---|---|---|
| Calcd. (%) | 67.50 | 4.98 | 16.70 |
| Found (%) | 67.30 | 5.32 | 16.50 |

FD-MS m/z: 586

EXAMPLE A-86

The compounds represented by (3-2), (4-2), and (5-2) in Table-3 to Table-5 were obtained in amounts of 0.1 g, 0.05 g, and 0.01 g, respectively, in a similar manner to Example A-85 with the exception that 2.1 g of 1,2-dicyanocyclohexene was used instead of 1,2-dicyano-3,3-dimethyl-1-butene.

For Compound (3-2):

Elemental Analysis ($C_{34}H_{26}N_6Cu$)

|  | C | H | N |
|---|---|---|---|
| Calcd. (%) | 70.15 | 4.50 | 14.44 |
| Found (%) | 69.99 | 4.48 | 14.55 |

FD-MS m/z: 581

For Compound (4-2):

Elemental Analysis ($C_{34}H_{26}N_6Cu$)

|  | C | H | N |
|---|---|---|---|
| Calcd. (%) | 70.15 | 4.50 | 14.44 |
| Found (%) | 69.92 | 4.54 | 14.51 |

FD-MS m/z: 581

For Compound (5-2):

Elemental Analysis ($C_{33}H_{25}N_7Cu$)

|  | C | H | N |
|---|---|---|---|
| Calcd. (%) | 67.97 | 4.32 | 16.81 |
| Found (%) | 68.03 | 4.43 | 16.76 |

FD-MS m/z: 582

EXAMPLE A-87

The compounds represented by the formulae (3-3), (4-3), and (5-3) were obtained in amounts of 0.05 g, 0.05 g, and 0.03 g, respectively, in a similar manner to Example A-85 with the exception that 11.2 g of o-cyanoacetophenone and 3.0 g of vanadium chloride were used instead of 15.5 g of o-bromoacetophenone and 7.75 g of copper cyanide.

For Compound (3-3):

Elemental Analysis ($C_{34}H_{30}N_6OV$)

|  | C | H | N |
|---|---|---|---|
| Calcd. (%) | 69.25 | 5.13 | 14.25 |
| Found (%) | 69.30 | 5.20 | 14.21 |

FD-MS m/z: 589

For Compound (4-3):

Elemental Analysis ($C_{34}H_{30}N_6OV$)

|  | C | H | N |
|---|---|---|---|
| Calcd. (%) | 69.25 | 5.13 | 14.25 |
| Found (%) | 69.21 | 5.20 | 14.31 |

FD-MS m/z: 589
For Compound (5-3):
  Elemental Analysis ($C_{33}H_{29}N_7OV$)

|  | C | H | N |
|---|---|---|---|
| Calcd. (%) | 67.11 | 4.95 | 16.60 |
| Found (%) | 67.00 | 4.99 | 16.50 |

FD-MS m/z: 590

EXAMPLE A-88

The compounds represented by (3-4), (4-4), and (5-4) in Table-3 to Table-5 were obtained in amounts of 0.1 g, 0.05 g, and 0.01 g, respectively, in a similar manner to Example A-85 with the exception that 11.2 g of o-cyanoacetophenone and 2.8 g of cobalt chloride were used instead of 15.5 g of o-bromoacetophenone and 7.75 g of copper cyanide.

For Compound (3-4):
  Elemental Analysis ($C_{34}H_{30}N_6Co$)

|  | C | H | N |
|---|---|---|---|
| Calcd. (%) | 70.22 | 5.20 | 15.45 |
| Found (%) | 70.01 | 5.11 | 14.50 |

FD-MS m/z: 581
For Compound (4-4):
  Elemental Analysis ($C_{34}H_{30}N_6Co$)

|  | C | H | N |
|---|---|---|---|
| Calcd. (%) | 70.22 | 5.20 | 15.45 |
| Found (%) | 70.30 | 5.10 | 14.55 |

FD-MS m/z: 581
For Compound (5-4):
  Elemental Analysis ($C_{33}H_{29}N_7Co$)

|  | C | H | N |
|---|---|---|---|
| Calcd. (%) | 68.04 | 5.02 | 16.83 |
| Found (%) | 67.99 | 4.99 | 16.90 |

FD-MS m/z: 582

EXAMPLE A-89

Of the compounds represented by the general formula (6), a film of the compound (3-1) described in Table-3 was formed so as to have a thickness of 70 nm on a disc-shape substrate made of polycarbonate resin, having a continuous guide groove (track pitch: 0.74 µm) and having an outer diameter of 120 mmφ and a thickness of 0.6 mm, by vacuum deposition method.

On the recording layer, silver was sputtered using a sputtering apparatus (CDI-900) manufactured by Balzas to form a reflective layer having a thickness of 100 nm. Argon gas was used as the sputtering gas. The sputtering was conducted under conditions of a sputtering power of 2.5 kW and a sputtering gas pressure of 1.33 Pa ($1.0 \times 10^{-2}$ Torr).

Furthermore, after an ultraviolet-setting resin SD-17 (manufactured by Dainippon Ink & Chemicals, Incorporated) was applied by spin-coating onto the reflective layer, a protective layer having a thickness of 5 µm was formed by the irradiation with an ultraviolet light. Moreover, after an ultraviolet-setting resin SD-301 (manufactured by Dainippon Ink & Chemicals, Incorporated) was applied by spin-coating onto the protective layer, the whole was placed on a polycarbonate resin substrate similar to the above substrate but having no guide groove, and adhered to the substrate by the irradiation with an ultraviolet light to manufacture an optical recording medium.

The optical recording medium wherein the recording layer was formed as above was subjected to the following evaluation tests:

By an evaluating machine equipped with a blue laser head having a wavelength of 403 nm and a numerical aperture of 0.65, recording could be conducted at a recording frequency of 9.7 MHz, a laser power of 8.5 mW, a line velocity of 9.0 m/s, and a shortest pit length of 0.46 µm. Pits were excellently formed and thus recording could be conducted. After recording, when replay was conducted at a line velocity of 9.0 m/s by the same evaluating machine, the pits could be read out.

Moreover, a light resistance test of irradiating with Xe light of 40000 lux for 100 hours was conducted. Even after the test, the pits could be read out.

Furthermore, a moisture resistance test of leaving to stand under an atmosphere of a humidity of 85% RH and 80° C. was conducted for 200 hours. Even after the test, the pits could be read out.

EXAMPLE A-90

Recording and replay on the optical recording medium manufactured according to Example A-89 were conducted in a similar manner to Example A-89 with the exception that the laser power was 6.5 mW. As a result, pits were excellently formed and the pits could be read out.

Moreover, as a result of the light resistance test and moisture resistance test, pits could be read out even after the tests.

EXAMPLE A-91

Recording and replay on the optical recording medium manufactured according to Example A-89 were conducted in a similar manner to Example A-89 with the exception that the laser power was 7.5 mW. As a result, pits were excellently formed and the pits could be read out.

Moreover, as a result of the light resistance test and moisture resistance test, pits could be read out even after the tests.

EXAMPLE A-92

At the evaluation of the optical recording medium manufactured according to Example A-89, using an evaluating machine equipped with a semiconductor laser head having a wavelength of 660 nm which is applicable to a thickness of 0.6 mm, recording was conducted at a line velocity of 3.5 m/s and a laser power of 8 mW so as to be a shortest pit length of 0.40 µm. Pits were excellently formed. After recording, when replay was conducted using the same evaluating machine, the pits could be read out.

Moreover, as a result of the light resistance test and moisture resistance test, pits could be read out even after the tests.

EXAMPLES A-93 TO A-121

Optical recording media were manufactured in a similar manner to Example A-5 with the exception that the compounds (3-2) to (3-10), (4-1) to (4-10), and (5-1) to (5-10) were used as the recording layers, and recording and replay were conducted in a similar manner to Example A-89. Pits were excellently formed and the pits could be read out.

Moreover, as a result of the light resistance test and moisture resistance test, pits could be read out even after the tests.

EXAMPLES A-122 TO A-150

Optical recording media were manufactured in a similar manner to Example A-89 with the exception that the compounds (3-2) to (3-10), (4-1) to (4-10), and (5-1) to (5-10) were used as the recording layers, and recording and replay were conducted in a similar manner to Example A-92. Pits were excellently formed and the pits could be read out.

Moreover, as a result of the light resistance test and moisture resistance test, pits could be read out even after the tests.

EXAMPLE A-151

For a recording layer, a dye solution was prepared by dissolving 0.2 g of the compound (3-11) in the Table-3 in 10 ml of dimethylcyclohexane. As a substrate, a disc-shape substrate made of polycarbonate resin, having a continuous guide groove (track pitch: 0.74 $\mu$m), and having an outer diameter of 120 mm$\phi$ and a thickness of 0.6 mm was used. The dye solution was applied by spin coating onto the substrate at a rotation speed of 1500 min$^{-1}$ and was dried at 70° C. for 3 hours to form a recording layer. On the recording layer, Ag was sputtered using a sputtering apparatus (CDI-900) manufactured by Balzas to form a reflective layer having a thickness of 100 nm. Argon gas was used as the sputtering gas. The sputtering was conducted under conditions of a sputtering power of 2.5 kW and a sputtering gas pressure of 1.33 Pa (1.0×10$^{-2}$ Torr).

Furthermore, after an ultraviolet-setting resin SD-17 (manufactured by Dainippon Ink & Chemicals, Incorporated) was applied by spin coating onto the reflective layer, a protective layer having a thickness of 5 $\mu$m was formed by the irradiation with an ultraviolet light. Moreover, after an ultraviolet-setting resin SD-301 (manufactured by Dainippon Ink & Chemicals, Incorporated) was applied by spin-coating onto the protective layer, the whole was placed on a polycarbonate resin substrate similar to the above substrate, and adhered to the substrate by the irradiation with an ultraviolet light to manufacture an optical recording medium.

Then, recording and replay were conducted in a similar manner to Example A-89. Pits were excellently formed and the pits could be read out.

Next, recording and replay were conducted in a similar manner to Example A-92. Pits were excellently formed and the pits could be read out.

Moreover, as a result of the light resistance test and moisture resistance test, pits could be read out even after the tests.

EXAMPLE A-152

An optical recording medium was manufactured in a similar manner to Example A-151 with the exception that the compound (3-11) was used as the recording layer, and recording and replay were conducted in a similar manner to Example A-92. Pits were excellently formed and the pits could be read out.

Moreover, as a result of the light resistance test and moisture resistance test, pits could be read out even after the tests.

EXAMPLES A-153 AND A-154

Optical recording media were manufactured and recording and replay were conducted in a similar manner to Example A-151 with the exception that the compounds (4-11) and (5-11) were used as the recording layers. As a result, pits were excellently formed and the pits could be read out.

Moreover, as a result of the light resistance test and moisture resistance test, pits could be read out even after the tests.

EXAMPLES A-155 AND A-156

Optical recording media were manufactured and recording and replay were conducted in a similar manner to Example A-151 with the exception that the compounds (4-11) and (5-11) were used as the recording layers, and recording and replay were conducted in a similar manner to Example A-92. Pits were excellently formed and the pits could be read out.

Moreover, as a result of the light resistance test and moisture resistance test, pits could be read out even after the tests.

COMPARATIVE EXAMPLE A-1

An optical recording medium was manufactured in a similar manner to Example A-1 with the exception that the compound represented by the formula (L):

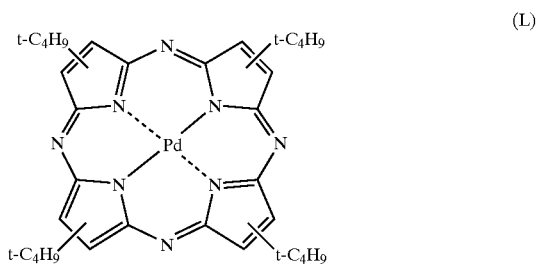

was used instead of the compound (1-1), and recording and replay were conducted in a similar manner to

EXAMPLE A-1

COMPARATIVE EXAMPLE A-2

An optical recording medium was manufactured in a similar manner to Example A-1 with the exception that the compound of the formula (L), and recording and replay were conducted in a similar manner to Example A-2.

COMPARATIVE EXAMPLE A-3

An optical recording medium was manufactured in a similar manner to Example A-1 with the exception that the compound represented by the formula (L), and recording and replay were conducted in a similar manner to Example A-3.

Figure 4:
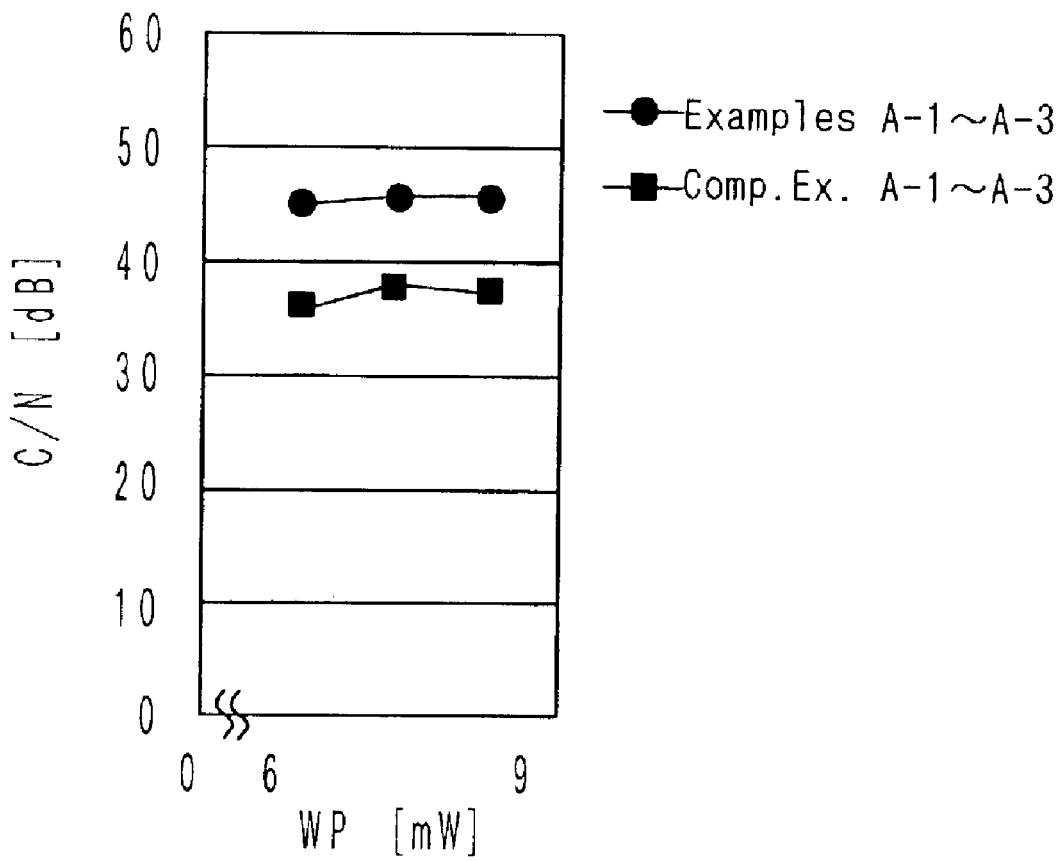
FIG. 4 is a graph showing a comparison of recording property (C/N ratio [dB]) values for each recording laser power (mW) of Examples A-1 to A-3 and Comparative Examples A-1 to A-3.

FIG. 4 shows the results of comparing the recording property (C/N ratio [dB]) values of Comparative Examples A-1 to A-3 at each recording laser power (mW) with those of Examples A-1 to A-3. As is apparent from FIG. 4, there is a difference of 5 dB or more in the C/N ratio of every Comparative Example as compared with the cases of Examples. Thus, the signal property is inferior and the readout was difficult as compared with Examples A-1 to A-3.

COMPARATIVE EXAMPLE A-4

An optical recording medium was manufactured in a similar manner to Example A-1 with the exception that the compound of the formula (M):

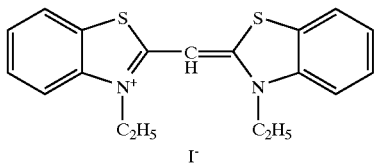

(M)

was used instead of the compound (1-1), and recording and replay were conducted in a similar manner to Example A-1. The C/N ratio was found to be 30 dB or less and thus was very bad.

COMPARATIVE EXAMPLE A-5

An optical recording medium was manufactured in a similar manner to Example A-1 with the exception that the compound of the formula (N):

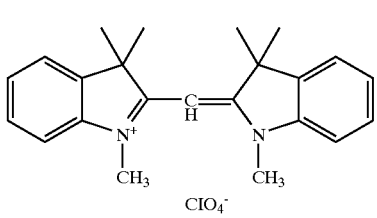

(N)

was used instead of the compound (1-1), and recording and replay were conducted in a similar manner to Example A-1. The C/N ratio was found to be 30 dB or less and thus was very bad.

COMPARATIVE EXAMPLE A-6

An optical recording medium was manufactured in a similar manner to Example A-1 with the exception that the compound of the formula (O):

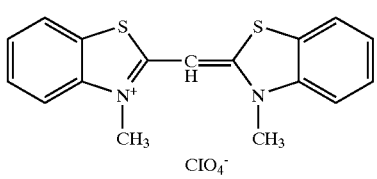

(O)

was used instead of the compound (1-1), and recording and replay were conducted in a similar manner to Example A-1. The C/N ratio was found to be 30 dB or less and thus was very bad.

As described in Examples A-1 to A-84 and A-89 to A-156, the optical recording media of the present invention are capable of recording both in the blue laser wavelength region and in the red laser wavelength region, and are also excellent in both of light resistance and moisture resistance. In particular, good recording and replay can be conducted with a blue-violet laser having a wavelength of 400 to 410 nm.

Accordingly, the recording layers containing the compounds of the present invention are capable of recording signals with a laser light selected from wavelength of 300 to 500 nm and/or 500 to 700 nm, and thus the optical recording media of the present invention can be used as optical recording media using a laser light selected from wavelength of 300 to 500 nm and/or 500 to 700 nm.

The following will explain the second group of the present invention with reference to Examples.

EXAMPLE B-1

Figure 8:
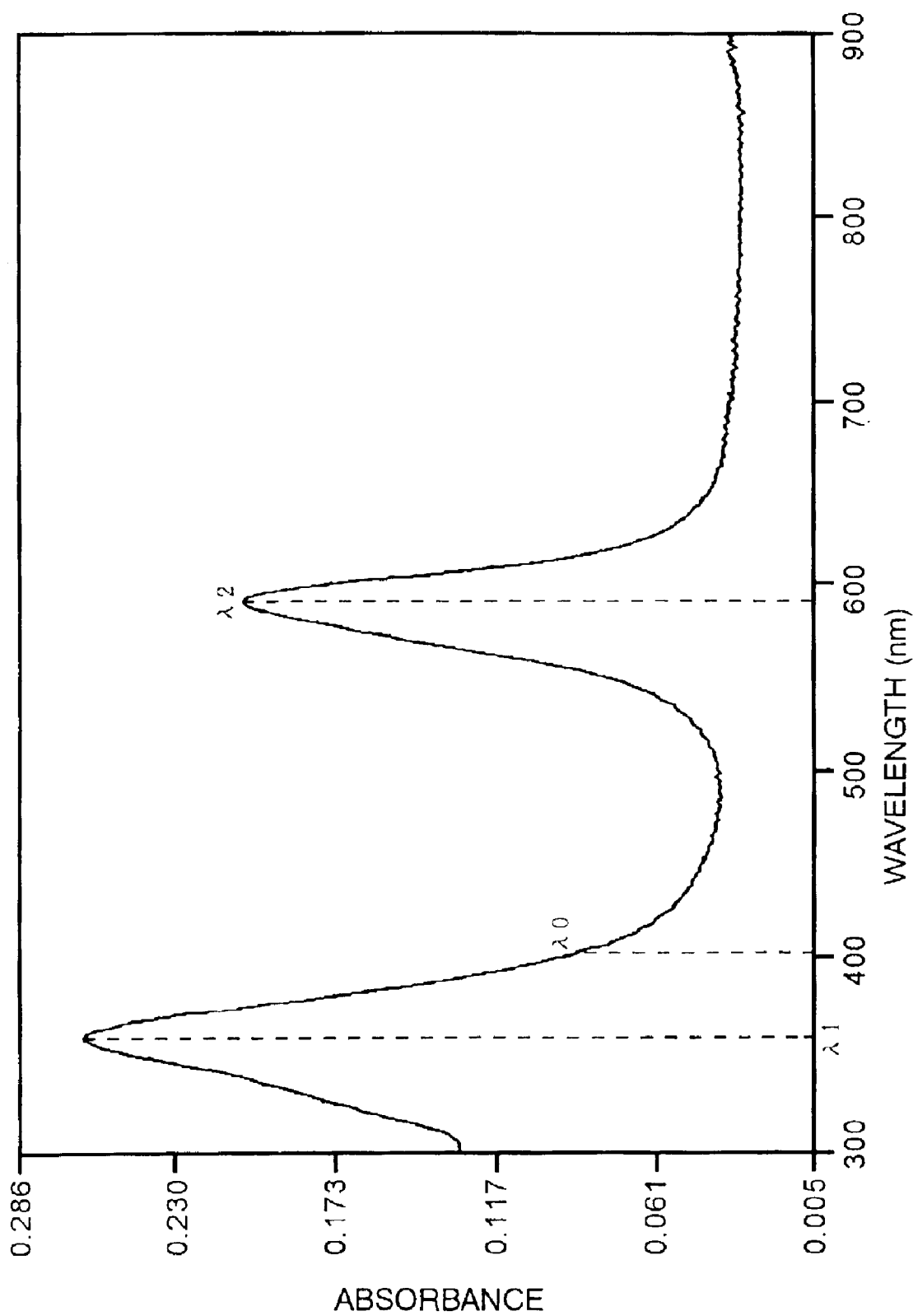
FIG. 8 is an absorption spectrum of the organic dye used in Example B-1 in a film state.

A polycarbonate substrate of a size having a thickness of 0.6 mm and an outer diameter of 120 mm was manufactured from a stamper original disc possessing a groove shape having a pitch of 0.55 μm, a depth of 100 nm, and a width of 0.2 μm by injection molding method. The transcription state was confirmed by an atomic force microscope (AFM). On the substrate was formed a film of the diazaporphyrin dye represented by the following formula (A) as a recording layer from an ethylcyclohexane solution (20 g/l) by spin coating method so as to have a dry thickness of 100 nm. FIG. 8 shows the absorption spectrum of the compound in the film state. The refractive index and absorption coefficient of the recording layer determined by optical analysis were found to be n=2.11 and k=0.07 at 400 nm. Moreover, the dye film had a maximum absorption value of molecular extinction coefficient $\epsilon=1.3E+5$ $cm^{-1}$ $mol^{-1}$ at 590 nm ($\lambda 2$) which was at longer wavelength side than the recording wavelength (403 nm: $\lambda 0$):

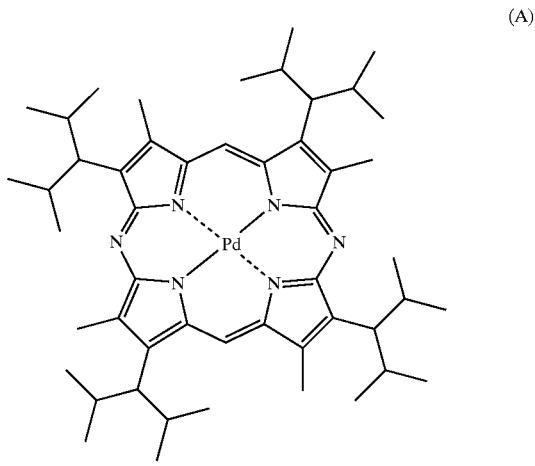

(A)

Subsequently, on the recording layer was formed a film of a silver reflective layer having a thickness of 80 nm by sputtering method. Then, on the reflective layer was formed a film of an ultraviolet-setting resin "SD-17" (manufactured by Dainippon Ink & Chemicals, Incorporated) having a thickness of about 5 μm by spin coating method. Thereon was applied a UV adhesive and was adhered a dummy substrate (made of polycarbonate) having a thickness of 0.6 mm to manufacture an optical recording medium having the same external shape as DVD.

Single repeat signals corresponding to a shortest pit length of 0.25 μm were recorded on the groove of the recording medium through the carbonated substrate by a tester equipped with a blue laser manufactured by Pulsetech Industries under conditions of a wavelength of 403 nm, NA of 0.65, and a line velocity of 7 m/s. At a recording power of 7 mW, 2nd harmonic level became minimum. When the recorded part was replayed by the same pickup (replaying power=0.5 mW), a C/N ratio of 46 dB was confirmed.

Furthermore, the optical disc was irradiated with a Xe arc lamp of 40000 lux at 50° C. for 100 hours and then the signal level was evaluated. As a result, it was confirmed that the recorded pits could be replayed in an excellent C/N ratio even after the test.

EXAMPLE B-2

A polycarbonate substrate of a size of a thickness of 0.6 mm and an outer diameter of 120 mm was manufactured from a stamper original disc possessing a groove shape having a pitch of 0.74 μm, a depth of 100 nm, and a width of 0.35 μm by injection molding method. On the substrate was formed a film of the diazaporphyrin dye of the formula (A) used in Example B-1 by vacuum deposition method so as to have a thickness of 80 nm. Thereafter, a silver reflective layer and a SD-17 layer were formed as in Example B-1, and a dummy substrate having a thickness of 0.6 mm was adhered.

The recording medium was subjected to recording on both of the land and the groove through the polycarbonate substrate by a tester used in Example B-1. Shortest pits having a line density of 0.25 μm at a line velocity of 7 m/s were observed at a recording power of 6 mW with C/N ratios of 47 dB at the land part and of 47 dB at the groove part.

EXAMPLE B-3

On an acrylic 2P substrate having a thickness of 1.2 mm formed from a stamper original disc possessing a groove shape having a pitch of 0.55 μm, a depth of 100 nm, and a width of 0.27 μm by thermal transcription method was formed a reflective layer comprising an AgPdCu alloy by sputtering method so as to have a thickness of 50 nm. Thereon was formed a film of the diazaporphyrin dye of the formula (A) used in Example B-1 by vacuum deposition method so as to have a thickness of 80 nm. Thereon was formed a SiO$_2$ transparent layer having a thickness of 2 nm by sputtering method, and furthermore, a UV adhesive was applied thereon and a thin sheet made of polycarbonate having a thickness of 100 μm was adhered.

The medium was subjected to light condensation caused by two-piece lens having NA=0.80 at a wavelength of 403 nm to form recorded pits on both of the land and groove.

Shortest pits having a line density of 0.25 μm at a line velocity of 7 m/s were observed at a recording power of 6 mW with C/N ratios of 46 dB at the land part and of 48 dB at the groove part.

When the accelerated test on light resistance as in Example B-1 was conducted, an excellent recording quality was achieved on both of the land part and the groove part.

EXAMPLE B-4

An optical disc was manufactured in a similar manner to Example B-1 with the exception that the organic dye for the recording layer was changed to the subphthlocyanine dye of the following formula (B). FIG. 8 shows the absorption spectrum of the organic dye in a film state. It has an absorption maximum: λ1 at a wavelength of 304 nm and an absorption having a maximum value of molar extinction coefficient ε=1.7E+5 cm$^{-1}$ mol$^{-1}$ at 561 nm: λ2 which is at longer wavelength side than the above. When the optical constants of the dye film was determined, the refractive index (n) and damping coefficient (k) were n=1.95 and k=0.17, respectively at 340 nm. When the recording film was subjected to recording using a HeCd laser through an optical system of a laser microscope, the formation of excellent pits was confirmed and thus the film was promising as a recording film at the time when an ultraviolet laser was used.

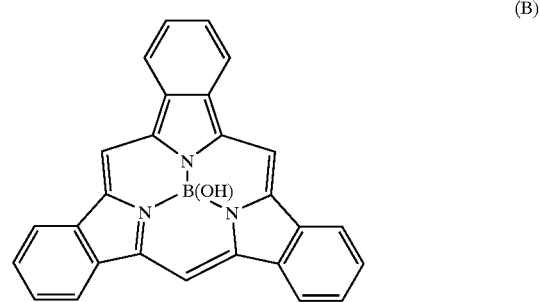

(B)

EXAMPLE B-5

An optical disc was manufactured in a similar manner to Example B-2 with the exception that the organic dye for the recording layer was changed to the tri-tert-butoxybenzoporphyrazine dye of the following formula (C). The dye film had an absorption maximum: λ1 at a wavelength of 355 nm and a strong absorption peak having a maximum value of ε>10E+4 cm$^{-1}$ mol$^{-1}$ at 675 nm which is at longer wavelength side than the above. The recording medium was subjected to recording on both of the land part and the groove part using a similar test used in Example 1. On both of the land part and the groove part, an excellent recording of 40 dB or more was confirmed.

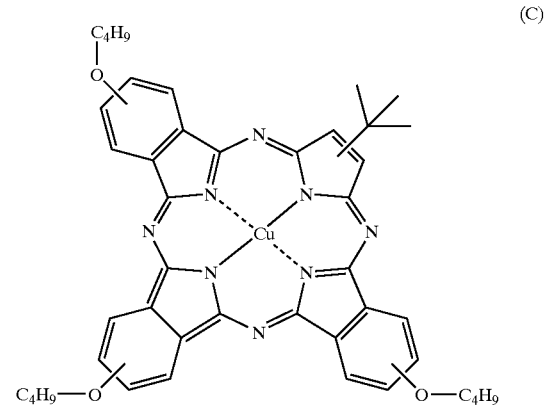

(C)

EXAMPLE B-6

An optical disc was manufactured in a similar manner to Example B-2 with the exception that the organic dye for the recording layer was changed to the tri-tert-butoxybenzo-mononaphthaloporphyrazine dye of the following formula (D). The dye film had an absorption maximum: λ1 at a wavelength of 340 nm and a strong absorption peak having a maximum value of ε>10E+4 cm$^{-1}$ mol$^{-1}$ at 690 nm which is at longer wavelength side than the above. The recording medium was subjected to recording on both of the land part and the groove part using a similar test used in Example 1. On both of the land part and the groove part, an excellent recording of 40 dB or more was confirmed.

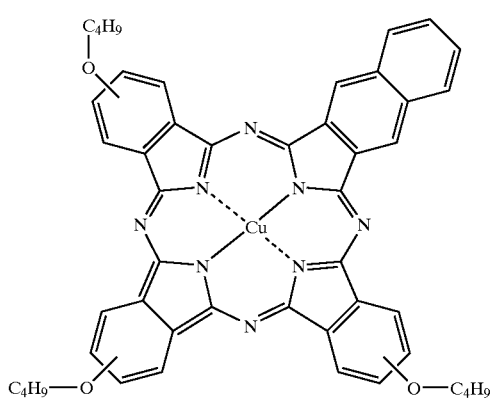

EXAMPLE B-7

An optical disc was manufactured in a similar manner to Example B-2 with the exception that the organic dye for the recording layer was changed to the tri-tert-butoxybenzomonoanthracoporphyrazine dye of the following formula (E). The dye film has an absorption maximum: λ1 at a wavelength of 350 nm and a strong absorption peak having a maximum value of ε>10E+4 cm$^{-1}$ mol$^{-1}$ at 700 nm which is at longer wavelength side than the above. The recording medium was subjected to recording on both of the land part and the groove part using a similar test used in Example 1. On both of the land part and the groove part, an excellent recording of 40 dB or more was confirmed.

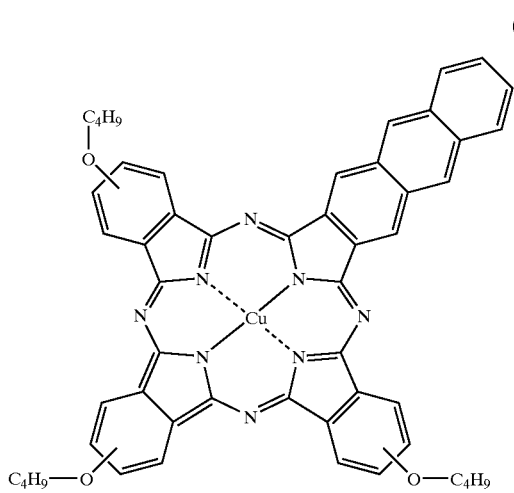

COMPARATIVE EXAMPLE B-1

Figure 9:
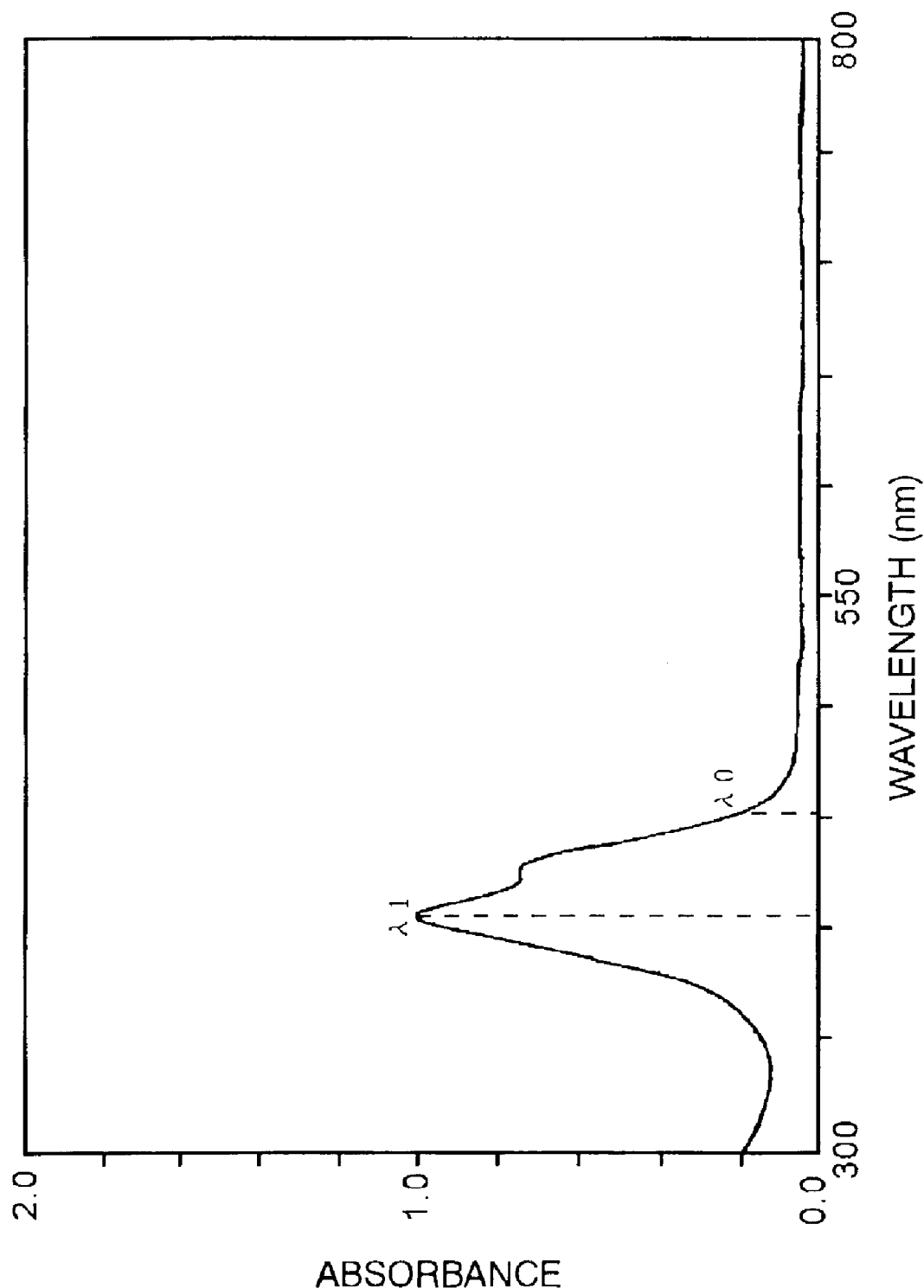
FIG. 9 is an absorption spectrum of the organic dye used in Comparative Example B-1 in a film state.

An optical disc was manufactured in a similar manner to Example B-1 with the exception that the organic dye for the recording layer was changed to the cyanine dye of the following formula (F) ("39041-0" manufactured by Aldrich Chemicals). FIG. 9 shows the absorption spectrum of the organic dye in a film state.

The optical disc was subjected to signal recording in a similar manner to Example B-1. Thereafter, replay was tried using a similar apparatus, but the pits were broken by the replay light and thus the reliability of the recorded part was insufficient.

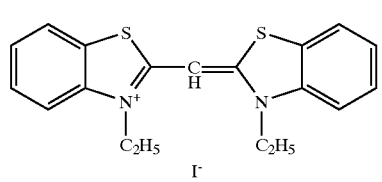

INDUSTRIAL APPLICABILITY

In the first group of the present invention, a novel azaporphyrin compound represented by the general formula (1) is provided. Moreover, according to the present invention, an azaporphyrin represented by the general formula (8) can be conveniently produced using a maleonitrile of the general formula (9) and an acetophenone of the general formula (10).

Furthermore, according to the present invention, by using, as a recording layer, mono-, di-, or triazaporphyrin compound which may form a metal complex, particularly the compound of the present invention represented by the general formula (1), it becomes possible to provide a write-once-read-many optical recording medium capable of recording and replying with a laser having a wavelength of 300 to 500 nm and of recording and replying at a wavelength of 500 to 700 nm.

In the second group of the present invention, an optical recording medium capable of a high-density recording and having a wide applicability can be provided by using, in the recording layer, an organic dye having a first maximum value of absorption at a wavelength λ1 of 400 nm or less in its absorption spectrum and having a second maximum value of absorption at longer wavelength side than the λ1, the absorption band to which the second maximum value belongs functioning as an energy relaxing level, wherein recording is excellently conducted with a blue-violet laser having a wavelength of 430 nm or less, particularly a wavelength of 390 to 430 nm and light resistance and storage life are superior even against the replay at the same wavelength. The optical recording medium is usable in practical use of HD-DVDR having a high capacity of 15 GB or more, which is usable for a blue-violet laser.

What is claimed is:

1. An optical recording medium containing, in the recording layer, at least one compound represented by the general formula (5):

(5)

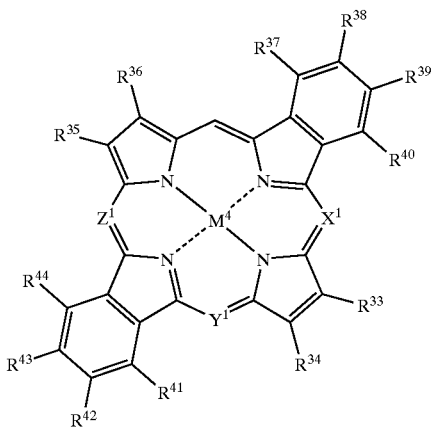

wherein $R^{33}$, $R^{34}$, $R^{35}$, $R^{36}$, $R^{37}$, $R^{38}$, $R^{39}$, $R^{40}$, $R^{41}$, $R^{42}$, $R^{43}$, and $R^{44}$ each independently represent hydrogen atom, a halogen atom, hydroxyl group, a substituted or unsubstituted alkyl group, aryl group, alkoxy group, aralkyloxy group, aryloxy group, alkenyloxy group, alkylthio group, arylthio group, or heteroaryl group, a pair of $R^{33}$ and $R^{34}$ and a pair of $R^{35}$ and $R^{36}$ each may form an aliphatic ring, which may have a substituent, in combination, $X^1$, $Y^1$, and $Z^1$ each independently represent a methine group or nitrogen atom and at least two of $X^1$, $Y^1$, and $Z^1$ are nitrogen atoms and $M^4$ represents two hydrogen atoms, a divalent metal atom which may be unsubstituted or have a ligand, a trivalent or tetravalent metal atom or metaloid atom which may have a substituent, or an oxy metal atom.

2. The optical recording medium according to claim 1, wherein the compound is a compound represented by the general formula (6):

(6)

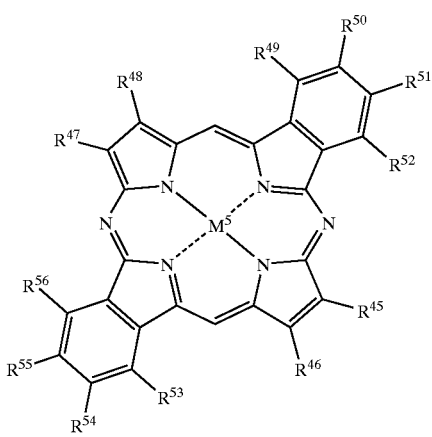

wherein $R^{45}$, $R^{46}$, $R^{47}$, $R^{48}$, $R^{49}$, $R^{50}$, $R^{51}$, $R^{52}$, $R^{53}$, $R^{54}$, $R^{55}$, and $R^{56}$ each independently represent the same groups as $R^{33}$ to $R^{44}$, a pair of $R^{45}$ and a pair of $R^{46}$ and $R^{47}$ and $R^{48}$ each may form an aliphatic ring, which may have a substituent, in combination through a connecting group, and $M^5$ represents the same meaning as $M^4$ represents.

3. The optical recording medium according to claim 1, wherein the compound is a compound represented by the general formula (7):

(7)

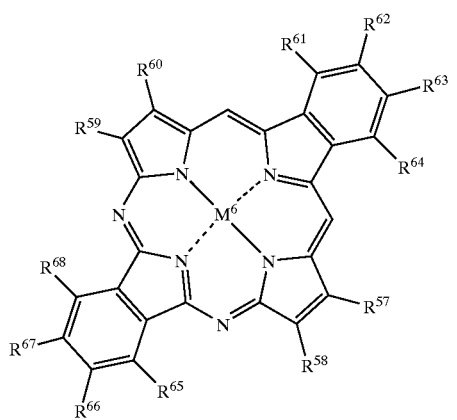

wherein $R^{57}$, $R^{58}$, $R^{59}$, $R^{60}$, $R^{61}$, $R^{62}$, $R^{63}$, $R^{64}$, $R^{65}$, $R^{66}$, $R^{67}$, and $R^{68}$ each independently represent the same groups as $R^{33}$ to $R^{34}$, a pair of $R^{57}$ and $R^{58}$ and a pair of $R^{59}$ and $R^{60}$ each may form an aliphatic ring, which may have a substituent, in combination through a connecting group, and $M^6$ represents the same meaning as $M^4$ represents.

4. The optical recording medium according to claim 1, wherein the compound is a compound represented by the general formula (8):

(8)

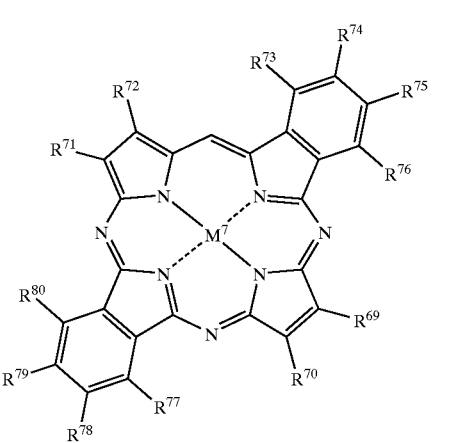

wherein $R^{69}$, $R^{70}$, $R^{71}$, $R^{72}$, $R^{73}$, $R^{74}$, $R^{75}$, $R^{76}$, $R^{77}$, $R^{78}$, $R^{79}$, and $R^{80}$ each independently represent the same groups as $R^{33}$ to $R^{44}$, a pair of $R^{69}$ and $R^{70}$ and a pair of $R^{71}$ and $R^{72}$ each may form an aliphatic ring, which may have a substituent, in combination through a connecting group, and $M^7$ represents the same meaning as $M^4$ represents.

5. An optical recording medium, which contains, in the recording layer, a mixture of azaporphyrin compounds represented by the general formulae (11) to (13) produced by reacting a maleonitrile represented by the following general formula (9), an acetophenone represented by the following general formula (10), and a metal halide and/or a metal derivative:

(9)

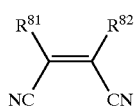

(10)

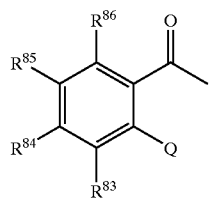

wherein $R^{81}$, $R^{82}$, $R^{83}$, $R^{84}$, $R^{85}$, and $R^{86}$ each independently represent hydrogen atom, a halogen atom, hydroxyl group, a substituted or unsubstituted alkyl group, aryl group, alkoxy group, aralkoxy group, aryloxy group, alkenyloxy group, alkylthio group, arylthio group, or heteroaryl group, $R^{81}$ and $R^{82}$ may form an aliphatic ring, which may have a substituent, in combination through a connecting group, and Q represents a halogen atom or cyano group, (11)

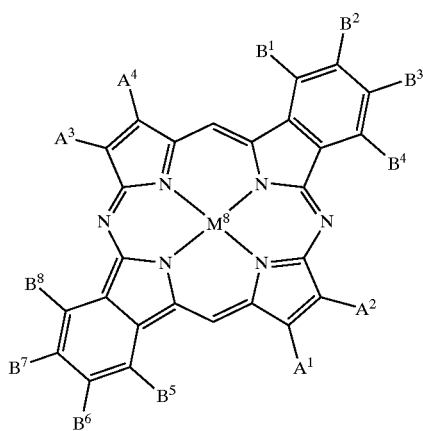

(12)

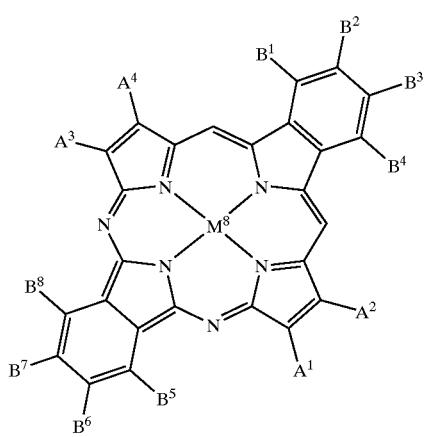

(13)

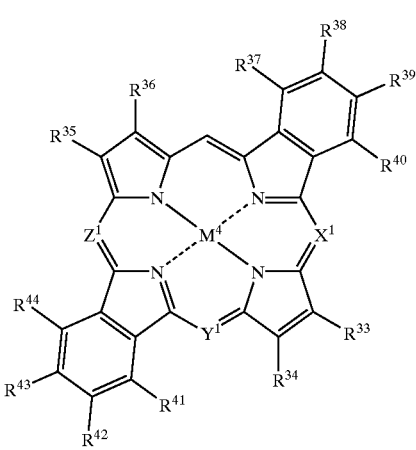

wherein $A^1$ and $A^2$ represent $R^{81}$ and $R^{82}$ or $R^{82}$ and $R^{81}$ in the formula (9) respectively, $A^3$ and $A^4$ represent $R^{81}$ and $R^{82}$ or $R^{82}$ and $R^{81}$ in the formula (9) respectively, $B^1$, $B^2$, $B^3$, and $B^4$ represent $R^{83}$, $R^{84}$, $R^{85}$, and $R^{86}$ or $R^{86}$, $R^{85}$, $R^{84}$, and $R^{83}$ in the formula (10) respectively, $B^5$, $B^6$, $B^7$, and $B^8$ represent $R^{83}$, $R^{84}$, $R^{85}$, and $R^{86}$ or $R^{86}$, $R^{85}$, $R^{84}$, and $R^{83}$ in the formula (10) respectively, and $M^8$ represents two hydrogen atoms, a divalent metal atom, which may be unsubstituted or have a ligand, a trivalent or tetravalent metal atom or metaloid atom, which may have a substituent, or an oxy metal atom.

6. A compound represented by the general formula (5):

(5)

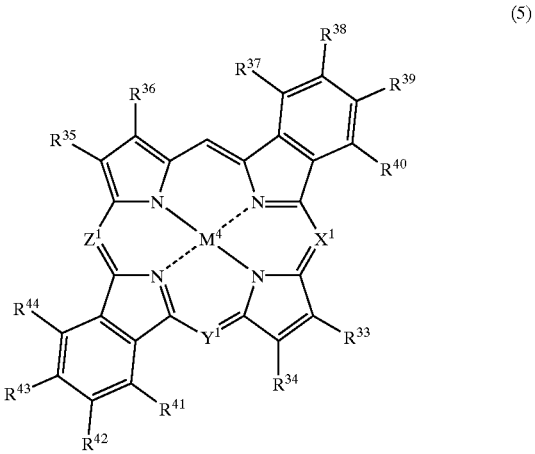

wherein $R^{33}$, $R^{34}$, $R^{35}$, $R^{36}$, $R^{37}$, $R^{38}$, $R^{39}$, $R^{40}$, $R^{41}$, $R^{42}$ $R^{43}$, and $R^{44}$ each independently represent hydrogen atom, a halogen atom, hydroxyl group, a substituted or unsubstituted alkyl group, aryl group, alkoxy group, aralkyloxy group, aryloxy group, alkenyloxy group, alkylthio group, arylthio group, or heteroaryl group, a pair of $R^{33}$ and $R^{34}$ and a pair of $R^{35}$ and $R^{36}$ each may form an aliphatic ring, which may have a substituent, in combination, $X^1$, $Y^1$, and $Z^1$ each independently represent a methine group or nitrogen atom and at least two of $X^1$, $Y^1$, and $Z^1$ are nitrogen atoms and $M^4$ represents two hydrogen atoms, a divalent metal atom which may be unsubstituted or have a ligand, a trivalent or tetravalent metal atom or metaloid atom which may have a substituent, or an oxy metal atom.

7. The compound of claim 6, which is represented by the general formula (6):

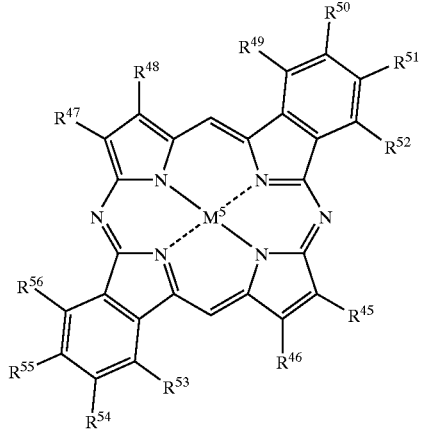

(6)

wherein $R^{45}$, $R^{46}$, $R^{47}$, $R^{48}$, $R^{49}$, $R^{50}$, $R^{51}$, $R^{52}$, $R^{53}$, $R^{54}$, $R^{55}$, and $R^{56}$ each independently represent the same groups as $R^{33}$ to $R^{44}$, a pair of $R^{45}$ and $R^{46}$ and a pair of $R^{47}$ and $R^{48}$ each may form an aliphatic ring, which may have a substituent, in combination through a connecting group, and $M^5$ represents the same meaning as $M^4$ represents.

8. The compound of claim 6, which is represented by the general formula (7):

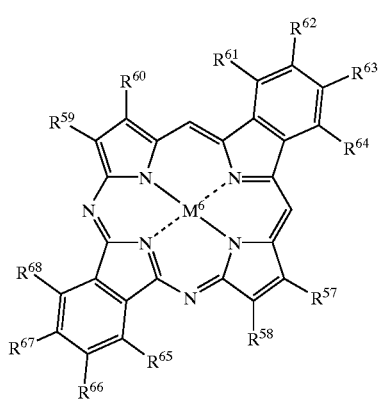

(7)

wherein $R^{57}$, $R^{58}$, $R^{59}$, $R^{60}$, $R^{61}$, $R^{62}$, $R^{63}$, $R^{64}$, $R^{65}$, $R^{66}$, $R^{67}$, and $R^{68}$ each independently represent the same groups as $R^{33}$ to $R^{44}$, a pair of $R^{57}$ and $R^{58}$ and a pair of $R^{59}$ and $R^{60}$ each may form an aliphatic ring, which may have a substituent, in combination through a connecting group, and $M^6$ represents the same meaning as $M^4$ represents.

9. The compound of claim 6, which is represented by the general formula (8):

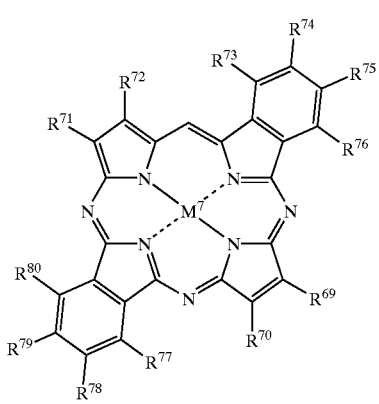

(8)

wherein $R^{69}$, $R^{70}$, $R^{71}$, $R^{72}$, $R^{73}$, $R^{74}$, $R^{75}$, $R^{76}$, $R^{77}$, $R^{78}$, $R^{79}$, and $R^{80}$ each independently represent the same groups as $R^{33}$ to $R^{44}$, a pair of $R^{69}$ and $R^{70}$ and a pair of $R^{71}$ and $R^{72}$ each may form an aliphatic ring, which may have a substituent, in combination through a connecting group, and $M^7$ represents the same meaning as $M^4$ represents.

10. A mixture of azaporphyrin compounds represented by the general formulae (11) to (13):

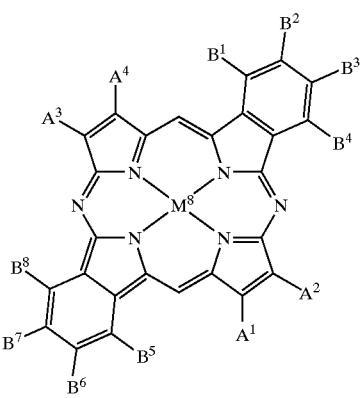

(11)

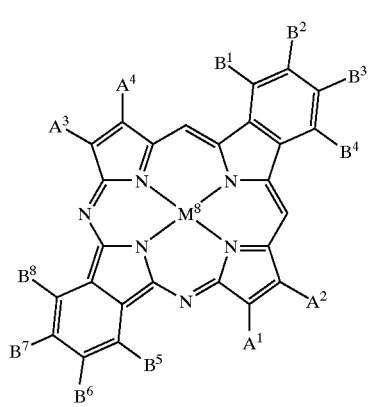

(12)

(13)

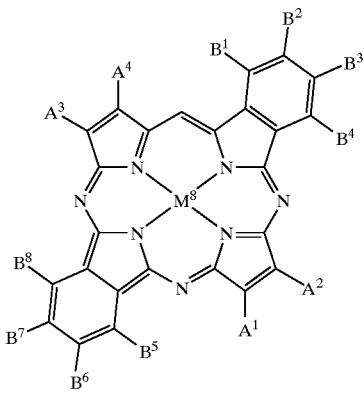

wherein $A^1$, $A^3$, $A^4$, $B^1$, $B^2$, $B^3$, $B^5$, $B^6$, $B^7$, and $B^8$ each independently represent hydrogen atom, a halogen atom, hydroxyl group, a substituted or unsubstituted alkyl group, aryl group, alkoxy group, aralkyloxy group, aryloxy group, alkenyloxy group, alkylthio group, arylthio group, or heteroaryl group, each pair of $A^1$, $A^2$, and $A^3$, and $A^4$, may form an aliphatic ring, which may have a substituent in combination through a connecting group, and $M^8$ represents two hydrogen atoms, a divalent metal atom which may be unsubstituted or have a ligand, a trivalent or tetravalent metal atom or metaloid atom which may have a substituent, or an oxy metal atom.

11. A process for producing an azaporphyrin compound according to claim 6, comprising a step of reacting a maleonitrile represented by the general formula (9), an acetophenone represented by the general formula (10), and a metal halide and/or a metal derivative:

(9)

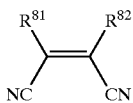

(10)

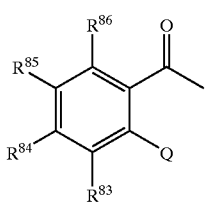

wherein $R^{81}$, $R^{82}$, $R^{83}$, $R^{84}$, $R^{85}$, and $R^{86}$ each independently represent hydrogen atom, a halogen atom, hydroxyl group, a substituted or unsubstituted alkyl group, aryl group, alkoxy group, aralkyloxy group, aryloxy group, alkenyloxy group, alkylthio group, arylthio group, or heteroaryl group, $R^{81}$ and $R^{82}$ each may form an aliphatic ring, which may have a substituent, in combination through a connecting group, and Q represents a halogen atom or cyano group.

12. A process for producing a mixture of azaporphyrin compounds of claim 10, comprising a step of reacting a maleonitrile represented by the general formula (9), an acetophenone represented by the general formula (10), and a metal halide and/or a metal derivative:

(9)

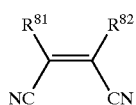

(10)

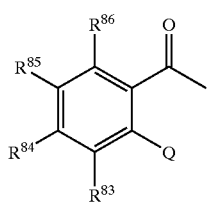

wherein $R^{81}$, $R^{82}$, $R^{83}$, $R^{84}$, $R^{85}$, and $R^{86}$ each independently represent a hydrogen atom, a halogen atom, hydroxyl group, a substituted or unsubstituted alkyl group, aryl group, alkoxy group, aralkyloxy group, aryloxy group, alkenyloxy group, alkylthio group, arylthio group, or heteroaryl group, $R^{81}$ and $R^{82}$ each may form an aliphatic ring, which may have a substituent, in combination through a connecting group, and Q represents a halogen atom or cyano group.

* * * * *